United States Patent [19]
Erickson et al.

[11] Patent Number: 4,536,847
[45] Date of Patent: Aug. 20, 1985

[54] HELIOSTAT CONTROL EMPLOYING DIRECT CURRENT MOTOR

[75] Inventors: Mark R. Erickson, Northglenn; James A. Kaehler, Littleton, both of Colo.

[73] Assignee: Atlantic Richfield Company, Los Angeles, Calif.

[21] Appl. No.: 454,590

[22] Filed: Dec. 30, 1982

[51] Int. Cl.³ .................... G06F 15/46; G05D 1/12; F24J 3/02
[52] U.S. Cl. ................................ 364/516; 126/425; 318/567; 364/559
[58] Field of Search ............... 364/559, 516; 126/424, 126/425; 250/203 R, 203 S; 353/3; 350/289, 295; 318/138, 261, 375, 376, 567

[56] References Cited

U.S. PATENT DOCUMENTS

| | | | |
|---|---|---|---|
| 4,192,583 | 3/1980 | Horton | 126/425 X |
| 4,215,410 | 7/1980 | Weslow et al. | 126/424 X |
| 4,225,811 | 9/1980 | Kuhnlein et al. | 318/261 |
| 4,278,921 | 7/1981 | Medding et al. | 318/138 X |
| 4,332,239 | 6/1982 | Hotine | 250/203 S UX |
| 4,354,484 | 10/1982 | Malone et al. | 126/425 |
| 4,383,213 | 5/1983 | Tyrner | 318/376 X |
| 4,429,952 | 2/1984 | Dominguez | 250/203 S UX |

Primary Examiner—Joseph Ruggiero
Attorney, Agent, or Firm—Wofford, Fails & Zobal

[57] ABSTRACT

An improvement in a system and method of controlling a body to maximize the amount of solar energy received by a collector by moving the body in azimuth and elevation by respective DC motors having connected therewith ring magnets and Hall Effect Devices for signalling the degrees, or steps of rotation. The at least one body may be a collector, per se, or a plurality of heliostats in an array reflecting onto a central collector. A central computer calculates a commanded position for particular time of particular day for the particular location of the body. A microprocessor incorporating respective software and hardware then calculates the position for the heliostat to be in terms of the number of signals from the Hall Effect Device, compares the number of signals from the Hall Effect Device once the motors are energized in, respectively, azimuth and elevation and runs to the commanded position. The software and hardware incorporate means for appropriately starting and stopping the motors at a desired point, such as the zero position of a cycle of alternating current to minimize noise; incorporates means for determining when there is a power failure and shutting down the system to prevent damage upon reapplication of power or the like. By this technique, the body is kept correctly oriented throughout the day using only the time of the day without requiring the usual sensors and feedback apparatus.

8 Claims, 29 Drawing Figures

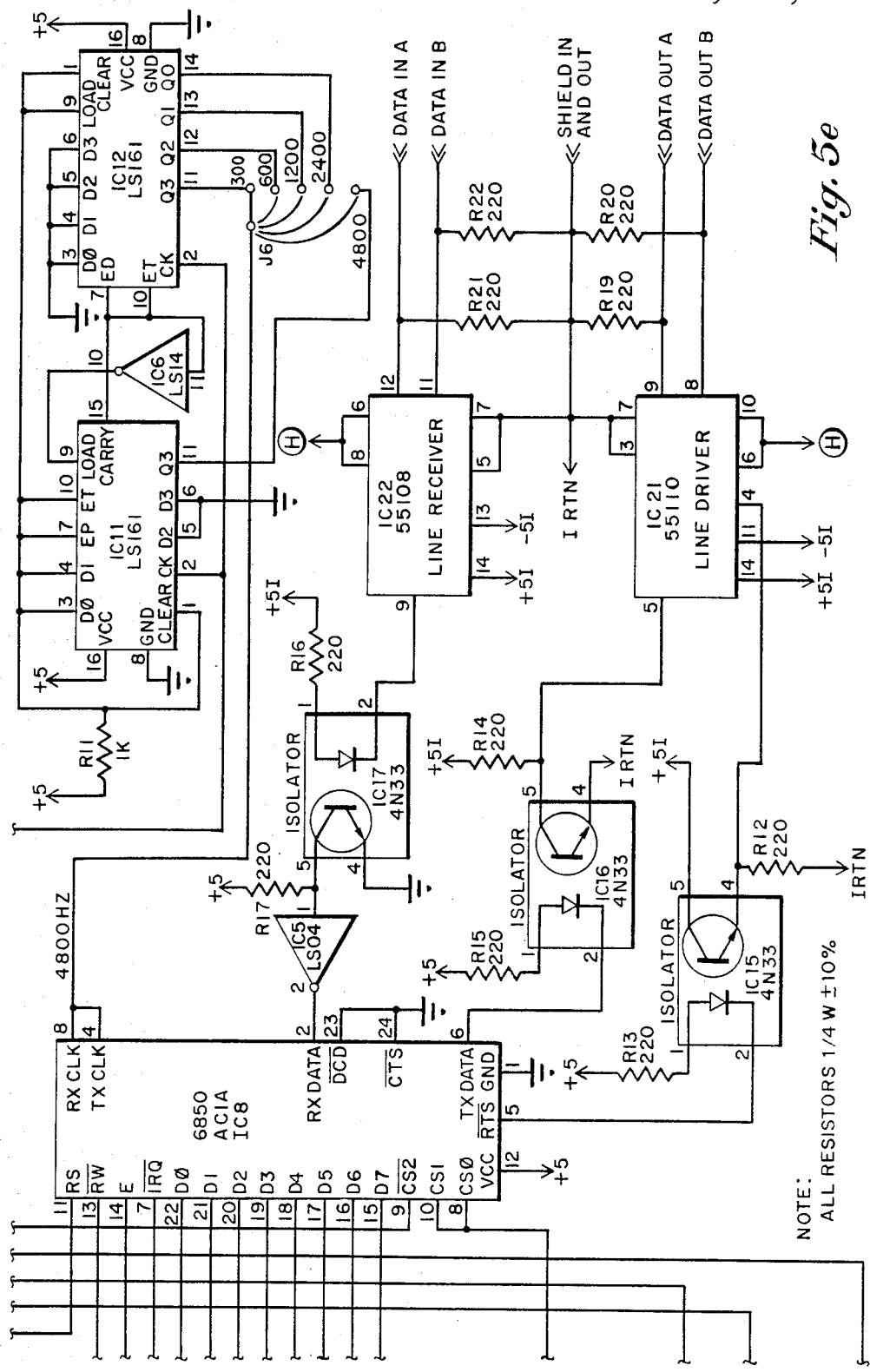

4,536,847

HELIOSTAT CONTROL EMPLOYING DIRECT CURRENT MOTOR

FIELD OF THE INVENTION

This invention relates to solar systems employing collectors for converting solar energy into usable form; or reflectors for reflecting radiant energy onto one or more collectors that convert the solar energy into usable energy. More particularly, this invention relates to an improvement in a control system and method for controlling the collectors or the reflectors in order to obtain beat collection of the solar energy.

BACKGROUND OF THE INVENTION

In the prior art there has been developed a wide variety of systems for producing useful work. Some of the systems, such as nuclear fission, suffered from bad publicity. Others such as conversion of energy content of substances such as wood, coal and petroleum, are suffering from scarcity of the fuel and from pollution by the waste products of combustion. Consequently, there is increasing emphasis on the use of solar energy and similar readily available fuels that do not contaminate. The systems for using solar energy are referred to as solar systems. These systems have taken a wide variety of forms ranging from using the collectors alone to amplifying type collectors. The collectors have ranged from collections of photovoltaic cells that convert the radiant energy directly into electrical energy to more mundane systems that convert the energy to heat for heating a fluid for use; for example, in generation of power.

Regardless of which system is employed, it is generally conceded to be beneficial to employ a principle in which the sun's radiant energy from a much larger area than a single collector, per se, is made use of.

In a typical installation heretofore, the collector was mounted on an expensive tower or the like that held the collector high for directing the energy onto it; and many reflectors, generally referred to as heliostats, were spaced about the central collector and used sensors for directing the radiant energy onto the collector.

In a patent by co-workers Floyd Blake and Lynn Northrup, Jr. and assigned to the assignee of this invention, entitled "Solar System Having Improved Heliostat and Sensor Mountings", U.S. Pat. No. 4,227,513, the descriptive matter of which is incorporated herein by reference for details that are omitted herefrom, there was disclosed an improvement that eliminated the prior major expense of having to have the reflectors mounted on one post and the sensors mounted on another post, both of the posts being deeply embedded in the earth's surface such that they were firmly anchored and resisted receiving minor surface movements that were independent of each other. In that patent application there was disclosed an improved co-mounted reflector and sensor on a single post to eliminate that nonfunctional and inefficient expense.

Despite that improvement, it has been found functionally, flexibly, and economically advantageous to eliminate the sensor, per se; and to control the heliostats by a computer that calculates respective commanded positions to which the heliostats are moved in respective azimuths and elevations for a given time of the day.

On the other hand, banks of photovoltaic cells can be arranged to resemble the heliostats and thereafter controlled by a similar computer control to maximize received solar energy.

Typical of the art employing a controller to attain a position for aiming a collector or heliostat so as to maximize the received energy from the sum are the following U.S. Pat. Nos. 4,107,521 describes an improved solar sensor and tracker apparatus in which low cost high-angular accuracy sensor and tracking device use symmetrical sensor shade and sensor arrangement to track the sun. No. 4,146,785 describes a solid state control system for control of a collector array in which there is incorporated sun tracking mode, defocusing at excessive temperatures, returning to standby after sunset and pre-positioning at sunrise. That patent contains a fairly good description of typical prior art approaches employing these sensors and describes its invention in automating these respective elements. No. 4,223,174 describes solar energy converter assemblies having sensors for following the sun. No. 4,223,214 also describes the solar tracking arrangement using sensors. No. 4,215,410 describes a computer controller for positioning a solar collector to point towards the sun and receive the maximum amount of energy responsive to a correlation between the physical, geographical location and the time of day. No. 4,267,441 shows energy ray tracking device for fixing the direction to receive maximum energy rays. No. 4,215,410 contains an excellent description of the prior art approach for orienting a collector to receive the maximum rays. No. 4,243,018 describes a solar energy concentrator mounted to extend longitudinally in an east-west direction spaced above a supporting surface for pivotal movement to receive solar energy in a focused manner. All of these systems provided relatively complicated approaches.

In a co-pending application by one of the inventors, James A. Kaehler, entitled "Improved Heliostat Control", Ser. No. 342,155 with a filing date of Jan. 25, 1982, U.S. Pat. No. 4,440,150, and assigned to the assignee of this invention, there was disclosed an improved system employing stepping motors in which the computer calculated the number of steps of the respective stepping motors.

In all of the foregoing, there was required expensive sub-assembly such as the stepping motors or the like. It is desirable that the controls be simple, automatic, easily implemented and not require expensive sub-assemblies; yet, provide a flexible way of controlling one or more collectors to maximize solar energy reception or controlling the heliostats to reflect the solar energy onto a collector, when multiple heliostats were employed in an array of many heliostats about a collector.

SUMMARY OF THE INVENTION

Accordingly, it is an object of this invention to provide a control system that is economical, flexible and provides a method and system for controlling a heliostat or a collector flexibly and cost effectively by eliminating expensive sub-assemblies.

It is a specific object of this invention to provide an improvement in a solar control system in which there is employed a plurality of heliostat-type structures, maximizing the use of radiant energy impinging on a large surface area; and flexibly controlling the individual heliostats economically, alleviating the deficiencies of the prior art and providing system and method that can be readily altered if needed for the greatest efficiency.

In a specific aspect of this invention, it is an object to provide a broad, improved control system in which a motor is monitored and brought in on a desired control point through the use of a Hall Effect device for monitoring the rotations through which the motor is turned.

These and other objects will become apparent from descriptive matter hereinafter, particularly when taken in conjunction with the appended drawings.

In accordance with one embodiment of this invention there is provided an improvement in a controller for a solar system for maximizing solar energy received by a collector and including at least one body that is employed to maximize the solar energy received by the collector responsive to movement about 2 axes by respective motors. The system employs a central processor means and respective microprocessor means at each of the at least one bodies, as integral part of a controller. The improvement comprises:

a. a central processor means including means for providing data representative of the day of the year, time of the day and data corresponding to latitude and longitude at which the body is used, means for storing a program for controlling the functions of the processor means; the program controlling the respective processor means to use the data to calculate a commanded position for the respective at least one body to be at the particular time of day;

b. memory means for storing first position data representative of the present angular positions of the motors about the respective first and second axes;

c. a program controlling the processor means to determine data representative of the amount of movement required for the body to move about the axes to the commanded position;

d. the program further controlling the processor means to modify the first positional data to the new value as resulting from movement of the device about the axes;

e. means of responding to the data representative of the amount of movement by controlling the respective motors to turn the device about the respective axes toward an angular position corresponding with the second positional data; the means including:

i. cumulating means for keeping track of number of commanded steps for respective motors in each of the axes to reach the commanded position;

ii. respective direct current motors and Hall Effect Device connectable with a source of power and operating in the respective means to move the body about the respective axes;

iii. energizer means for energizing the respective said motors; the energizer means being connected with the cumulating means and the motors and adapted to operate selectively either of the motors; and iv. comparison means for comparing accumulated steps of a respective Hall Effect Device to the commanded steps; the comparison means being connected with elements recited in a, b, c and d and being adapted to step a respective said motor to a predetermined commanded position.

In this invention the "at least one body" may comprise a collector, per se, or a plurality of heliostats reflecting solar energy onto a central collector. The only difference is that if it is a collector, per se, the perpendicular axis of the collector is parallel with the rays of the solar energy, or pointed at the sun; whereas if it is one or more heliostats, the perpendicular axis of the heliostats bisects the smallest angle between the sun and the angle to the target collector.

In another aspect of this invention, the processing unit calculates a position into which any body must be moved responsive to rotation of a motor, energizes a DC motor having a Hall Effect Device connected therewith so as to monitor the revolutions of the motor and thereafter stopping the motor when the body is moved to a commanded position.

In still another aspect of this invention, a method is provided for controlling the body to maximize the solar energy received by a collector including moving the body in azimuth and elevation by respective motors, the improvement comprising (a) calculating a command position for the body to be at a particular time of day for particular location; (b) initializing and powering up at a predetermined position and monitoring the position thereafter; (c) accumulating the number of steps of a Hall Effect Device in each of the respective azimuth and elevation moving motors as they are respectively energized to get to the commanded position from the predetermined position each time the body is to be moved; (d) energizing the respective azimuth and elevation motors to run to a predetermined number of commanded position, thereafter de-energizing and braking the respective motors to stop the body at a predetermined commanded position. In calculating the commanded position, the exact latitude, longitude and time of the year, day and minute are input. A central computer uses this data in an algorithm to calculate the commanded position. Options for safety are available to stow the body, such as the heliostat, during storms or the like or at night when solar energy has ceased to be useable. Manual options are provided to allow overriding the automatic controller. Moreover, specialty circuits are employed in the embodiment to minimize noise spikes and to include braking at appropriate portions of the cycle of alternating current energy being employed. Other particularly preferred instrumentation embodiments that achieve the advantageous results of this invention are also employed in this invention.

BRIEF DESCRIPTION OF THE DRAWINGS

FIGS. 5a-k are respective circuit diagrams showing the interconnection of the respective electronic elements, or hardware, in accordance with the embodiment of FIG. 2.

DESCRIPTION OF PREFERRED EMBODIMENT(S)

It should be borne in mind that this invention is widely useful. For example, it can be employed to monitor a response from a motor turning to bring any body into a commanded position and employing a Hall Effect Device to obtain feedback from the number of revolutions for either the motor or a driven element connected with the motor. More specifically, this invention could be employed to orient a solar collector to point at the sun as described in U.S. Pat. No. 4,215,410; or any other invention in which a pre-determined commanded position of a body is to be effected. This invention will be explained in the context of controlling a heliostat individually in an array to reflect solar energy onto a target collector, since it was in this environment that it has been developed and tested.

It is well known, for example, that for a given location on the surface of the earth, the line to the sun will have a direction in azimuth and elevation that is predictable by an observer at the surface of the earth. The exact location of the surface of the earth may employ the conventional latitude and longitude grids. There is also a line from a given heliostat to a central collector onto which the sun's energy must be reflected. The line perpendicular to the surface of the heliostat mirrors reflecting the solar energy onto the target collector will bisect the angle between the line to the sun and the line to the collector. Consequently, that position of the heliostat can be calculated from this location on the earth and the time of day, month and year. Many approaches have been employed in calculating the position of the heliostat and it is relatively immaterial to this invention which of the prior art approaches be employed. For example, the Cordic algorithm is well known and is frequently employed in calculating the command, or commanded, position for the heliostat.

Where the collector, per se, such as a planar collector, is to be aimed at the sun, an algorithm such as described in U.S. Pat. No. 4,215,410 can be employed.

For the heliostat art there are other ways to simply measure the line angle to the target collector and obtain the line angle to the sun from tables for the given location and then bisect the intermediate angle to determine the position for each point of time during the day. These types of empirical observational charts are readily available for most general areas of the world and can be extrapolated or made up for the specific area in which each heliostat is located.

Figure 1:
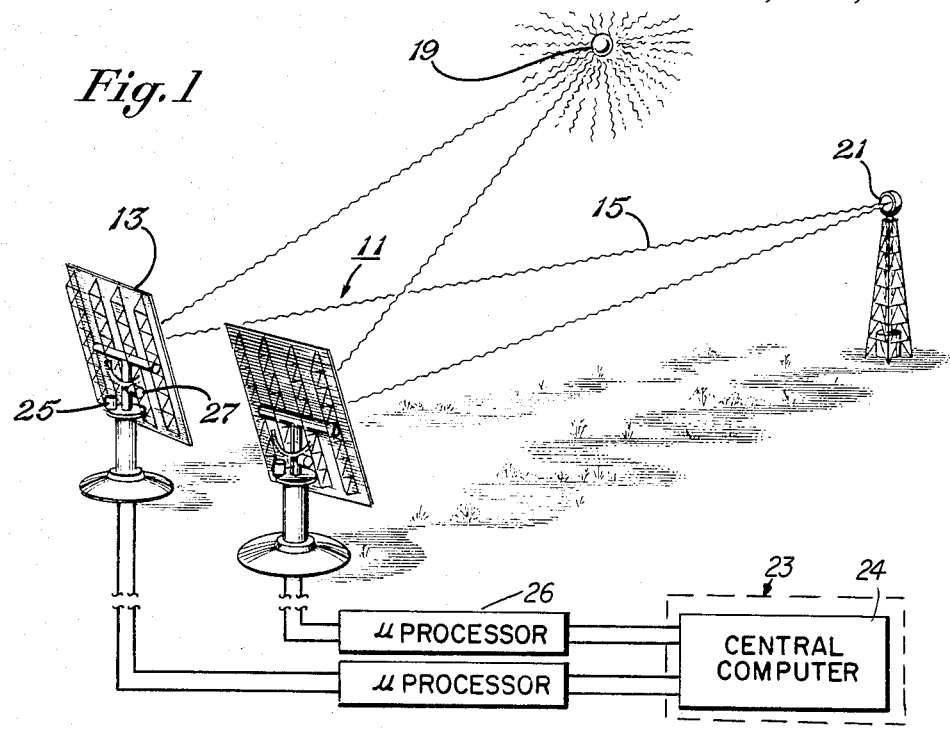
FIG. 1 is a somewhat diagramatic illustration of a plurality of heliostats being controlled in accordance with this invention to reflect solar energy onto a central collector.

Referring to FIG. 1 for a broad overview, heliostats 11 and 13 are emplaced on suitable pedestal supports or the like such that they can be rotated about two axes to achieve any commanded position in azimuth and elevation. They can be pivoted to change their azimuth. They are mounted so they can be rolled forward and backward to change their elevation. This allows achieving any desired position to reflect solar energy, shown by ray 15 from the sun 19 onto collector 21. The controller 23, FIG. 1, determines by way of central computer 24 commanded positions that each of the heliostats is to be in at respective particular times and sends control signals via microprocessors 26 at each heliostat, respectively, to rotate the respective motors in the respective heliostats to obtain the operational azimuth and elevational commanded position to effect reflection of the solar energy onto the target collector 21.

Figure 2:
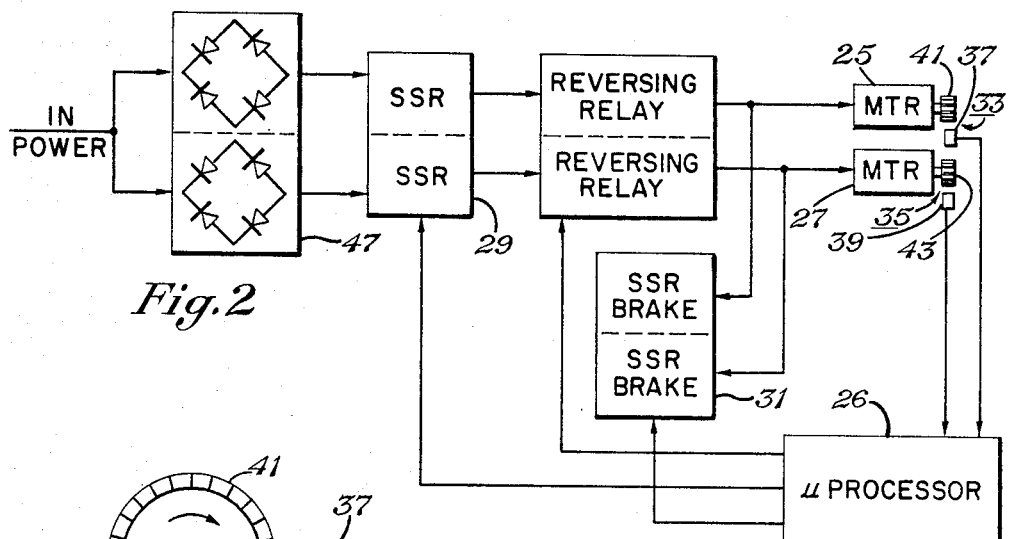
FIG. 2 is a schematic illustration of the broad aspects of one embodiment of this invention for controlling the heliostats of FIG. 1.
Figure 3:
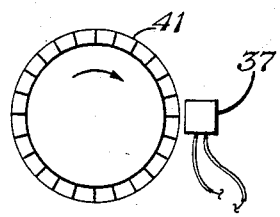
FIG. 3 is a end-view of a Hall Effect Device employed in the embodiment of FIGS. 1 and 2.
Figure 4:
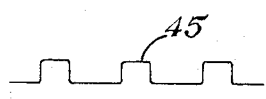
FIG. 4 is an output signal presentation.

The heliostats are moved about their respective axes by azimuth motor 25 and elevation motor 27, FIGS. 1 and 2. Referring to the schematic diagram of FIG. 2, the controller 23 includes downstream of the central computer microprocessor (u PROC), 26 at each heliostat. The controller 23 can include a central computer, as illustrated in FIG. 1, for calculating a commanded position from the time of day, month and year or it can receive this information from a separate source, such as a separate central computer. The microprocessor 26 then controls a respective motor 25 or 27 to drive it to a commanded position by means of the SSR's 29, bridge rectifier 47 and related circuits. Once there the controller then rapidly stops the motor with the braking SSR's 31 by putting a low resistance across the motor. The controller 23 then brings the other motor to its commanded position and stops it rapidly. Feedback is obtained by respective Hall Effect Devices 33, 35. The input is obtained from the respective Hall Effect Device sensors 37, 39, sensing passage of respective ring magnets 41, 43 driven by the respective motors (MTR) 25, 27 such that pulses 45, FIG. 4, are emitted so as to be counted by the controller for determining the magnitude of rotation in a given direction. Specifically, the pulses from the magnets are counted. Limit switches are provided to start the home position at a standard position from overnight storage and to begin the day for producing power. Typically the heliostats are driven as described in U.S. Pat. Nos. 4,276,872 and 4,227,513, co-inventor Floyd Blake. In those inventions, however, stepping motors were employed to move one step responsive to one signal, similarly as described in U.S. Pat. No. 4,215,410. If desired, of course, a mechanical system for driving the heliostat about its respective axes can be employed similarly as was described in U.S. Pat. No. 4,215,410. In this invention, however, the economical DC motors with the Hall Effect Device to monitor the magnitude to which the motors have rotated is employed instead of using stepping motors.

It is believed helpful to delineate, in intermediate detail, operational steps before considering specifics. A central computer calculates a commanded position, employing time and geographical location, in terms of azimuth and elevation angles. The microprocessor 26 has inputted by a suitable means the data containing azimuth and elevation angles. The heliostat 13 is initially activated, ordinarily from a pre-determined stow position to begin the day at a limit switch. As the control circuits are initialized by the microprocessor at the stowed position, the number of steps the heliostat is to be moved is calculated for each of the motors to get from present position to commanded position. Once each motor is energized and started to rotate its counts of movement are accumulated. There are two separate accumulators for this purpose. A comparator means compares the accumulated steps to the commanded steps. Thereafter, the number of steps is decremented (subtracted) from the cumulative steps through which the respective azimuth and elevation motors have to move to obtain the commanded position. The motors are respectively energized and brought to the respective commanded positions where they are braked to a stop.

Before considering the schematic circuit diagram of FIGS. 5(a-k) it is believed helpful to review again the objectives and specific components employed in this invention. The control electronics is designed using the latest in digital electronics including the high speed microprocessor. Using a combination of 6500 series components and standard digital electronics the formation of an intelligent control system is employed. The use of a microprocessor allows changing the system to conform to any hardware configuration and communication protocol needed. The main purpose of the controller is to accurately position two motors, DC motors in this invention, by command of a central computer. Limit switches on both axes provide the controller with a reference to prevent the heliostat from causing damage to itself. The east limit on the azimuth axis and the down limit on the elevational axis provide the controller with a starting reference position. Communication is conducted over two sets of wires in serial format. Commands from the central computer are on one set and the status response is sent back on the other.

The heliostat controller will perform several functions on command. Tracking command tells the heliostat to move to a position and stop. Slewing causes the heliostat to move until told to stop. The position can be set to any value to align the controller with the current heliostat position. When power is applied or malfunction occurs the controller will disable motor operation until a reset command is sent. When moving down or west the position decreases and when moving up or east the position increases in the following descriptive matter. There are 65,536 positions possible on both axes starting at zero. The motors may also be controlled manually by connecting a manual box. The manual box has two switches. One for east or west and the other for up or down.

A command sent to the controller can consist of an address, an azimuth position, an elevation position and a mode byte. Each byte is sent in serial form with one start bit, eight data bits and two stop bits. Each controller on a line has its own address and only responds to commands to that address. When a request for status is received, only one heliostat at a time is allowed to drive the return communication line. All heliostats will respond to a command sent with the emergency address. This enables all heliostats to be stowed with a single command under emergency conditions, as in a storm or the like. The communication lines are optically isolated to prevent serious damage during lightning conditions.

The two DC (direct current) motors are driven from the 120 volt alternating current input power. The power is turned on with a solid state relay (SSR) and then changed into DC with a bridge rectifier. The motor direction is controlled with a conventional double pole double throw mechanical relay. When the motor reaches position, the power is turned off and another solid state relay (SSR) is turned on across the motor. The SSR across the motor shorts the motor windings and stops the motor rapidly, substantially instantly. Due to the characteristic of the SSR, a protection circuit was added to prevent uncontrolled turn-on of both the power and brake SSR's. When this occurs, a signal is sent to the control computer and the power is turned off before a fuse is blown. After the power is turned off to the motor, the motor operation is disabled until a reset command is sent from the main computer.

The position of the motor is monitored with the use of a Hall effect switch. This device is placed next to a magnetic rotor which has alternating north and south poles. When these poles pass the device a signal is generated that is sent to the controller where they are counted. Each absolute position is made from Hall Effect counts. Accuracy can be adjusted by changing number of counts per position.

To describe a best mode, the following more detailed descriptive matter is given, even though it is redundant in some respects.

The control electronics for a preferred embodiment of this invention employ a micro-processor based dual axis positioning computer used to align a tracking unit to externally requested co-ordinates. This unit responds to externally generated commands transmitted in serial fashion from a central computer unit. The commands represent a position the controller is to move to. Other commands sent to the unit control internal functions of the controller. The controller moves to a position by applying power in the proper direction to each of the two independent DC motors until they rotate the required number of turns, as described hereinbefore. In this preferred embodiment the movement of the motors is monitored with a Hall effect encoding device which outputs a digital pulse ten times per rotation of the motor shaft.

At the heart of the systems controller of this invention is a 6502 micro-processor integrated circuit. This integrated circuit makes possible a very versatile and adaptable microcomputer system when used in conjunction with the 6522 versatile interface adapter, the 6532 random access memory, input-output timer (RIOT), 6850 asynchronous communication interface adapter (ACIA) and a 2716 erasable programmable read-only memory (EPROM).

Figure 5A:
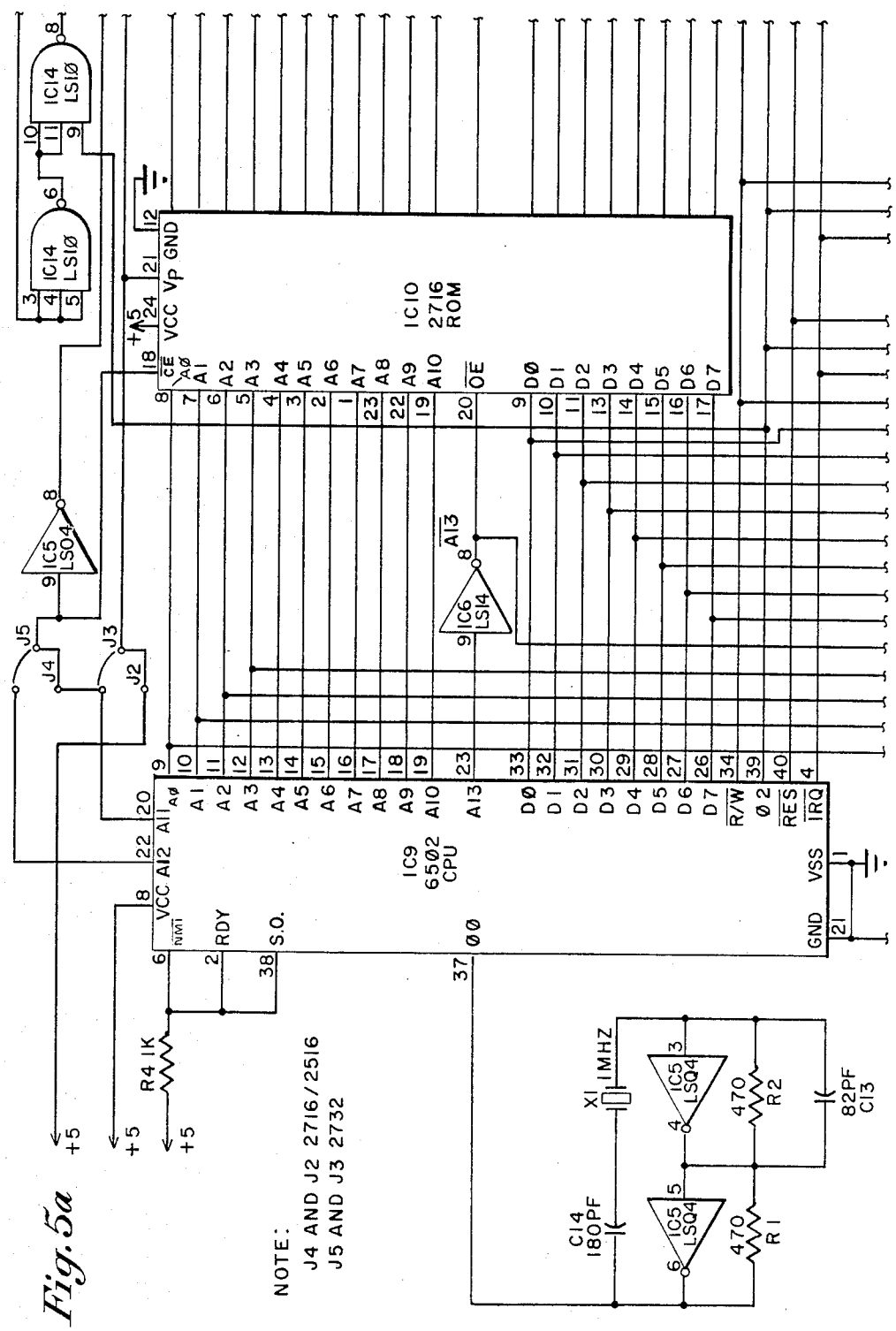
Figure 5B:
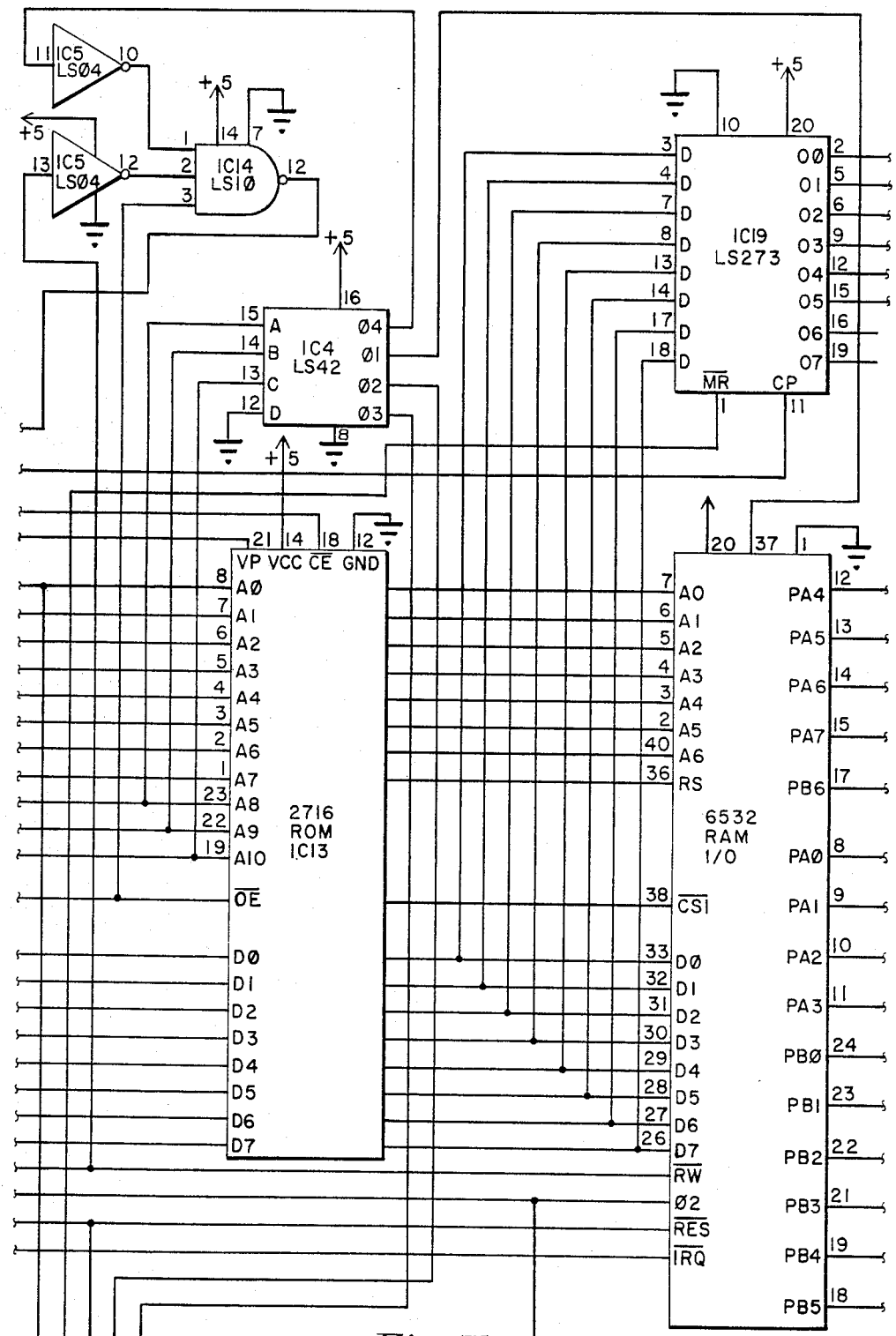
Figure 5C:
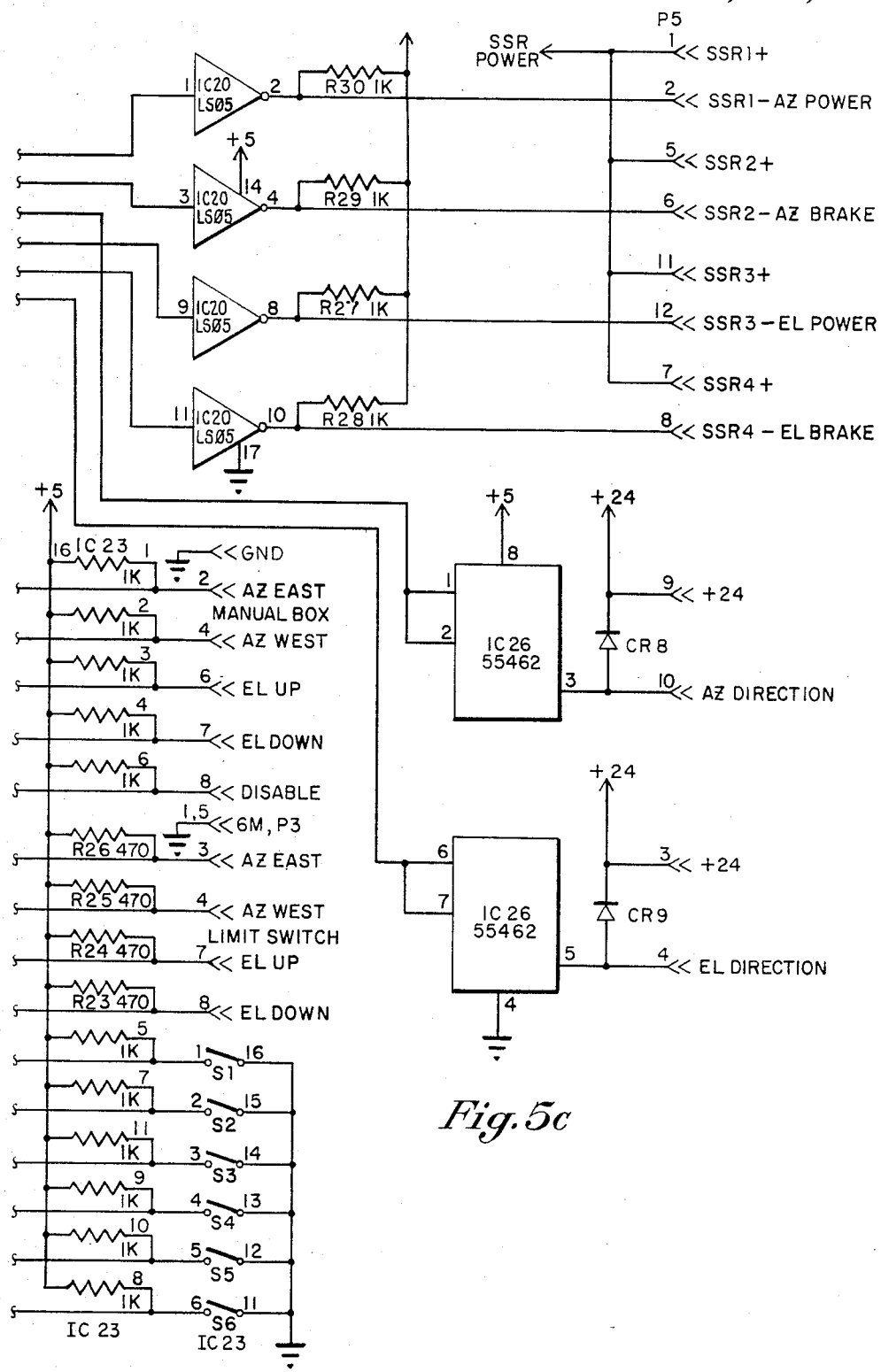

The 6502 CPU (central processing unit), FIG. 5a, microprocessor reads its instructions from the 2716 ROM, FIG. 5b, which controls its use of the other devices in the unit. The 2716 is also an erasable programmable read-only memory (EPROM) that allows a program to be written and saved in a single integrated circuit package which then can be erased and reprogrammed with a new program as it is needed. The 6502 uses the programmed instructions in the 2716 to control the functions of the 6522, 6532 and 6850 input/output (I/O) devices. As illustrated the 6522, FIG. 5d, versatile interface adapter (VIA) contains 16 I/O lines used to read the motor position counters, and a timer used to detect power line drop-out. The 6522 is also used to detect the power line frequency which controls some of the system timing.

The 6532 RAM, FIG. 5b, I/O, timer (RIOT) contains 128 bytes of random acess memory (RAM), 16 I/O lines and a timer. The RAM is used to store data from the 6502. The 16 I/O lines reads the controller address number, the limit switch status and the manual control inputs. The 6532 timer detects a false command transmission.

The 6850, FIG. 5e, asynchronous communications interface adapter (ACIA) is a serial (I/O) device which separates or recombines 8 bit bytes into or from serial format. This device is send to send and receive information to and from the central control computer.

Figure 5D:
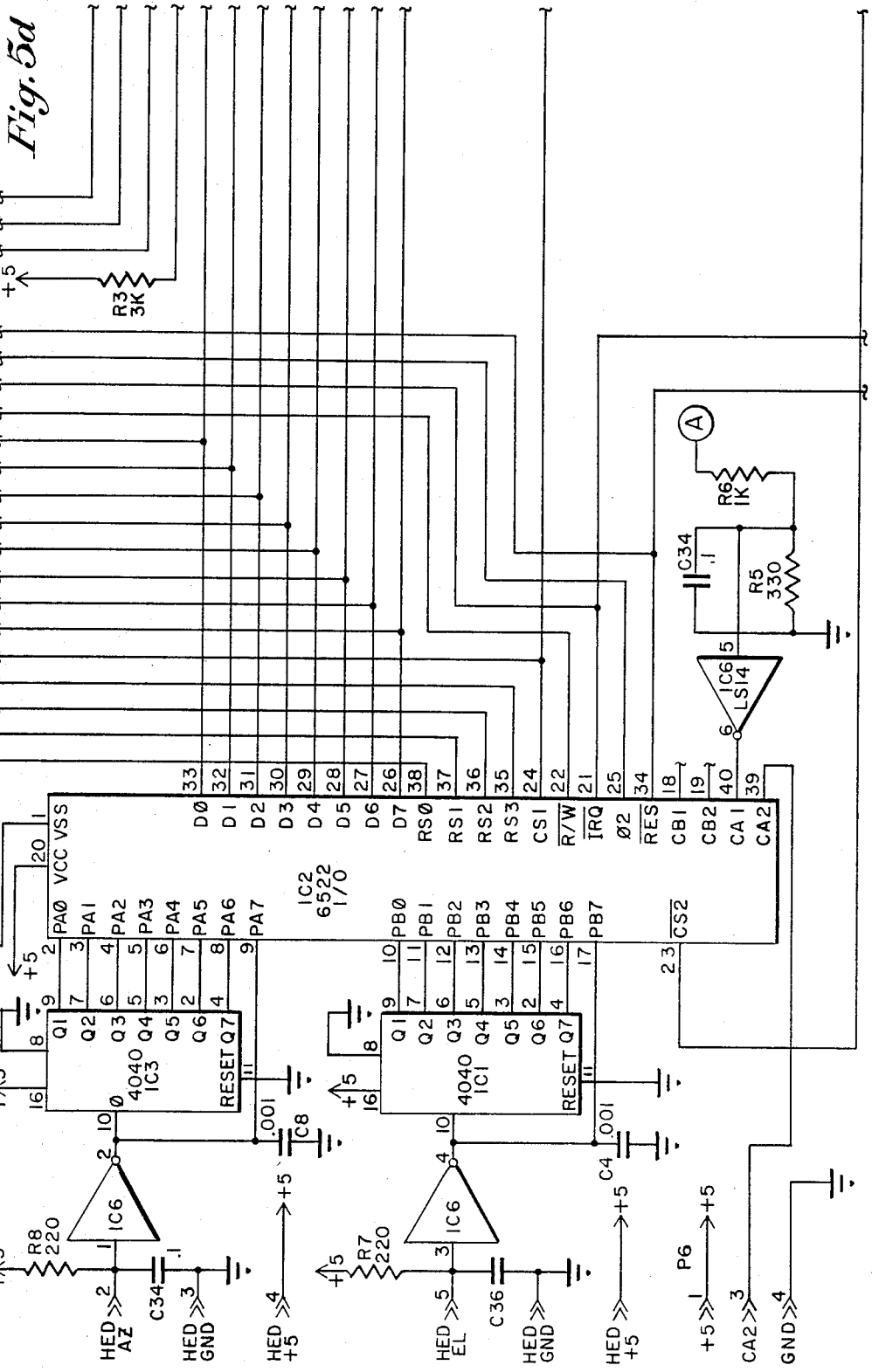
Figure 5F:
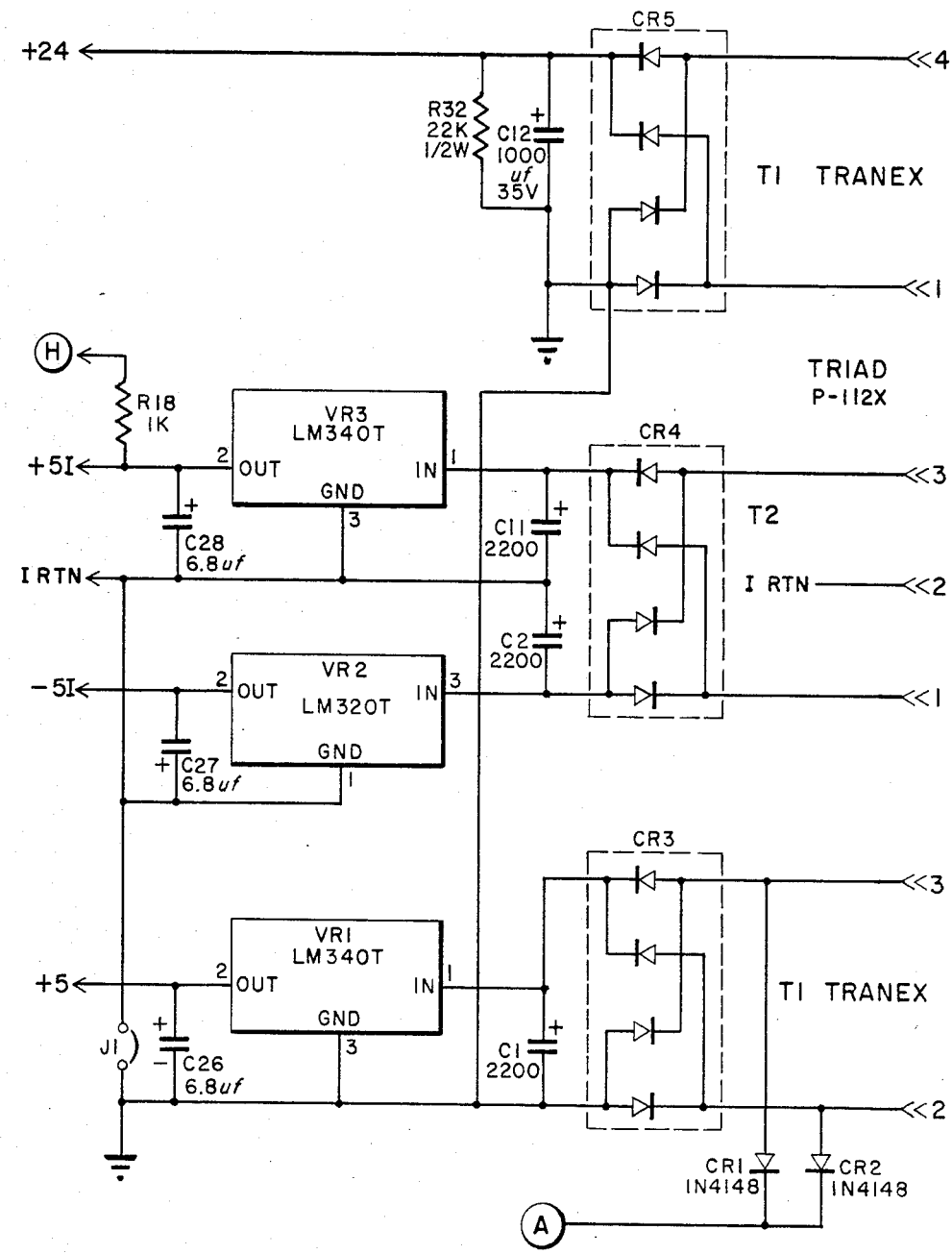
Figure 5G:
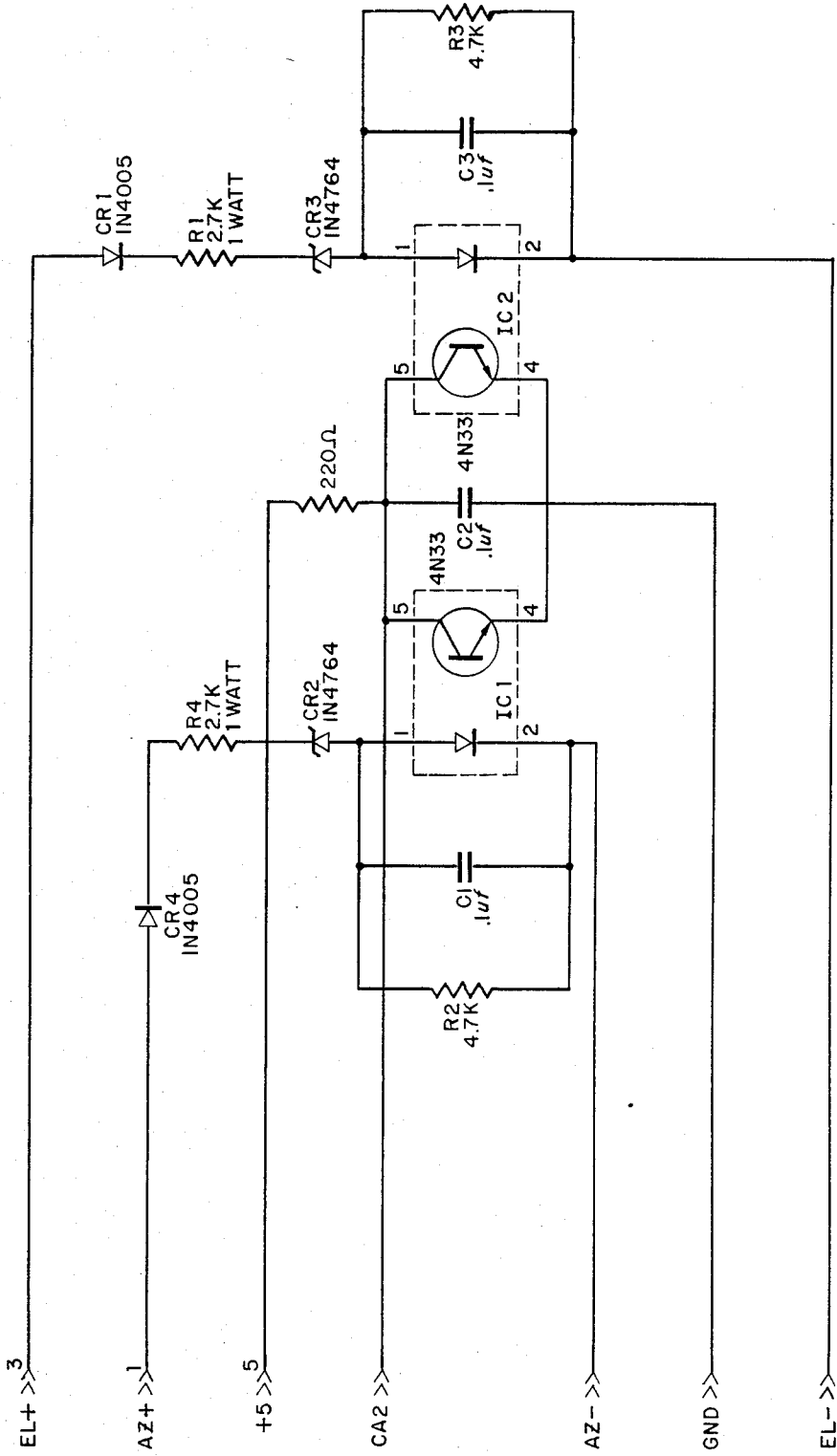
Figure 5H:
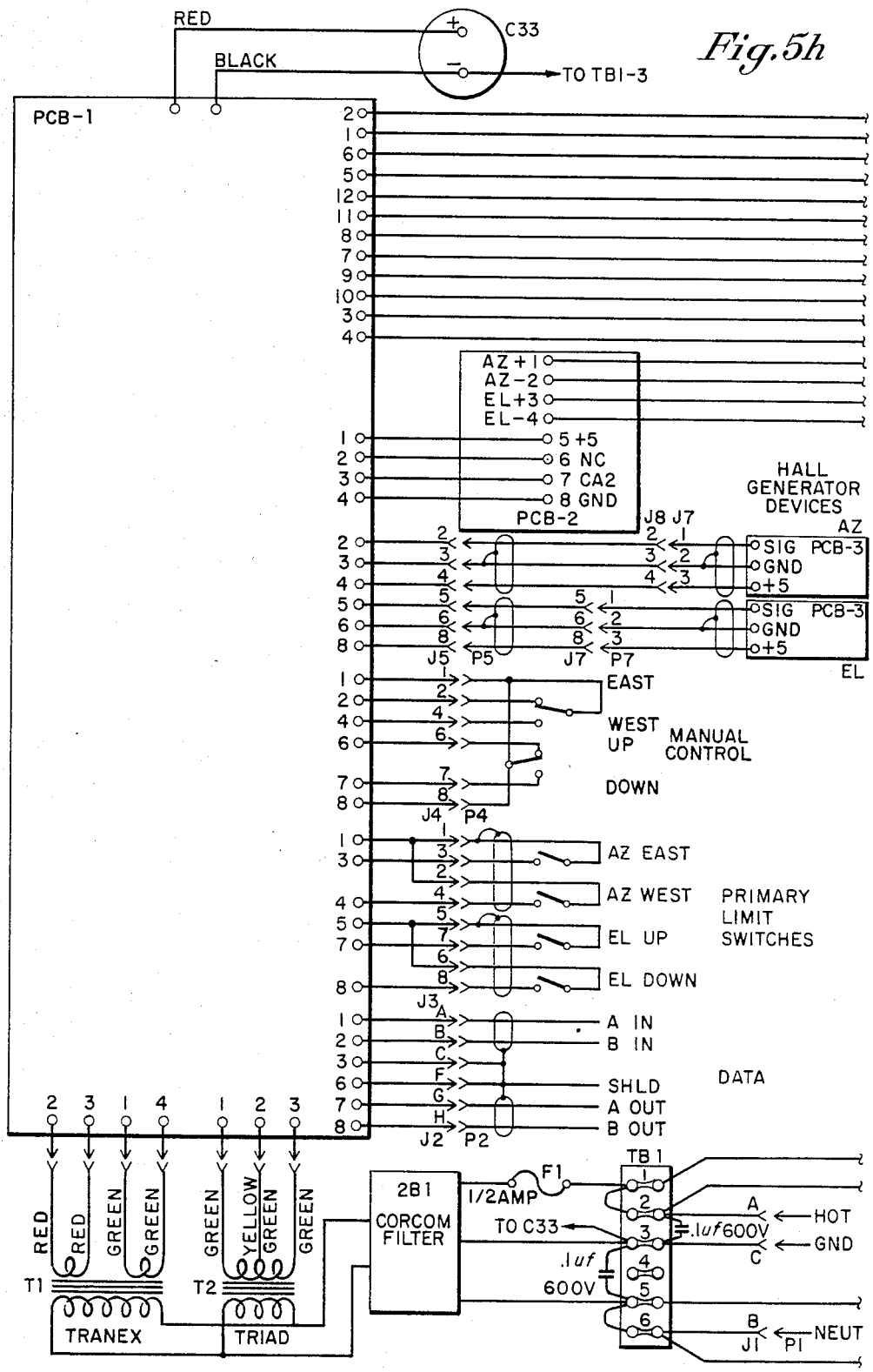
Figure 5I:
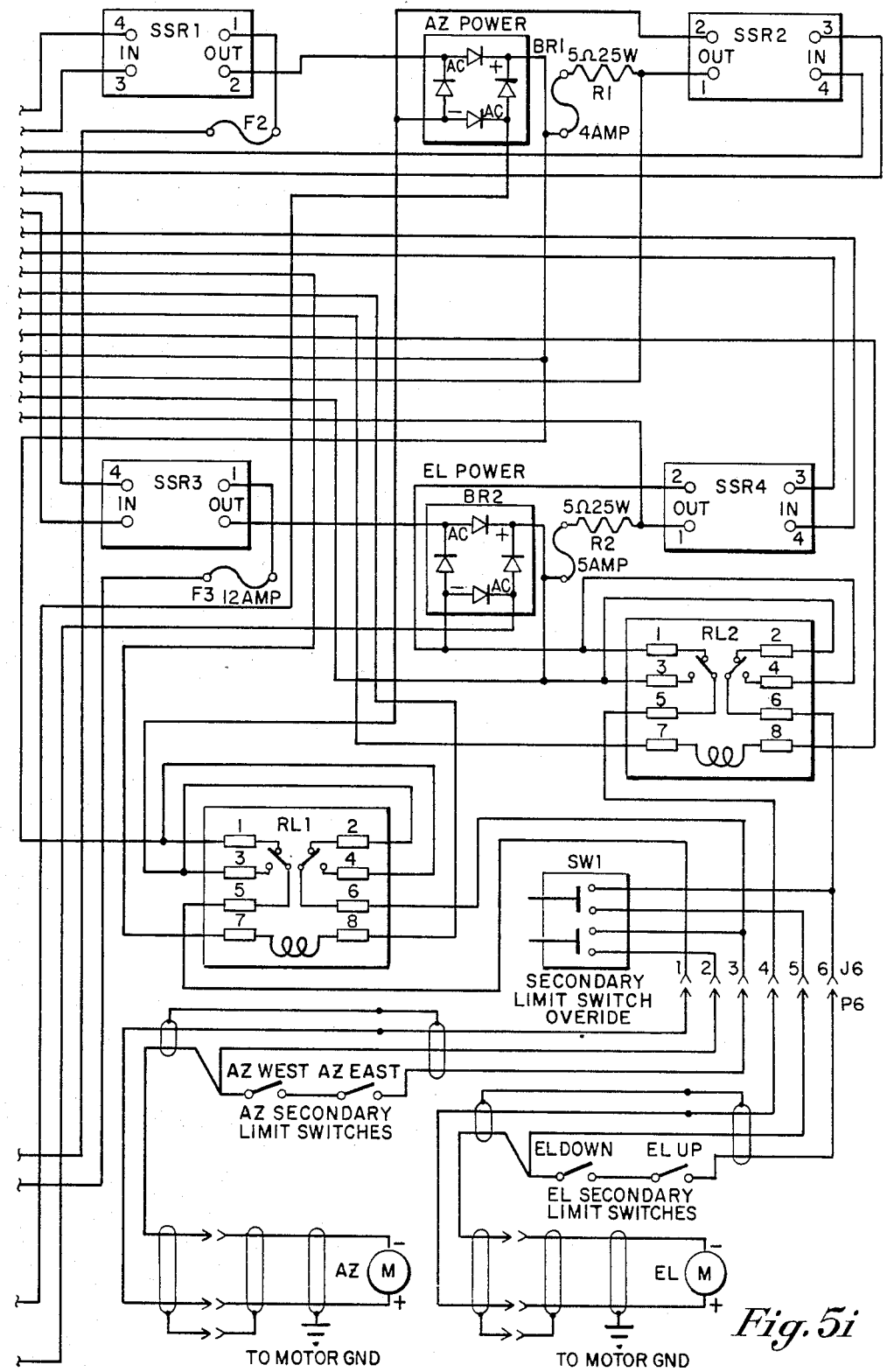
Figure 5J:
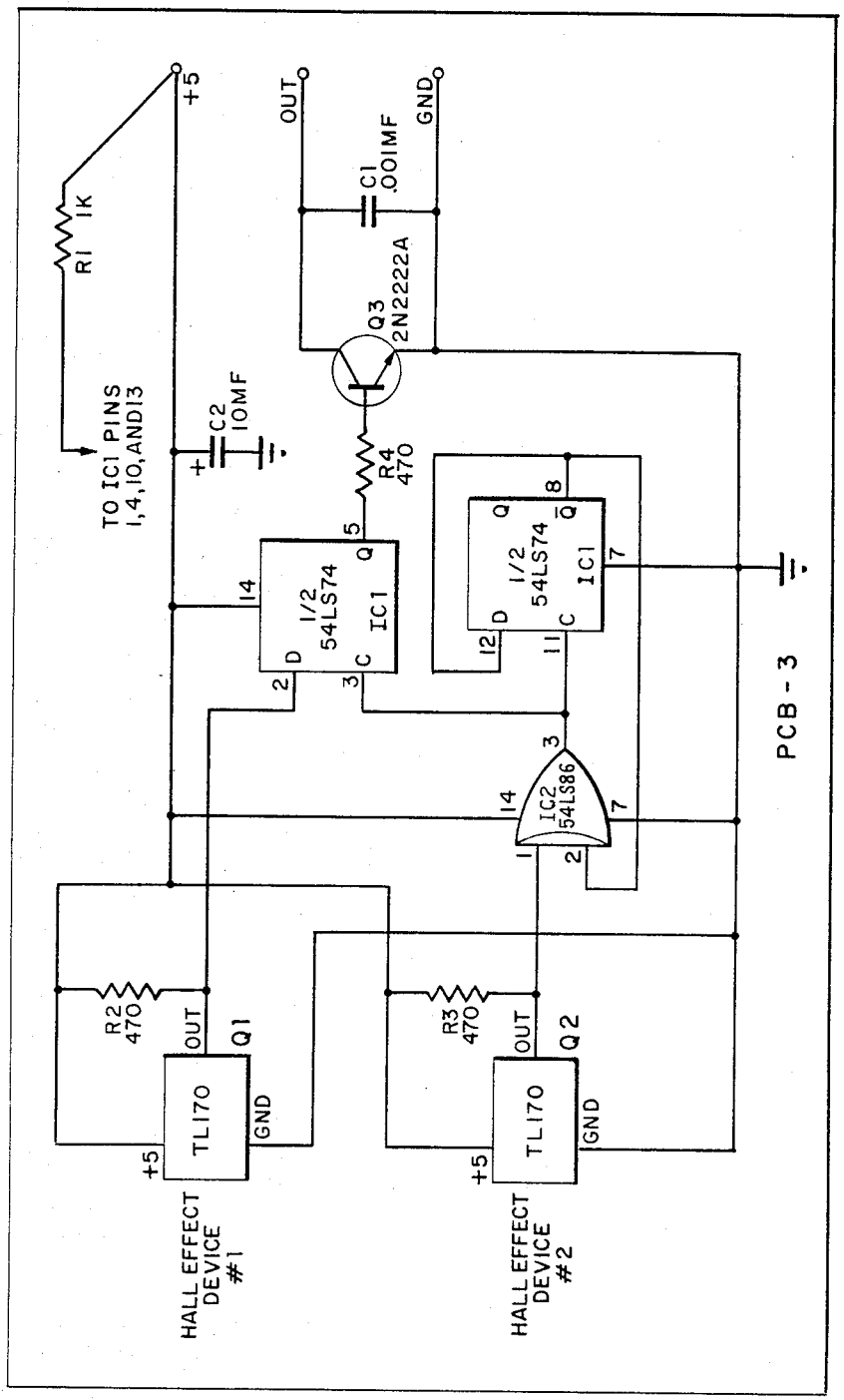
Figure 5K:
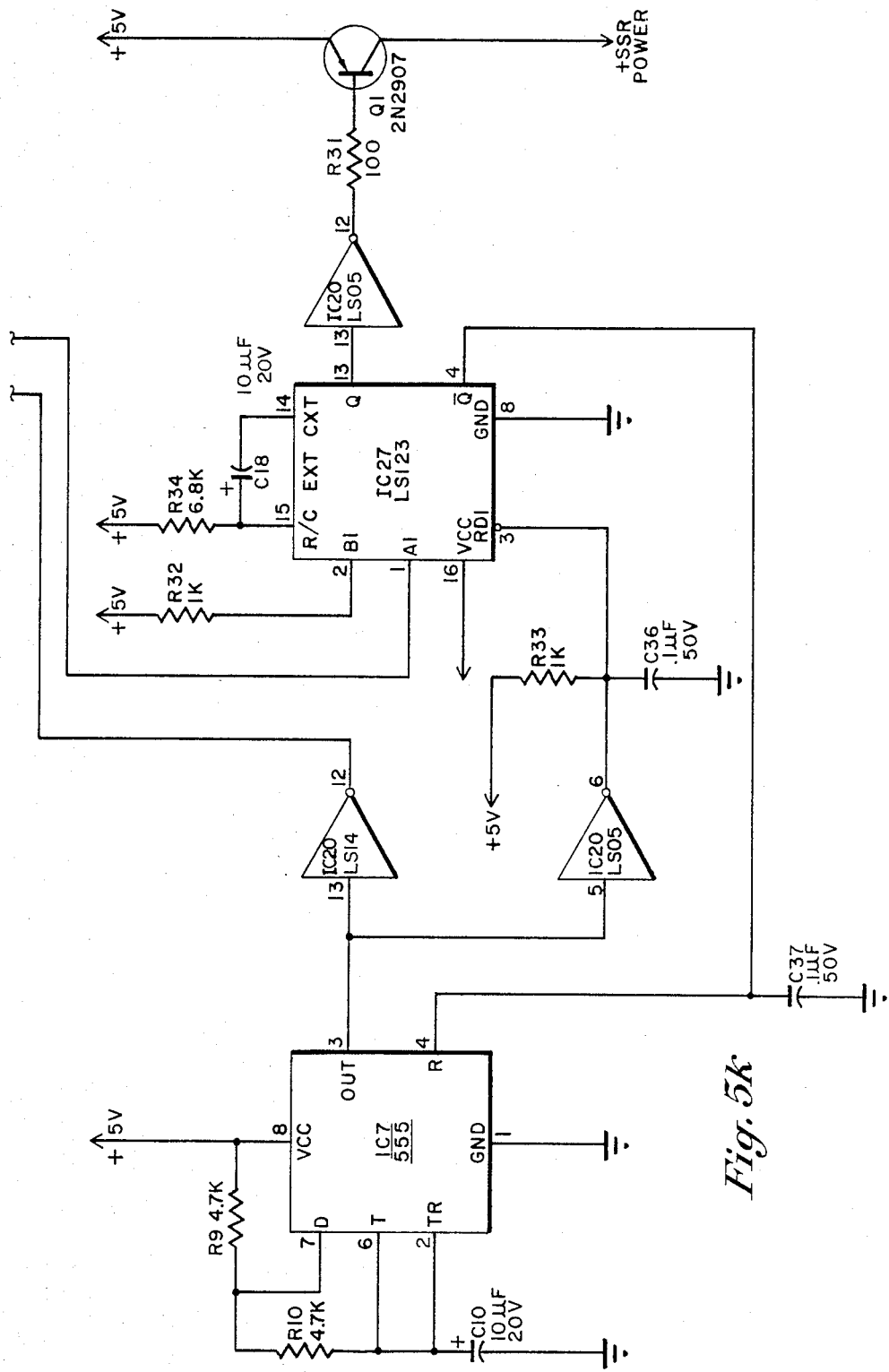

At power turn-on a reset signal is generated by the reset timer IC7, FIG. 5k. This signal initializes all of the circuitry to cause a controlled start of the microprocessor. When power is applied, watch dog timer IC27 enables the 555 reset timer IC7. When enabled, IC7 sets its output high and starts to charge C10 with current flowing through R9 and R10. When C10 reaches two thirds of five volts, the output is set low and IC7 starts to discharge C19 thru R10. The output of IC7 is inverted by a gate from IC6 and is then used as the RESET signal.

Watch dog timer IC27 is used to detect a microprocessor malfunction. When initially powered up, IC27 disables the SSR power by driving the input of one gate of IC20 low. This disables current flow through R31 and Q1. Q1 controls the supply of control power to the SSRs. RESET signal from IC7 and inverter IC20 also resets IC27 to disable SSR power. After RESET is set high the microprocessor starts running the program in IC13 which enables the 120 Hz (Hertz) interrupt. This interrupt triggers IC27 to enable SSR power. If the interrupt ever fails, IC27 disables SSR power and starts another RESET cycle. The timing cycle of IC27 is controlled by charging C18 through R34. IC27 is forced into a reset condition by R33 and C36 when power is turned on.

In the respective drawings, the values of the components and subassemblies in the circuits are shown on the face of the drawings to facilitate complying with the best mode required by statute.

The 6502, FIG. 5a, reads the instruction from the 2716 by setting address lines A0 through A13. This address requests a single memory location which is sent back to the microprocessor on data lines D0 through D7. The rate at which the 6502 reads its instructions is controlled by a one (1) megahertz (MHz) crystal controlled clock made from crystal X1, capacitors C13 and C14, resistors R1 and R2 and gates from IC5. Resistor R4 keeps the unused inputs of the 6502 pulled to a high logic state to prevent any false signals from affecting the microprocessor. Address lines A11 and A12 with jumpers J2 through J5 and one inverter from IC5 select either the ROM at IC10 or the ROM at IC13, FIG. 5b, and the ROM type, 2716 or 2732 (not shown). This allows four thousand instructions using two 2716 ROM's or eight thousand instructions using two 2732 ROM's. Address line A13 and one inverter from IC6 select either instructions ROM starting at HEX address E000 to FFFF or I/O and RAM starting at HEX 0100 to 04FF.

The I/O devices are selected using IC4, FIG. 5b, and address lines A8 through A10 and inverted address line A13. IC4 selects the 6532 RAM starting at HEX 0100 to 017F and 6532 I/O starting at HEX 0180 to 01FF. HEX address 0200 to 02FF causes IC4 to select the 6522 I/O device and address 0300 to 03FF selects the 6850 I/O device. Address 0400 to 04FF select the motor control latch IC19, FIG. 5b, by using a select signal from IC4 and IC14. IC14 combines the select signal from IC4 which is inverted by one gate IC5, Read/Write signal (R/W) inverted by another gate from IC5 and phase two of the clock signal to generate a write signal to the latch IC19.

The 6532 RAM is controlled by address lines A0 through A6, RAM select at pin 36 and the R/W signal. These signals determine which byte of data will be written to or read from on data lines D0 through D7. The I/O ports PA and PB are selected when the RAM select signal is held at a high logic state. I/O port A bits PA0 to PA3 which are pulled high with 470 ohm resistors R23, FIG. 5c, through R26, read the current status of the limit switches. Bits PA4 to PA7 which are pulled to a high state with 1k (one thousand ohm) resistors inside resistor pack IC23, FIG. 5c, read the manual control switches. Port B bits PB0 to PB5 which are also pulled high with resistors in IC23, read the heliostat identity address from switches at IC24. Port B bit PB6 which also pulled high with IC23, reads the manual control box disable input to determine if the manual controller is connected.

The 6522, FIG. 5d, is controlled by I/O register select signals RS0 through RS3. The eight bits of port A read the azimuth position counter IC3 and clock signal from one Schmitt trigger inverter in IC6. The input to IC6 is pulled up with resistor R8 and filtered with capacitor C34 and the output of IC6 is shaped with C8. The port B inputs read the elevation position counter IC1 and clock signal from another inverter in IC6. The input and output of this gate is also pulled up, filtered and shaped with R7, C36, and C4. CA1 interrupt input is sent a 120 Hz signal divided with R6, R5, filtered with C34 and shaped with IC6. Interrupt input CA2 receives a signal from Contact 3, the Solid State Relay (SSR) protection board PCB-2.

The 6850, FIG. 5e, ACIA is controlled by A0. This address line selects either the control or data registers that will be read from or written to on data D0 through D7. The rate that the 6850 transmits or receives data is controlled by counters IC11 and IC12. These counters divide the system clock by 208 to generate a frequency of 4800 Hz for 300 baud. Different connections can be made to change the baud rate from 300 to 4800. The counters are set at count value and then increment one count for each low to high change of the system clock. When the counter reaches its maximum count, the counter is then reloaded with the starting value. The load signal is controlled by inverter IC6. R11 pulls the unused inputs of IC11 and IC12 to a high state and R3, FIG. 5d, pulls the IRQ input line high.

Data from the main control computer (not shown) is sent in serial form across two wires to line receiver IC22, FIG. 5e. Resistors R21 and R22 convert the differential current to differential voltage. IC22 measures the difference in these signals and outputs a digital logic signal to the 4N33 optical isolator IC17. This signal when low causes current to flow through the Light Emitting Diode (LED) at a rate controlled by R16. The light from the LED turns on the transistor on the other side and with R17 generates a signal into inverter IC5. IC5 then sends the signal into the 6850 ACIA where it is then assembled into an eight bit data byte. Data from the 6850 is sent through isolator IC16 using R15 to control the LED current. The transistor in IC16 with R14 send the signal to the differential line driver IC21. R19 and R20 on the output of the line driver provide a balanced termination of the signal line. The RTS signal from the 6850 through isolator IC15, R13 and R12 control the line driver so only one heliostat controller is on the transmit line at a time. R18, FIG. 5f, pulls the unused inputs of IC21 and IC22 to a high state.

The LS273 latch IC19, FIG. 5b, is write only and requires only reset and write signals. At power tun on, the reset line sets all outputs low to disable the motors, motor brakes and direction relays. The output of the latch is controlled by the data written to it from the data lines D0 through D7. Output bits 00 through 02 control the azimuth motor and bits 03 through 05 control the elevation motor. Outputs 00 and 01 are buffered by open collector driver IC20, FIG. 5c. Output bit 00 turns on Solid State Relay 1 (SSR1) to apply power to the motor. Power to the motor comes from power terminal block TB1, FIG. 5h, through F2, FIG. 5i, SSR1 and bridge rectifier BR1. BR1 converts the 120 volt AC (alternating current) power to DC (direct current) power which is then applied to the motor through direction relay RL1. The secondary limit switches open the motor power circuit when the primary limit switch fails and power can then be reapplied by using the secondary limit switch override SW1. When motor power bit 00, IC 19, FIG. 5b, is turned off the motor brake bit 01 is turned on. This signal turns on the motor causing dynamic braking action to stop the motor quickly. Direction of the motor is controlled by bit 02. This signal is buffered by relay driver IC26, FIG. 5c. The relay driver turns on and off the relay current to open and close the motor direction relay. The relay reverses the direction of current through the motor. Diode CR8 prevents the kick back of the relay coil from damaging the relay driver when the current is turned off.

The elevation motor is controlled by an identical drive circuit using output bits 03 through 05 to control F3, FIG. 5i, SSR3, SSR4, BR2, and RL2. Power to the positive side of the SSR's is supplied through Q1, which is controlled by resistor R31 and one gate of IC20. This circuit delays the power to the SSR's until the driver circuits are reset.

Power to the controller is supplied through filter and fuse F1 to T1 and T2, FIG. 5h. The low voltage output of T1 is rectified by CR3, FIG. 5f, and filtered by C1 and C33, FIG. 5h. This voltage is then regulated by voltage regulator VR1, FIG. 5f, to five volts and then sent to the circuit. The five volt power lines are filtered by numerous bypass capacitors including C26. The low voltage output of T1 is also rectified by CR1 and CR2, FIG. 5g, to generate a 120 Hz signal that is used for some system timing. The high voltage output of T1 is rectified by CR5, FIG. 5f, and then filtered by C12 to provide DC voltage to the relays. Bleeder resistor R32 discharges C12 when power is turned off. The output of T2 is rectified by bridge CR4 and filtered by C2 and C11 to provide both a positive and negative power supply. The positive supply is regulated by VR3 and the negative supply is regulated by VR2 to generate stable positive and negative five volt power supplies. The outputs of these are filtered by C27 and C28 and are used by the differential line drivers and receivers, IC21 and IC22, FIG. 5e.

An SSR Protection Board PCB-2, FIG. 5h, measures the voltage across power resistors PR1 and PR2, FIG. 5i. If a fault in the circuit occurs and both the motor power and motor brake SSR's turn on, a large voltage will be placed across PR1 or PR2. PCB-2 detects this fault and sends a signal to the processor to turn off the power and indicate the fault to the heliostat control computer. The SSR Protection Circuit is illustrated in FIG. 5g. Voltage across power resistor PR1 is sent to a network on PCB-2 that decides if it is at normal or abnormal levels, as indicated in FIG. 5g. Current flows through the protection diode CR4, limiting resistor R4, Zener diode CR2, isolator IC1, and a filter made from R2 and C1. If the voltage is above 100 volts, for example, the Zener diode conducts and turns on isolator IC1. R2 and C1 prevent noise spikes from affecting the circuit. R4 limits the amount of current that one flow in the isolator and CR4 prevents damage to the circuit if it is not connected properly. The elevator side, or elevator motor, is the same except it uses CR3, R1, CR1, IC2, C3 and R3 in an identical circuit. When either side turns on, the transistors turn on using R5 and generate a digital signal to the processor.

The Hall effect encoder board uses two magnetically activated switches placed in position to produce two signals that are 90 degrees out of phase. Hall effect device Q1, FIG. 5j, pulled up by R2 send the first signal to D flip/flop IC1. Hall device Q2 pulled up by R3 send a signal to exclusive-or gate IC2. The signal from IC2 clocks in data at the D inputs of the flip/flops and transfers it to the Q outputs. The signal from pin 8 of IC1 is sent back to IC2 to invert the output signal. This causes a clock signal to be generated on both the rising edge and falling edge of the Q2 signal. This occurs in the center of the Q1 signal to generate a clear signal that is free from jitter on output pin 5. The output from pin 5 of IC1 is limited by R4 and sent to drive transistor Q3.

This signal is shaped by C1 and then sent to the controller electronics. R1 pulls the unused pins of IC1 to a high state. C2 filters the power to remove noise that would affect the circuit.

The control software for the apparatus of this invention is described in FIGS. 6-14. This software is designed for a combination of 6500 series components and standard digital electronics, and, as indicated hereinbefore, the use of a microprocessor allows changing the system to conform to any hardware configuration and communication protocol needed. The main purpose of the control software is to make use of hardware described hereinbefore and to accurately position two direct current motors to position a collector or heliostat in accordance with a command from a central computer.

The heliostat control software is divided into two sections: an interrupt driven and a non-interrupt driven section. The non-interrupt driven section is responsible for three major operations including initialization, command decode and manual operation. Initialization resets all internal registers and external hardware. Command decode converts the heliostat commands into motor movement or other system operations. Manual control monitors the Manual Box inputs to decide which direction the operator wants to move the heliostat.

The interrupt driven section is responsible for four operations including motor movement, communication, power fail and motor control malfunction. The motor movement and power fail sections are driven from a 120 Hertz signal derived from the input power. This signal synchronizes the control software to the input line frequency. This interrupt is the basis for all timing operations within the control software. The lack of this interrupt indicates the loss of power and measures are taken to shut down the system to prevent damage when power is restored. With each interrupt the motor position counters are read to determine motor position. A communication interrupt indicates that a command byte has been received, the communication has been interrupted or the transmitter is ready for another byte. A motor malfunction happens when a short circuit occurs in the motor control circuit and excessive current is detected in the brake circuit.

The following is a detailed description of the actual operation of the control software with reference to the respective FIGS. 6-14. Within these Figs. are a group of numbers which corresponds to line numbers in the source program listing included herewith as an Appendix. These numbers are also used hereinafter as reference numbers to aid in understanding the operation of the program. In accordance with conventional practice, the letters within the circles indicate departure and reentry points in the program.

Figure 6:
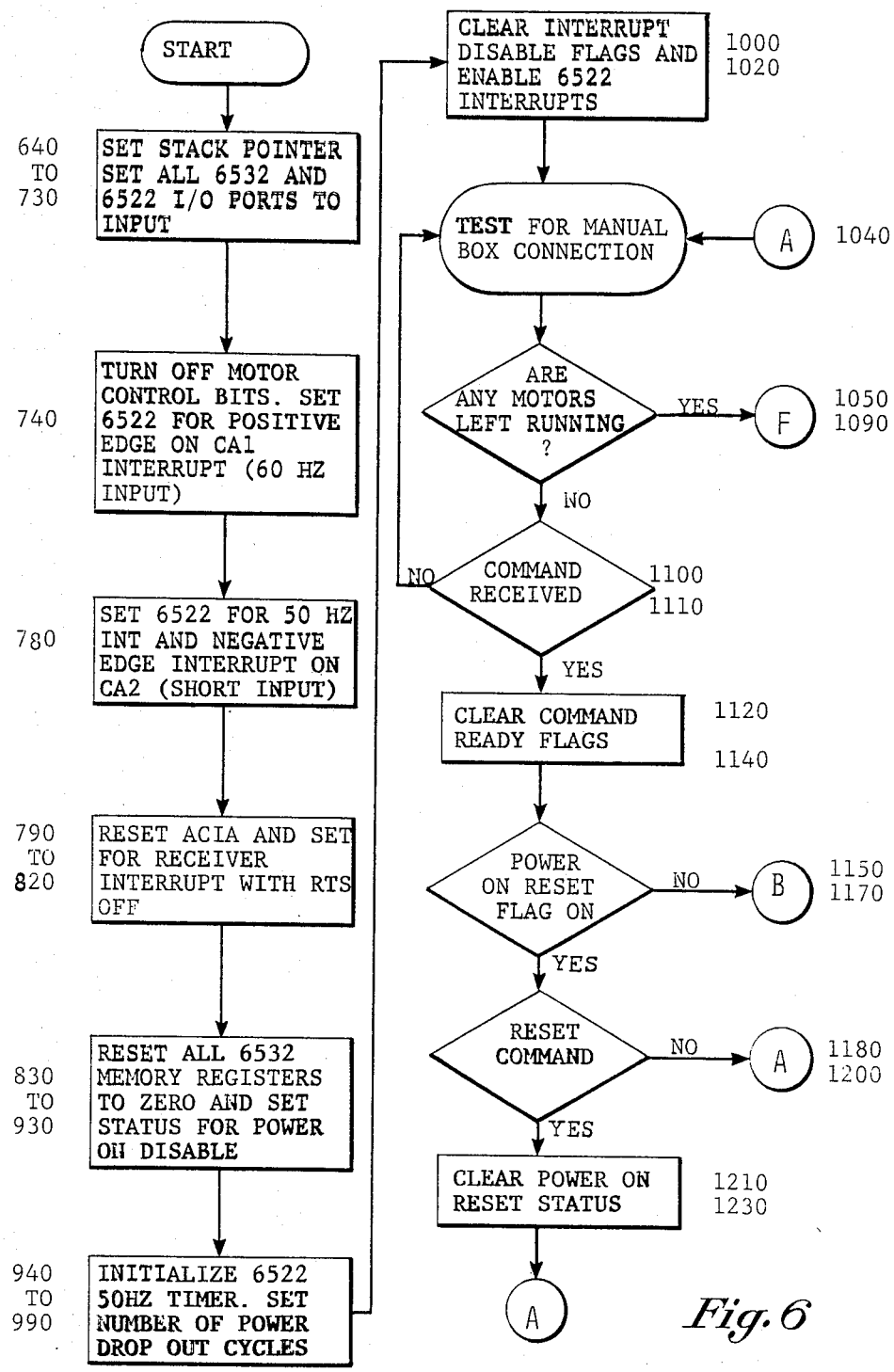
FIGS. 6-19 are flow charts for the program, or software for the controller, or micro-processor (u PROC), of the controller of FIGS. 2 and 5a-k.

From lines 640 to 820, FIG. 6 and Appendix A-1, the program initializes the hardware in the controller. When a subroutine or interrupt occurs, a return address is saved in memory. The point at which this address is saved is called the stack and the stack pointer is set to the top of the memory so that it does not interfere with the other registers used in the program. The I/O ports on the 6522 and 6532 chips are set for input and the motor control latch is reset to disable motor operation. Input pin CA1 on the 6522 IC is set for the positive edge interrupts. This pin is responsible for the 120 Hertz interrupt that synchronizes the motor operation with the line frequency. The 6522 T1 timer is set for a 100 Hertz interrupt that is used for detecting the loss of the 120 Hertz interrupt. Input pin CA2 on the 6522 is set for a negative edge interrupt that detects a short in the motor control electronics. The Asynchronous Communication Interface Adapter (ACIA) is reset and set for eight data bits and two stop bits. The ACIA is also set for receiver interrupt and the RTS output is turned off to disable the communication line drivers.

In lines 830 to 1020 in FIG. 6 and A-1, all used memory registers in the 6532 are reset to zero and the status byte is set for power on disable. The 100 Hertz timer is set with its count value and the number of power drop out cycles is set to four. The interrupt disable flag in the 6502 microprocessor is reset to allow interrupts to start and the 6522 interrupts are enabled.

Lines 1040 to 1230 form the main loop of the program when the controller is waiting for a command and the motors are not running. The manual box routine is called to test for Manual Box connection. If the Manual Box is "on" then the program will stay in the routine until the box is disconnected. A test is made to see if any motors are left running after the manual box is removed and if they are the program jumps to a loop to wait for them to stop. If no motors are running then a test is made on the command ready bits. If a command is not ready the program jumps back to the Manual Box subroutine call. When a command is ready the command ready bits are reset and the command decoding begins. If the status indicates power on disable, a test is made for a reset command. Otherwise, the program continues on to decode the rest of the command. When a reset command is sent then the status register is cleared and the program jumps back to the start.

Figure 7:
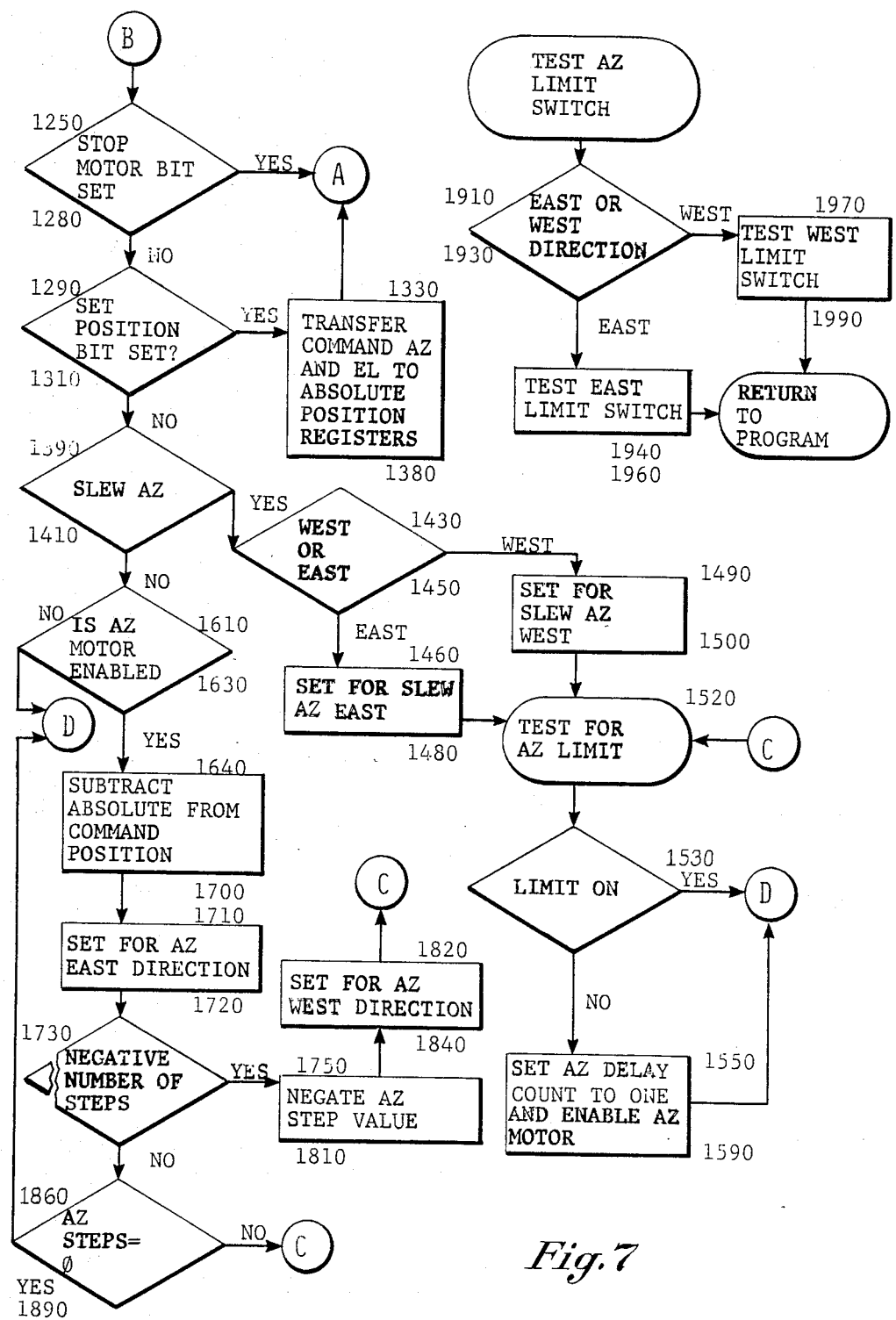

In lines 1250 to 1380, FIG. 7 and A-1, A-2, the program decodes the command for stop motor and set position. A stop motor command will not be used because the motors must be off and the program discards it. A test is then made for set position and if detected the commanded position is transferred to the the absolute position registers and the program returns back to the main loop.

At lines 1390 to 1590 and 1910 to 1990, FIG. 7 and A-2, the program decodes the command for slewing the azimuth axis and, if so, which direction. If a slew azimuth command is detected then a test is made for which direction. A slew WEST command sets the AZSTAT register byte for WEST and a slew EAST command sets the register for EAST. With the direction bit set a test is made to see if the controller is going to drive into a limit switch. If a limit in that direction is on, the program continues on to elevation command decode. With the limit off then the AZDELAY byte is set to a dummy value and the AZ motor is enabled. The test is made by testing only the limit that is in the direction that the motor is moving.

At lines 1610 to 1890, the program decodes the track azimuth command. If the AZ motor enabled bit is not set in the command, then the program continues on to the elevation tests. With the AZ motor enabled bit set, the absolute position is then subtracted from the commanded position. The result is the number of positions to move and the direction is set for EAST. If the result is positive then a test is made for a result of zero. If the result is zero, then the program continues on to the elevation command decode section. Otherwise, the program jumps to the limit switch test described in the slew azimuth section. A negative result must be converted to a positive result and the direction changed to WEST.

Figure 8:
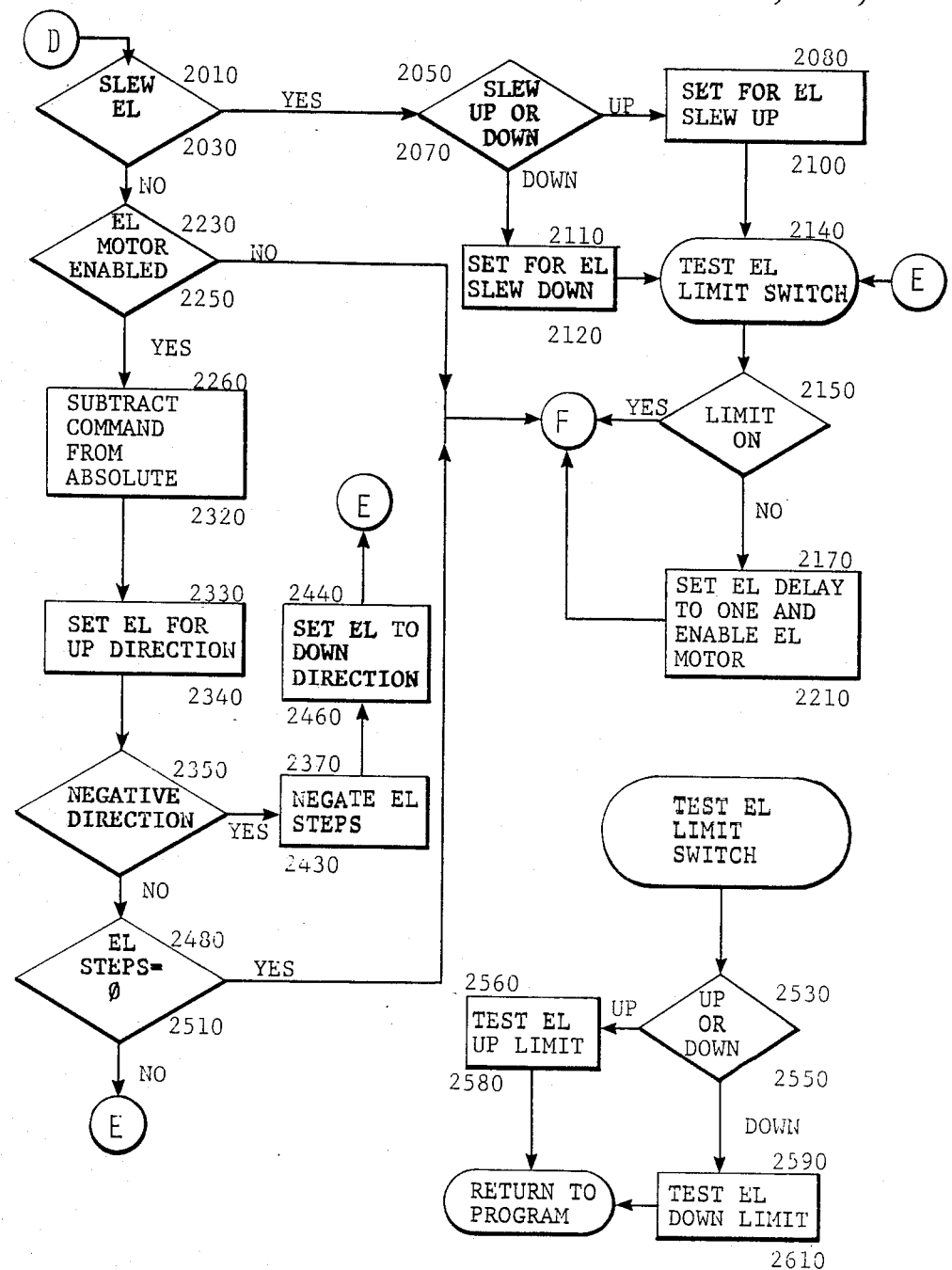

At lines 2010 to 2610, FIG. 8, the program decodes the elevation commands and is the same as the azimuth section except different bits are tested, set, reset and the directions are UP and DOWN rather than EAST and WEST. This is for the final part of the command decode section. After testing for elevation commands, the program continues on to wait for the motors to stop.

Figure 9:
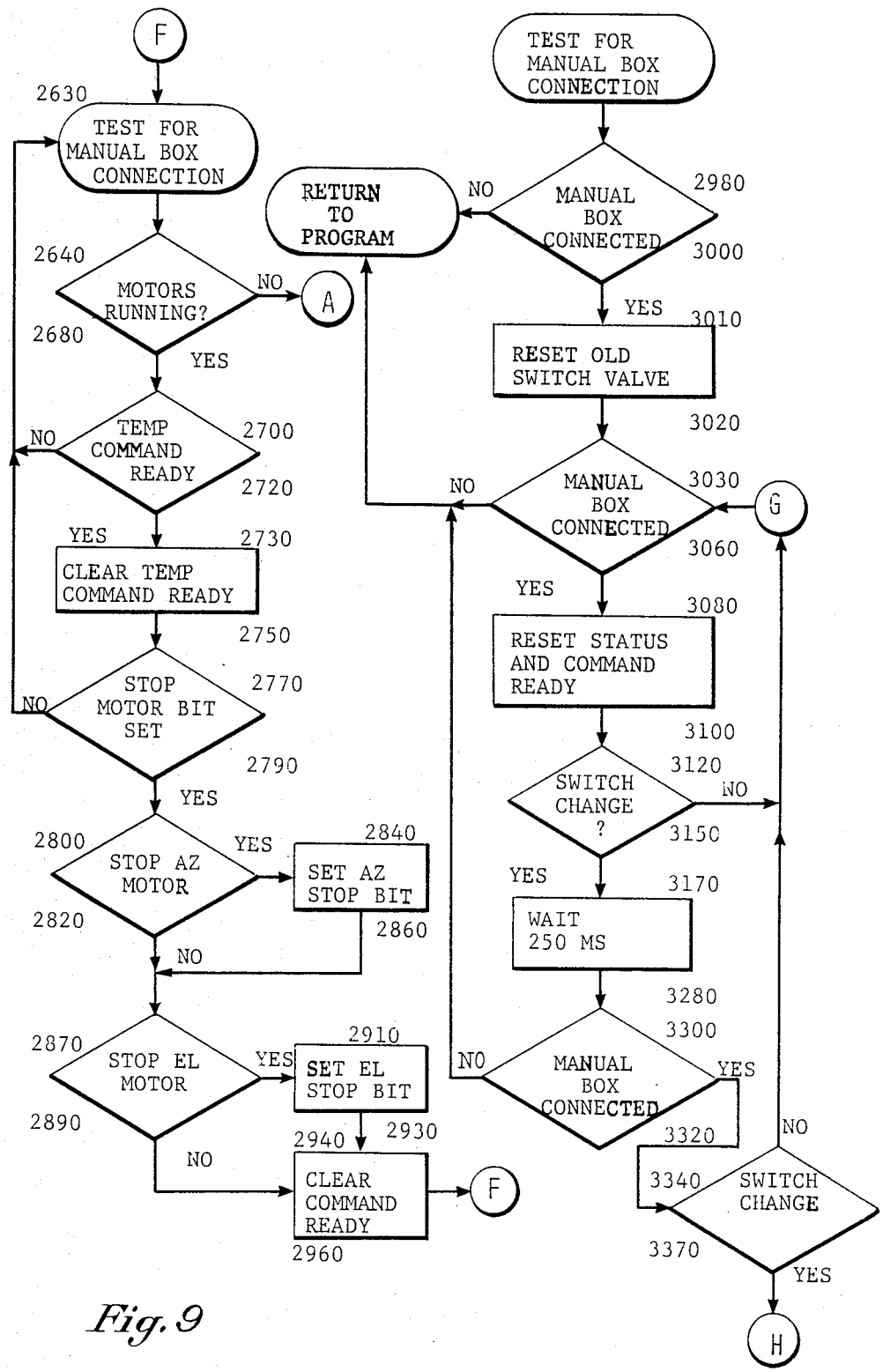

In lines 2630 to 2960, FIG. 9 and A-3, the program waits for the motors to stop and while the motors are running, a test is made for stop motor commands. At the start of the wait loop the Manual Box subroutine is called. If either motor is still running, then a test is made on the temporary command ready bit. Otherwise, the program returns to the start of the command wait section. If a command is ready, then the temporary command ready bit is reset so that is is not retested. This allows commands other than stop motor commands to be left for the command decode section when the motors stop. If the stop AZ motor bit is set, then the stop bit is set in the AZSTAT byte and if the stop EL bit is set, then the stop bit is set in the ELSTAT byte. After the stop bits are tested, then the command ready bit is reset, canceling further command decoding.

The lines 2980 to 3380 form the Manual Box subroutine that is called in two places to detect the presence of the Manual Box. If the Manual Box is not connected, then the program returns to the point from which it was called. When it is detected, the old switch value is reset to stop the motors before the actual switch value is read. The next loop waits for the Box to be disconnected from the controller. If it is still connected, the status byte is cleared and the command ready bits are reset because the Manual Box overrides all control functions. A test is then made to detect a difference between the old switch value and the new switch value. When a change is detected, a 0.25 second delay is initiated to allow the reading to stabilize. Another Manual Box connection test is made to allow the Manual Box to be disconnected with the motors running. With the Box still connected, another switch change test is made to check for a false reading and if there is a true switch change detected, the switch value is saved in a temporary register.

Figure 10:
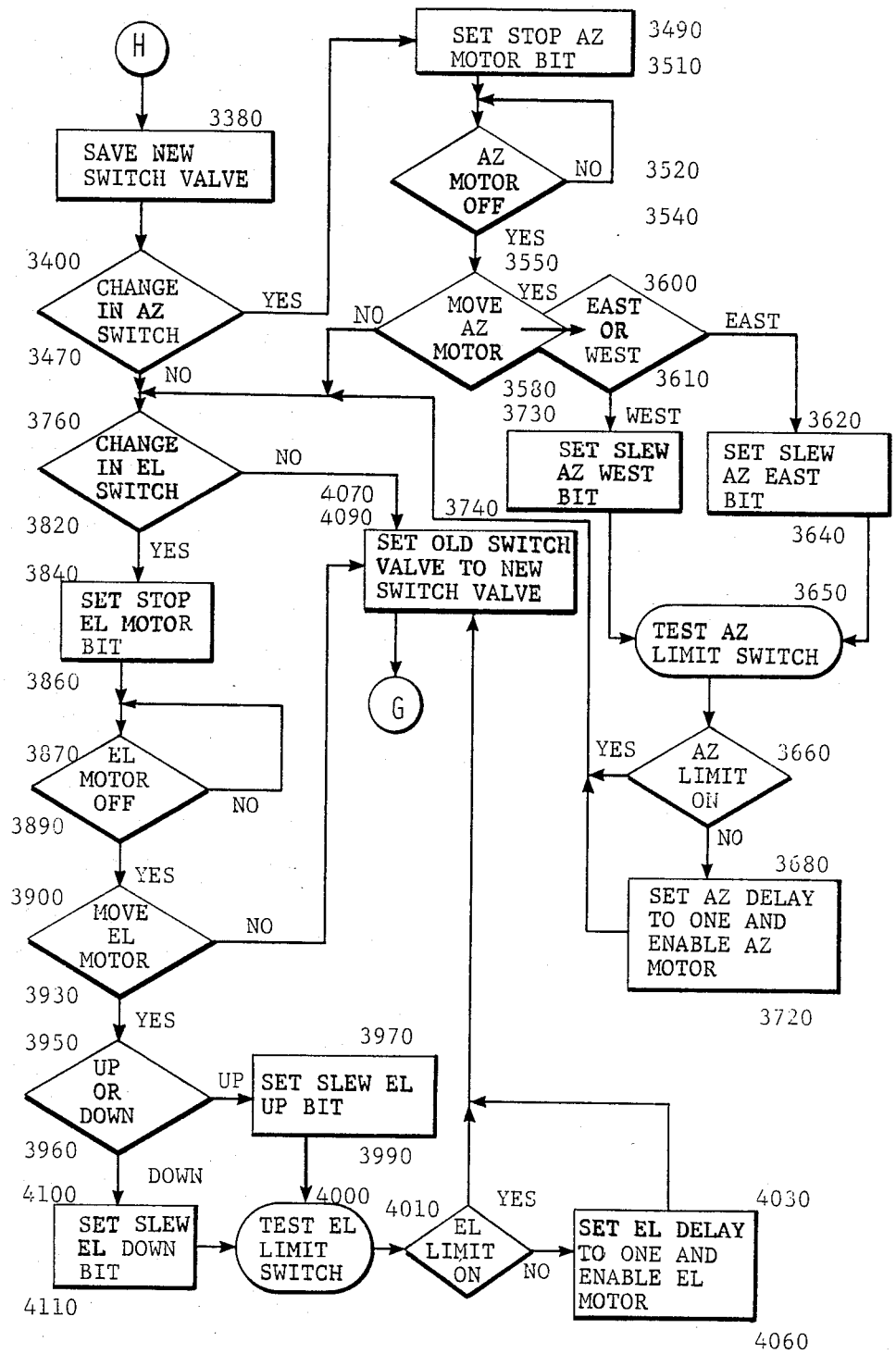

At the lines 3400 to 3740, FIG. 10, the program decodes the azimuth switch on the manual box. A test is made to determine if there was a change in the azimuth switch and if not then the program continues on to decode the elevation switch. If a change was detected, then the stop bit is set in the AZSTAT byte and then the program waits for the motor to stop. When the motor stops, a test is made to determine if any further movement is required. If either direction is not detected, the program continues on to the elevation decoding. If EAST is detected, then the slew EAST bit is set in the AZSTAT byte. If WEST direction is detected, the slew WEST bit is set. A test is then made for limit switch activation and if none is detected then the AZ motor is enabled.

At the lines 3760 to 4110, running onto A-4, the elevation switch decode is the same as the azimuth switch decode except a different switch is tested and the elevation motor is moved UP and DOWN. After the elevation switch is decoded, the new switch value becomes the old switch value that is used to test for a switch change. When that is done, the program jumps back to the test for Manual Box connection.

Figure 11:
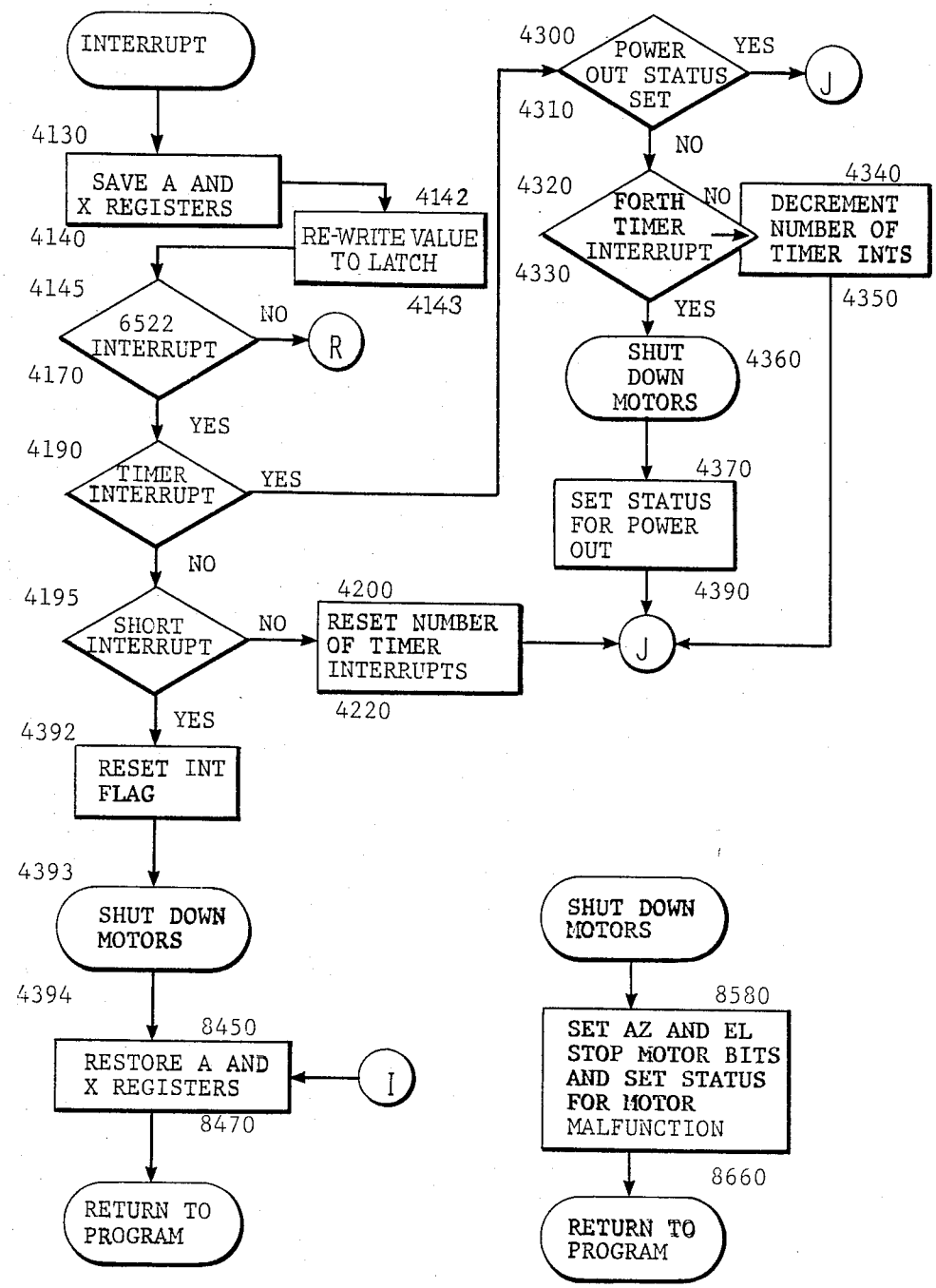

At three sections of lines 4130 to 4190, 4300 to 4390 and 8580 to 8660, FIG. 11 and A-4, the program decodes the first part of the interrupt response and also detects power drop out. When an interrupt occurs, the A and X registers in the microprocessor are saved in memory so that the microprocessor can be returned to the state it was in before the interrupt happened. If the 6522 did not cause the interrupt, then the program jumps to the communication interrupt routine. The 6522 has three possible interrupts, starting with the timer interrupt. If it is not the timer interrupt then the program jumps to the next section to decode motor malfunction or 120 Hz interrupt. A timer interrupt indicates the loss of main input power and measures must be taken to prevent controller damage. If the power out status has been set then the program skips to the motor control section; otherwise, it tests to see if this is the fourth timer interrupt. Four timer interrupts indicate that the power has been out for two complete 60 Hz cycles. If not then the number of cycles left is decremented and the program continues to the motor control section. After four timer interrupts the shut-down motor routine is called to stop the motors and the status byte is set for power drop out. The program then continues to the motor control section. The motor shut-down routine sets the stop motor bits in the AZSTAT and ELSTAT control bytes and then returns to the point from which it was called.

At lines 4195 to 4220, 4392 to 4394 and 8450 to 8470, FIG. 11, the program decodes the 120 Hz interrupt, stops the motors if a motor control malfunction is detected and restores the A and X registers in the 6502 microprocessor. If a 120 Hz interrupt occurs, the number of power drop out cycles left is reset and the program jumps to the motor control section. When a motor control malfunction occurs, the power to the motors is turned off to prevent damage. This is done by calling the shut-down motor routine described previously. The restore section is used by several parts of the program. Its function is to restore the A and X registers in the 6502 microprocessor to the state that it was in before the interrupt occurred. When this is done, the program returns to the place that it was before the interrupt.

Figure 12:
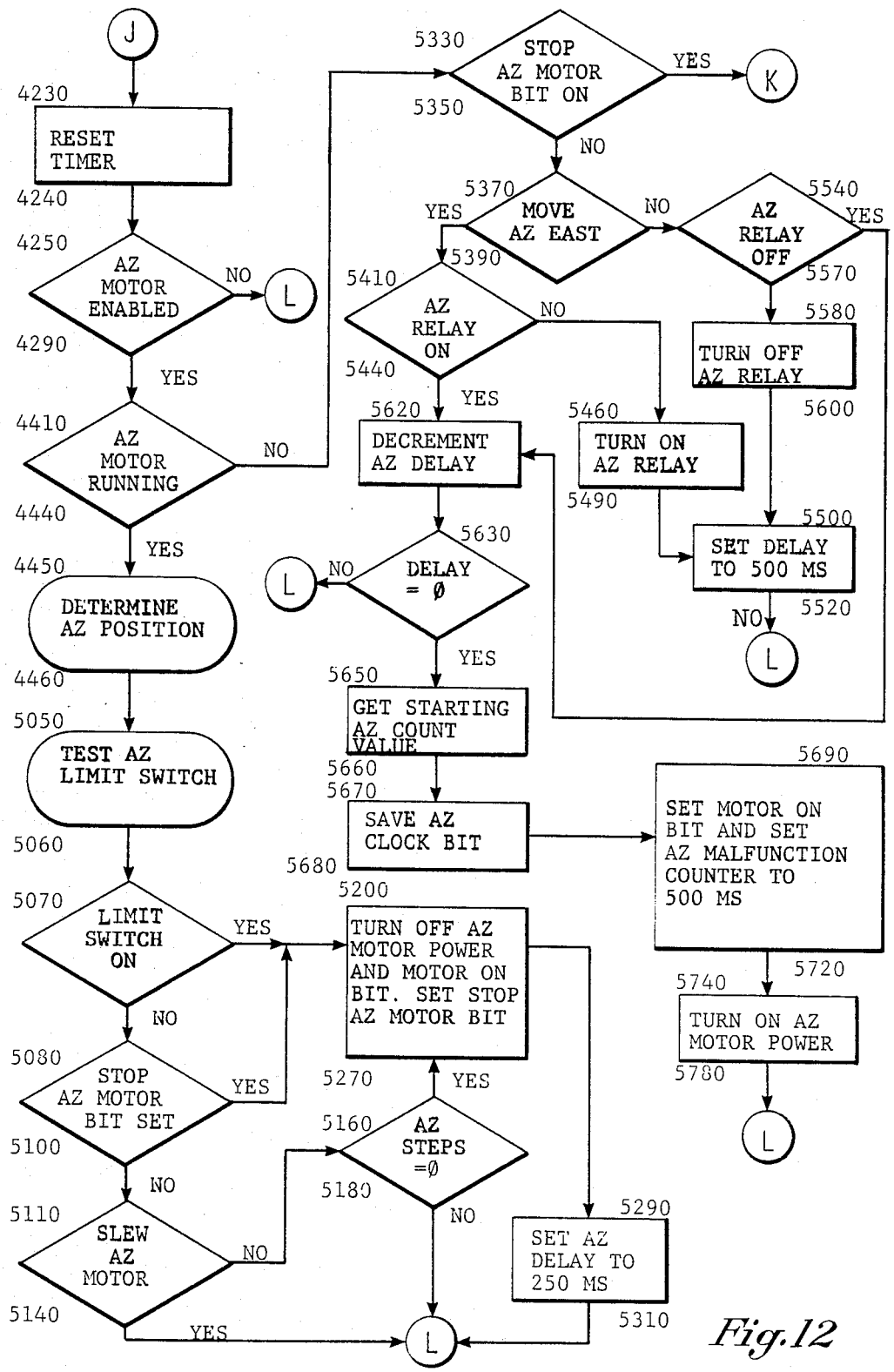

At lines 4230 to 4290, 4410 to 4460 and 5050 to 5310, FIG. 12, and onto A-5, the program keeps track of the AZ motor position when running and stops the motor when necessary. The first thing that is done is the 100 Hertz timer is reset for another 10 milliseconds.

If the AZ motor is not enabled then the program continues to the elevation motor test. If the AZ motor is not running, then it jumps to the section that tests to see if the motor is starting or stopping. When the motor is running a subroutine is called to read the AZCOUNT register to determine the current AZ position. The motor is stopped if a limit switch is contacted, the motor reaches position or the stop bit is set in the AZSTAT byte. If the motor is slewing, the motor stops only if it hits a limit switch or if the stop bit is set. If the motor meets none of these conditions, the program continues to the elevation motor control section. The motor is stopped by turning off the motor power SSR, resetting the motor on bit and setting the stop motor bit. The the AZDELAY byte is set for 0.25 second motor stopping time.

At lines 5330 to 5780, the program turns on and off, as called for, the AZ direction relay when the motor starts and gets the initial AZCOUNT value. If the stop motor bit is set then the program jumps to the section that stops the motor. If the motor direction is EAST then the direction relay is turned on and if the motor direction is WEST then the direction relay is turned off. If the relay has not been previously set, the AZDELAY byte is set for one-half second to let the relay open or close. If the relay has been set then the AZDELAY byte is decremented with each interrupt until the result reaches zero. When this happens, the AZCOUNT byte is read and the clock bit is saved. The motor on bit is then set and the motor malfunction byte is initialized to one half second. Motor power is then applied by setting the AZON bit in the motor control latch.

Figure 13:
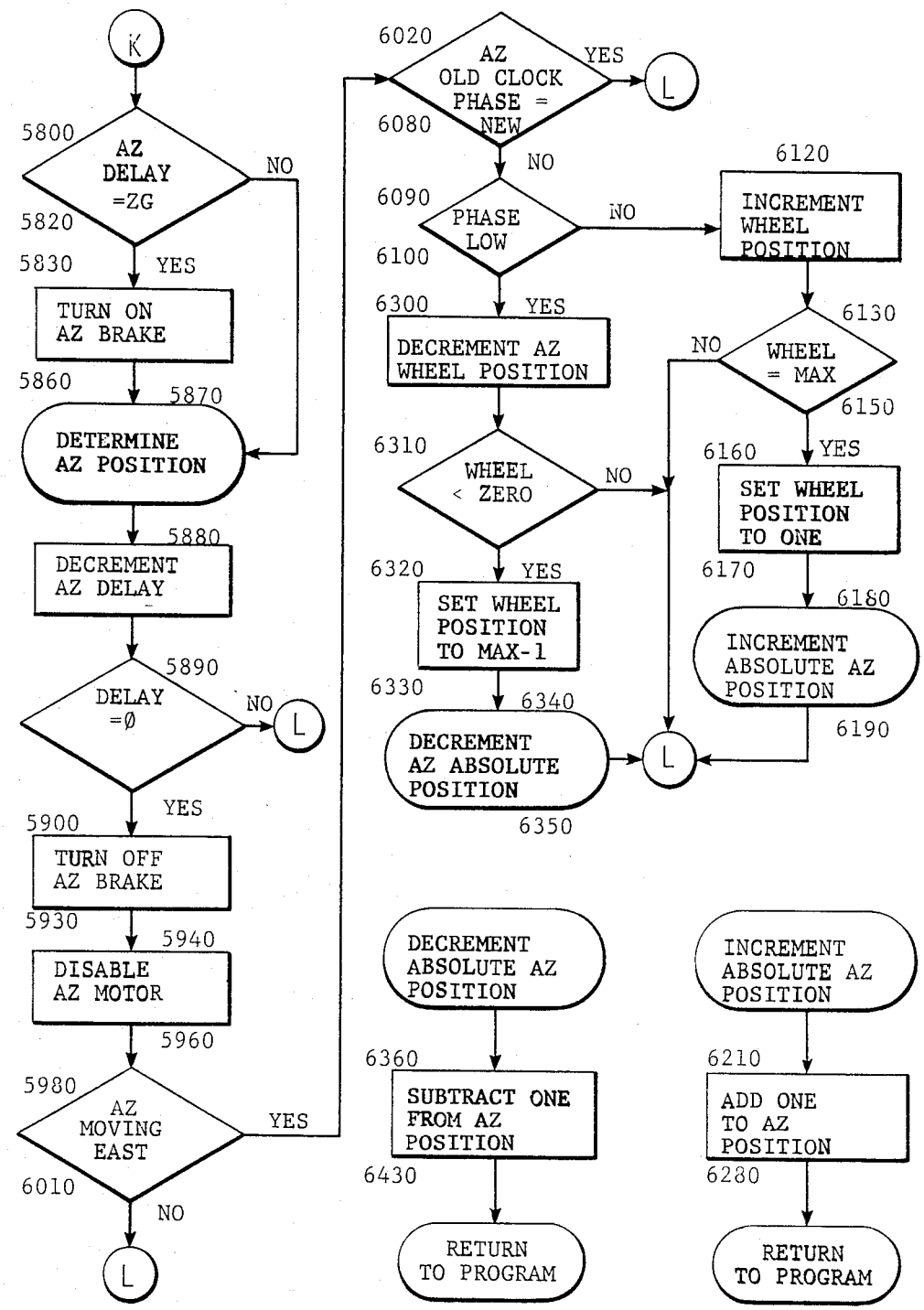

At lines 5800 to 5960, FIG. 13, the program controls the stopping of the azimuth motor. When the AZDELAY byte reaches 29, that count indicates that two interrupts have passed since the motor power was turned off and the brake may now be turned on. After that, the FINDAZ routine is called to determine the motor position when the motor is stopping. The AZDELAY is then decremented on each interrupt until the count reaches zero. When it reaches zero, the brake is then turned off and the AZ motor is then disabled. This is done to prevent the absolute motor position registers from being changed if the motor shaft is rotated by hand because the direction that it is being turned can not be determined.

At lines 5980 to 6430, the program compensates for reverse motor direction. If the AZ motor was moving EAST, then the absolute position may not be correct. This is caused by the Hall effect switch pulses being 180 degrees out of phase with the actual rotor position when rotating in the reverse direction. If the present clock phase is the same as the starting clock phase, then the position is correct and there is no need for compensation. If different, the AZWHEEL byte is incremented if the new phase is high and AZWHEEL byte is decremented if the new phase is low. If the AZWHEEL value reaches the maximum number of counts per position, then the AZWHEEL register is set to zero and the increment absolute position routine is called. If the AZWHEEL is decremented passed zero, then it is set to one less than the number of counts per position and the decrement absolute position routine is called. The increment and decrement absolute AZ position routines simply add or subtract one count from the sixteen bit value.

Figure 14:
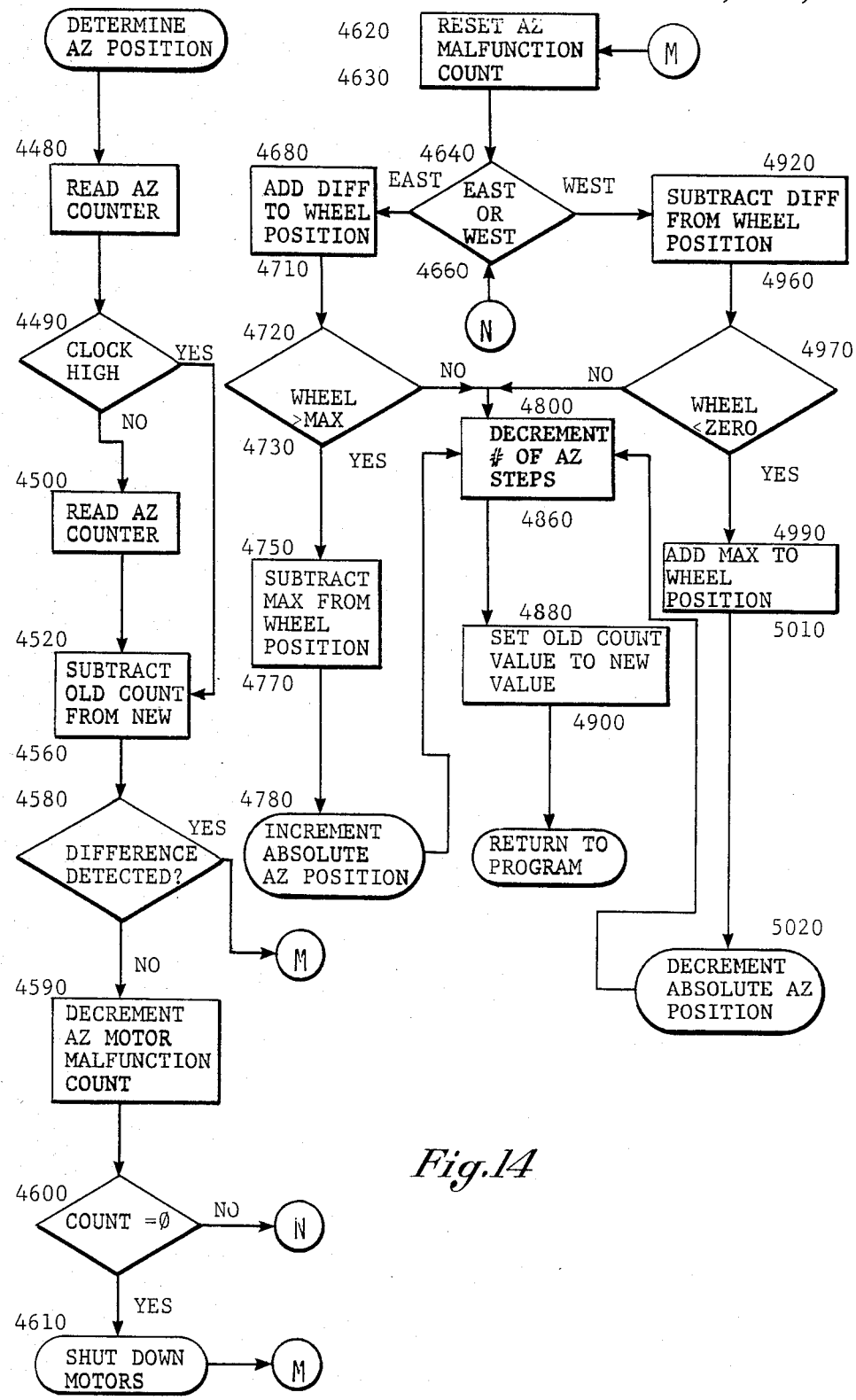

At lines 4480 to 5020, FIG. 14, and A-4, this subroutine determines the position of the azimuth drive motor. The AZCOUNT value is read in a special way because the microprocessor can read the 4040 counter fast enough that it can catch the counter in mid-count. If this happens, the value read is incorrect. When the first reading is made, a test is made on the clock bit to see if it is high or low. If it is high, the count must be valid. A low value on the clock bit indicates that the counter may have just started to register a count. When this is detected, a new reading is taken and the time between this reading the the last one allows the counter to finish counting. After a valid count is taken, the old count is subtracted from the new count to give the number of counts the motor moved. If the result is zero, then the AZ motor malfunction byte is decremented. If it reaches zero, then it indicates that the motor control electronics has a problem and it calls the shut-down motor routine. If the motor movement value is not zero the motor malfunction byte is reset to one half second. If the AZ motor is moving EAST, the value is added to the AZWHEEL byte. When the motor is moving WEST, the value is subtracted from the AZWHEEL byte. If the AZWHEEL byte becomes equal to or greater than the maximum count value, then the maximum count value is subtracted from it and the increment absolute position routine is called. IF the AXWHEEL byte value becomes negative, then the maximum count value is added to it and the decrement absolute position routine is called. When the AZWHEEL byte is finished being modified, the number of motor steps is decremented and the new AZCOUNT value is transferred to the old count value.

Figure 15:
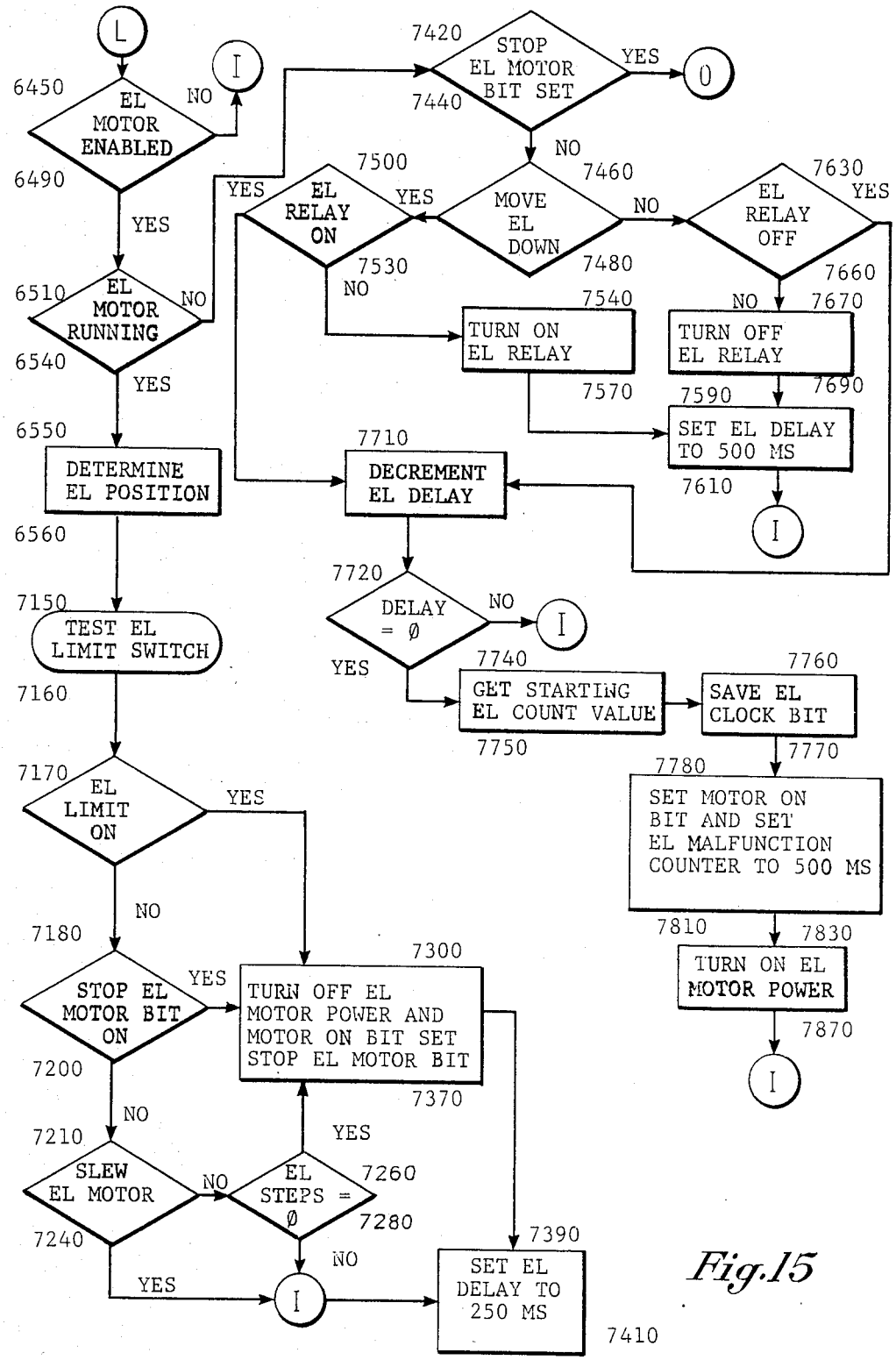
Figure 16:
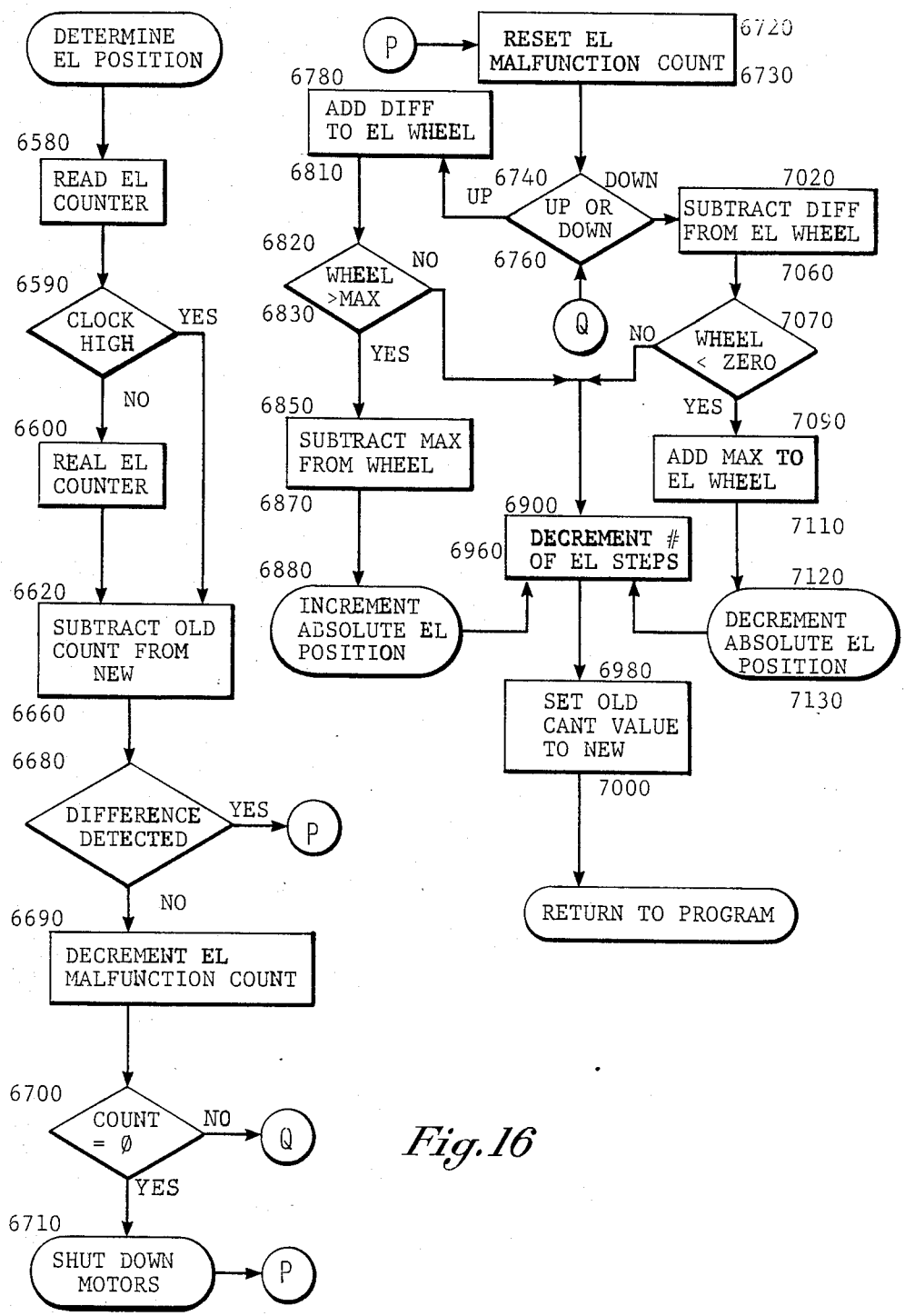
Figure 17:
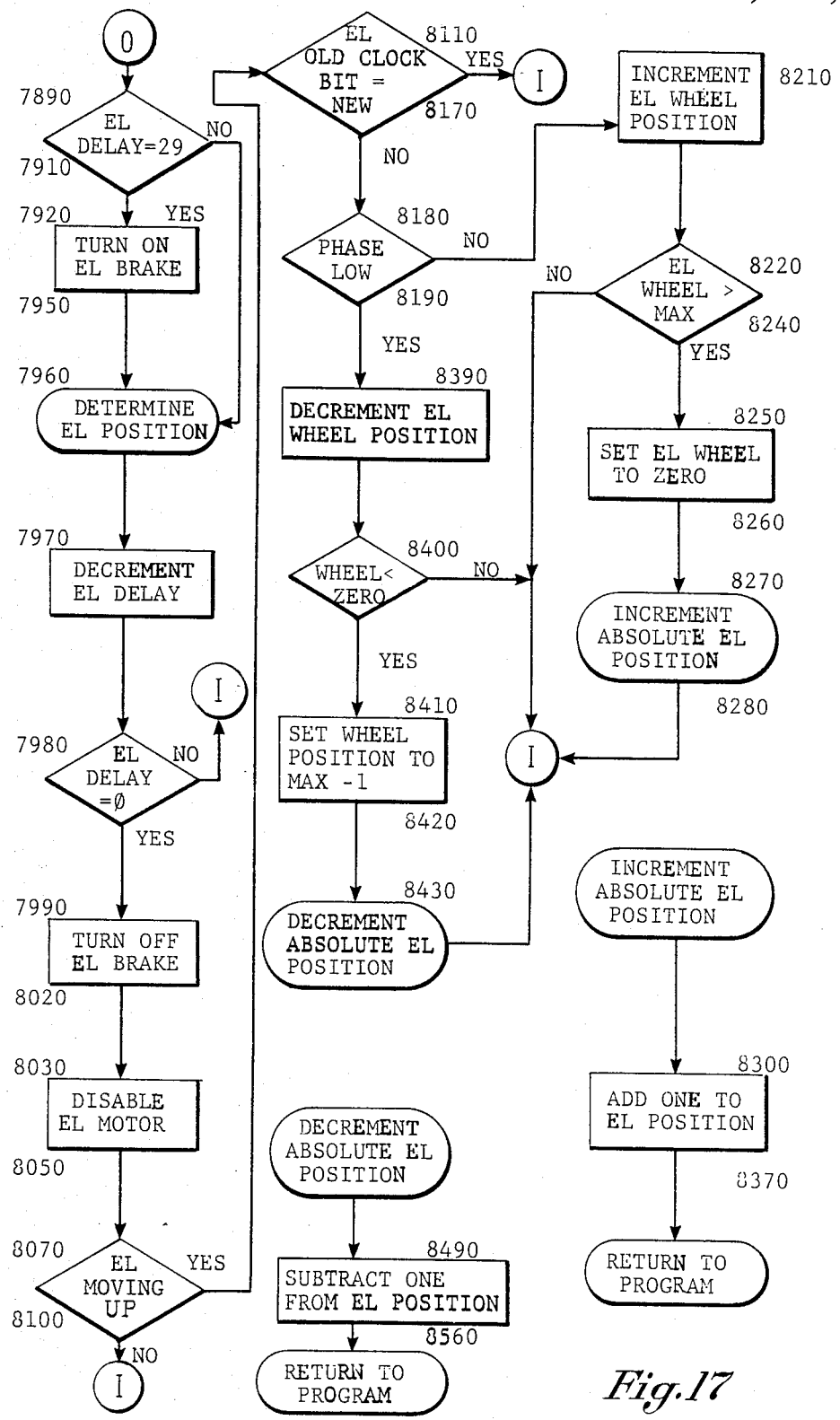

At lines 6450 to 7000, 7150 to 7410, 7240 to 7870 and 7890 to 8560; FIGS. 15, 16 and 17 and A-5, -6, -7; the program controls the elevation motor and is the same as the five previously described sections for the azimuth motor, except that elevation control registers are used. After the elevation control section, the program jumps to the restore register routine.

Figure 18:
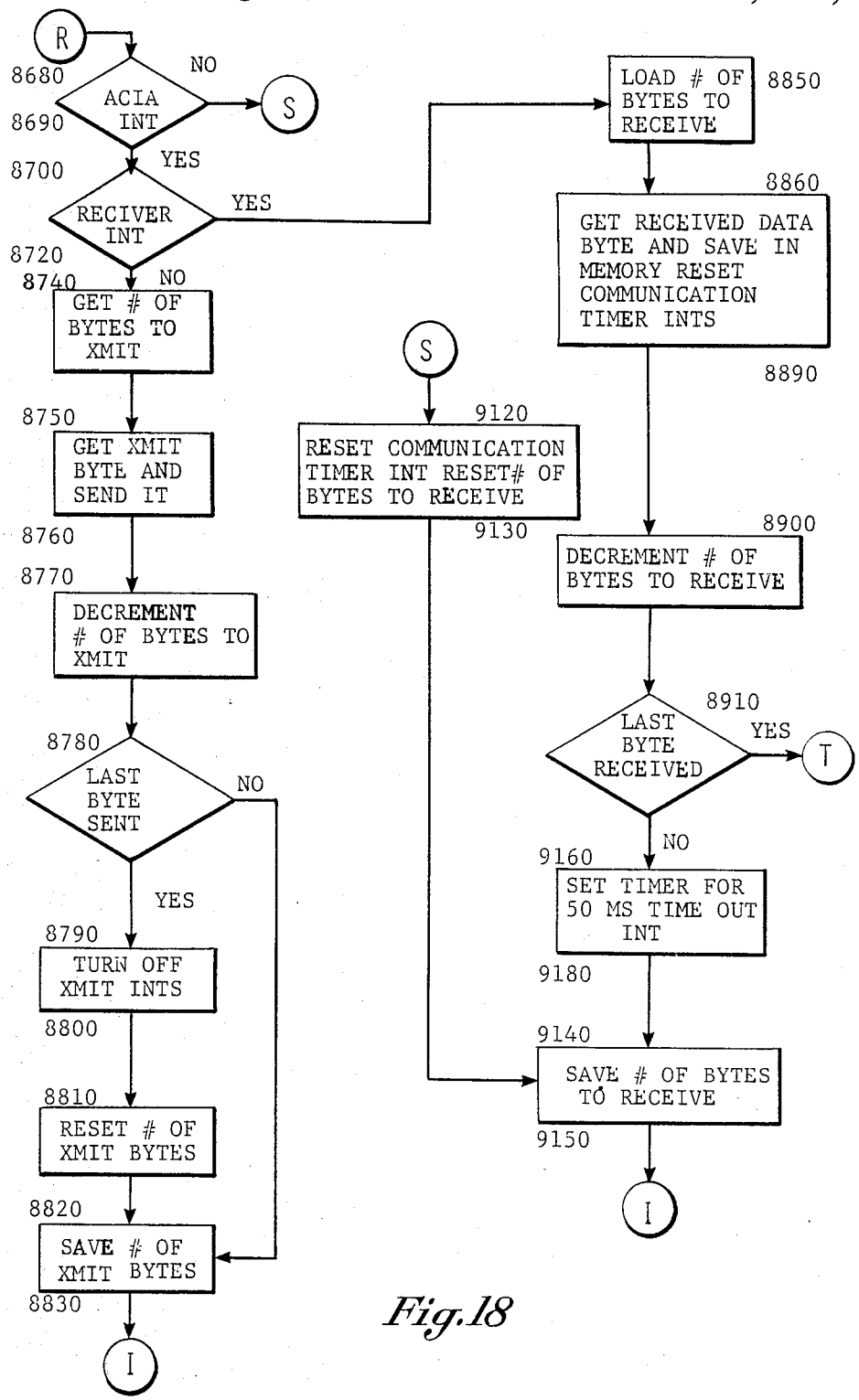

At lines 8680 to 8910 and 9120 to 9180, FIG. 18 and onto A-8, the program forms a communication section that receives and transmits information to and from the main control computer. A test is made first for an ACIA interrupt. If it is not the ACIA, then it must be the 6532 timer indicating the loss of communication. When this happens the number of bytes to receive is reset and the timer interrupt is disabled. When an ACIA interrupt occurs it is either the receiver or transmitter requesting service. If it is the transmitter, then the number of bytes to transmit is placed into the X register. A byte read from memory indexed by the X register is written into the transmitted data register. The number of bytes left to transmit is decremented and if the last byte has not been sent, then the number of bytes left is saved. On the last byte sent, the transmitter interrupt is disabled and the number of bytes to "send" is reset. With a receiver interrupt, the number of bytes to "receive" is placed into the X register. The received byte is read and then saved in memory indexed by the X register. The communication drop out timer is reset and then the number of bytes left to receive is decremented. If there are more bytes to receive, then the communication timer is set for a 50 millisecond interrupt and then the number of bytes to receive is saved. If the last byte is read then the program continues on to test for the correct address.

Figure 19:
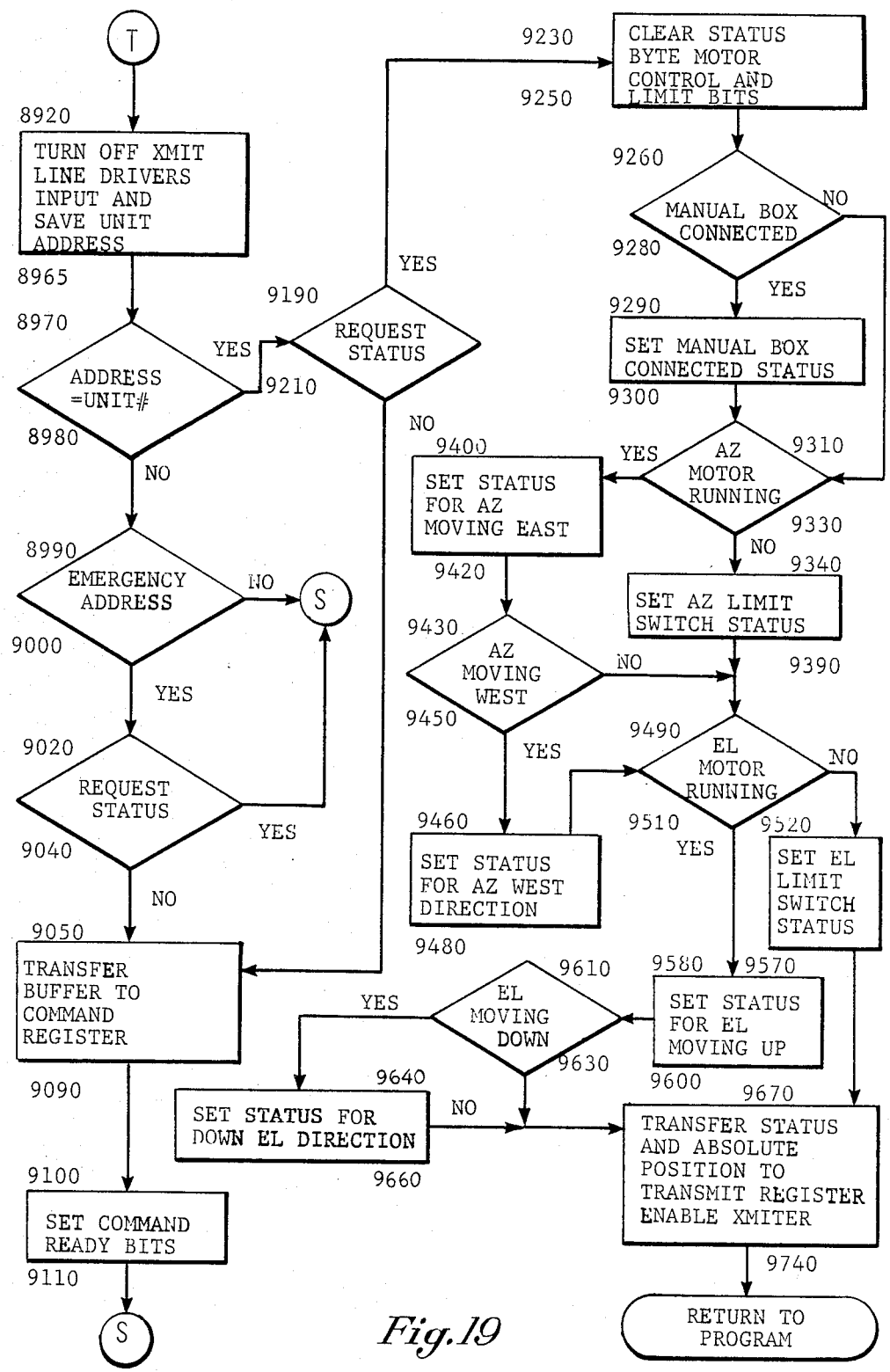

At lines 8920 to 9110, FIG. 19, the program controls the testing for proper address, transfers the command from the command buffer and sets the command ready bits. When a command is received, the transmitter line drivers are turned off to keep only one or no controllers on a line at a time. The address is then read and saved for use when a request status command is received. A comparison is made between the received address and the unit address. If the addresses agree, then the program jumps to the request status test. If the address is not the same, then a test is made for the emergency address. If it is, then a test is made to prevent a request status that would put all the controllers on the communication lines. The command is then transferred from the command buffer to the command decode registers. After that, the command ready bits are set and the program jumps to the receiver reset routine.

At lines 9190 to 9740, FIG. 19, the program sets up the status byte and initiates transmissions. If a request status command is received, the lower six bits of the status byte are cleared. If the Manual Box is connected, all status bits are cleared and the Manual Box status is set. If the AZ motor is not running, then the AZ limit status is indicated. If the motor is running, the AZ motor moving EAST bit is set. If the motor is moving WEST, then the motor moving WEST bit is set. The elevation motor is tested to see if it is running, and if it is not then the elevation limit status is set. With the motor running, the status is set for EL motor moving UP. If the motor is moving down then the status is set for down. After the status is set, the status and absolute position registers are transferred to the transmit registers. The transmitter line drivers are turned on and the transmitter interrupts are enabled.

In operation, the day is started by moving the heliostat (or the collector if it is being oriented) from the stop switches where the heliostat would have been stored overnight. These stop switches are actually limit switches so that the computer can have a starting point for accurate calculation of the position of the motors. The starting is accomplished by commands from the master computer which in turn calculates the sun position. In any event, the central computer calculates the position for the heliostat to be in both azimuth and elevation. As indicated hereinbefore with respect to FIGS. 6-19, the hardware is powered up at the limit switch and initialized by the master controller at this position. The cumulated steps for each motor are then determined and the motors are turned. The steps of the Hall Effect Devices are accumulated and compared with the commanded position. A stop is executed at the correct part of the cycle by the appropriate SSR's.

It is important to note that the motor is turned on at the zero voltage crossing to minimize noise. The motor is turned off and then, thereafter, the brake is energized to prevent both being on simultaneously.

As indicated hereinbefore, it important that the direction the motor is to rotate be determined and that the proper polarity be sent to the motors to get the desired direction.

The next heliostat (or controller) in an array is then similarly brought into position initially by the same procedure. Thereafter, as the time changes to the central computer, a new position for each of the respective heliostats (or controller) is calculated and the controller 23, using the microprocessing brings the respective heliostat (or collector) into the desired azimuth and elevation position. The achieving of this position is monitored through the Hall Effect Devices as indicated hereinbefore. This continues in rotation both chronologically and sequentially throughout the array and throughout the time of the day keeping the proper orientation of the respective heliostats (or collectors).

Upon the occurrence of some emergency such as a wind storm or the like or at the end of the day, the heliostats are returned to their stored position. The end of the day may be signaled by a time for a particular location or it may be shown by light going below a certain level of intensity.

While this invention has described the use of the particular hardware and software, including the Hall Effect Device on the DC motors to monitor the rotation thereof and achieve a command position in the field of positioning heliostats, collectors or the like, it is broadly useful to position any device wherein achieving a predetermined accurate position is desired. In this invention the use of a predetermined position is computed; for example, using the Cordic algorithm as developed in the prior art; and the accurate position is then achieved.

This invention has several advantages over the prior art. By the use of the relatively elaborate software, the SSR's are controlled exactly with the cycles to turn the motors on and off at appropriate point. This saves expensive power supplies and transmissions to drive motors or it saves the cost of expensive stepper motors. For example, the installations may save a thousand dollars or more for each of the heliostats that are installed.

In addition, the motor performs better so as to achieve the required torque and speed instead of the more expensive stepper motors.

Also, the motors consume power and operate more efficiently.

In this invention, it is possible to run both the azimuth and elevation motors to predetermined position or any number of steps away from the predetermined position and thereafter turn off one motor and continue with the second until commanded to turn off.

From the foregoing it can be seen that this invention achieves the objects delineated hereinbefore.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

APPENDIX

```
0010  ;****************************
0020  ;*** HELIOSTAT CONTROL PROGRAM ***
0030  ;******** USING DC MOTORS ********
0040  ;** MARK ERICKSON  DEC. 11,1981 **
0050  ;**** FOR ARCO POWER SYSTEMS *****
0060  ;****************************
0070              .BA  $F800
0080              .MC  $1000
0090              .OS
0100  MODE        .DE  $0100
0110  STATUS      .DE  MODE+5
0120  XMIT        .DE  STATUS+5
0130  AZSTEP      .DE  XMIT+6
0140  ELSTEP      .DE  AZSTEP+2
0150  AZSTAT      .DE  ELSTEP+2
0160  ELSTAT      .DE  AZSTAT+1
0170  AZOLD       .DE  ELSTAT+1
0180  ELOLD       .DE  AZOLD+1
0190  AZWHEEL     .DE  ELOLD+1
0200  ELWHEEL     .DE  AZWHEEL+1
0210  AZDELAY     .DE  ELWHEEL+1
0220  ELDELAY     .DE  AZDELAY+1
0230  TRANSX      .DE  ELDELAY+1
0240  RECIVX      .DE  TRANSX+1
0250  READY       .DE  RECIVX+1
0260  TEMP        .DE  READY+1
0270  MTEMP       .DE  TEMP+1
0280  MSWITCH     .DE  MTEMP+1
0290  ATEMP       .DE  MSWITCH+1
0300  XTEMP       .DE  ATEMP+1
0310  MOTORSTAT   .DE  XTEMP+1
0320  AZMOUT      .DE  MOTORSTAT+1
0330  ELMOUT      .DE  AZMOUT+1
0340  POUTCOUNT   .DE  ELMOUT+1
0350  COMBUFF     .DE  POUTCOUNT+1
0360  ADDRESS     .DE  COMBUFF+5
0370  DDRA32      .DE  $0181
0380  DDRB32      .DE  $0183
0390  DDRA22      .DE  $0203
0400  DDRB22      .DE  $0202
0410  IFR22       .DE  $020D
0420  IER22       .DE  $020E
0430  PCR22       .DE  $020C
0440  ACR22       .DE  $020B
0450  TIM22L      .DE  $0204
0460  TIM22H      .DE  $0205
```

```
                    0470 IER32       .DE $0184
                    0480 TIMER       .DE $0197
                    0490 WTIMER      .DE $019F
                    0500 RTIMER      .DE $0196
                    0510 AZCOUNT     .DE $0201
                    0520 ELCOUNT     .DE $0200
                    0530 PORTA32     .DE $0180
                    0540 PORTB32     .DE $0182
                    0550 CONTROL     .DE $0300
                    0560 DATA        .DE $0301
                    0570 MOTOROUT    .DE $0400
                    0580 MAX         .DE 5
                    0590 EMERG       .DE $C5
                    0600 ;
                    0610 ;*** START OF CODE ***
                    0620 ;
                    0630 ;INITIALIZE INTERNAL REGISTERS
F800- A2 7F         0640 START       LDX #$7F
F802- 9A            0650             TXS
F803- D8            0660             CLD
F804- AD 96 01      0670             LDA RTIMER
F807- 8D 84 01      0680             STA IER32
F80A- A9 00         0690             LDA #$00
F80C- 8D 81 01      0700             STA DDRA32
F80F- 8D 83 01      0710             STA DDRB32
F812- 8D 03 02      0720             STA DDRA22
F815- 8D 02 02      0730             STA DDRB22
F818- 8D 00 04      0740             STA MOTOROUT
F81B- 8D 0B 02      0750             STA ACR22
F81E- A9 01         0760             LDA #$01
F820- 8D 0C 02      0770             STA PCR22
F823- 8E 0E 02      0780             STX IER22
F826- A9 03         0790             LDA #$03
F828- 8D 00 03      0800             STA CONTROL
F82B- A9 D1         0810             LDA #$D1
F82D- 8D 00 03      0820             STA CONTROL
F830- A9 00         0830             LDA #$00
F832- A2 2C         0840             LDX #44
F834- 9D FF 00      0850 SET         STA MODE-1,X
F837- CA            0860             DEX
F838- D0 FA         0870             BNE SET
F83A- A2 06         0880             LDX #$06
F83C- 8E 1C 01      0890             STX TRANSX
F83F- 8E 1D 01      0910             STX RECIVX
F842- A9 80         0920             LDA #$80
F844- 8D 05 01      0930             STA STATUS
F847- A9 10         0940             LDA #16
F849- 8D 04 02      0950             STA TIM22L
F84C- A9 27         0960             LDA #39
F84E- 8D 05 02      0970             STA TIM22H
F851- A9 03         0980             LDA #03
F853- 8D 27 01      0990             STA FOUTCOUNT
F856- 58            1000             CLI
F857- A9 C3         1010             LDA #$C3
F859- 8D 0E 02      1020             STA IER22
                    1030 ;WAIT FOR CONTROL COMMAND
F85C- 20 F3 F9      1040 WAIT        JSR MANUAL
F85F- AD 14 01      1050             LDA AZSTAT
F862- 0D 15 01      1060             ORA ELSTAT
F865- 29 01         1070             AND #$01
```

```
F867- F0 03        1080            BEQ CWAIT
F869- 4C A7 F9     1090            JMP MWAIT
F86C- AD 1E 01     1100 CWAIT      LDA READY
F86F- F0 EB        1110            BEQ WAIT
F871- A9 00        1120            LDA #$00
F873- 8D 1E 01     1130            STA READY
                   1140 ;TEST FOR DISABLE RESET
F876- AD 05 01     1150 COMDEC     LDA STATUS
F879- 29 80        1160            AND #$80
F87B- F0 0F        1170            BEQ COMDEC1
F87D- AD 00 01     1180            LDA MODE
F880- 29 80        1190            AND #$80
F882- F0 D8        1200            BEQ WAIT
F884- A9 00        1210            LDA #$00
F886- 8D 05 01     1220            STA STATUS
F889- 4C 5C F8     1230            JMP WAIT
                   1240 ;DECODE COMMAND
F88C- AE 00 01     1250 COMDEC1    LDX MODE
F88F- 8A           1260            TXA
F890- 29 04        1270            AND #$04
F892- D0 C8        1280            BNE WAIT
F894- 8A           1290            TXA
F895- 29 40        1300            AND #$40
F897- F0 0E        1310            BEQ TESTAZ
                   1320 ;SET POSITION
F899- A2 04        1330            LDX #$04
F89B- BD 00 01     1340 SETPOS     LDA MODE,X
F89E- 9D 05 01     1350            STA STATUS,X
F8A1- CA           1360            DEX
F8A2- D0 F7        1370            BNE SETPOS
F8A4- 4C 5C F8     1380            JMP WAIT
F8A7- 8A           1390 TESTAZ     TXA
F8A8- 29 08        1400            AND #$08
F8AA- F0 25        1410            BEQ TRACKAZ
                   1420 ;SLEW AZIMUTH
F8AC- 8A           1430            TXA
F8AD- 29 01        1440            AND #$01
F8AF- F0 08        1450            BEQ SAZCCW
F8B1- A9 08        1460            LDA #$08
F8B3- 8D 14 01     1470            STA AZSTAT
F8B6- 4C BE F8     1480            JMP AZLMT
F8B9- A9 18        1490 SAZCCW     LDA #$18
F8BB- 8D 14 01     1500            STA AZSTAT
                   1510 ;TEST IF ON LIMIT SWITCH
F8BE- 20 14 F9     1520 AZLMT      JSR AZLIMIT
F8C1- F0 64        1530            BEQ TESTEL
                   1540 ;TURN ON AZIMUTH MOTOR
F8C3- A9 01        1550            LDA #$01
F8C5- 8D 1A 01     1560            STA AZDELAY
F8C8- 0D 14 01     1570            ORA AZSTAT
F8CB- 8D 14 01     1580            STA AZSTAT
F8CE- 4C 27 F9     1590            JMP TESTEL
                   1600 ;GET AZIMUTH STEPS
F8D1- 8A           1610 TRACKAZ    TXA
F8D2- 29 01        1620            AND #$01
F8D4- F0 51        1630            BEQ TESTEL
F8D6- AD 03 01     1640            LDA MODE+3
F8D9- 38           1650            SEC
F8DA- ED 08 01     1660            SBC STATUS+3
F8DD- 8D 10 01     1670            STA AZSTEP
```

```
F8E0- AD 04 01    1680              LDA MODE+4
F8E3- ED 09 01    1690              SBC STATUS+4
F8E6- 8D 11 01    1700              STA AZSTEP+1
F8E9- A9 00       1710              LDA #$00
F8EB- 8D 14 01    1720              STA AZSTAT
F8EE- D0 19       1730              BCS AZZERO
                  1740 ;NEGITIVE AZIMUTH (CCW)
F8F0- A9 00       1750              LDA #$00
F8F2- 38          1760              SEC
F8F3- ED 10 01    1770              SBC AZSTEP
F8F6- 8D 10 01    1780              STA AZSTEP
F8F9- A9 00       1790              LDA #$00
F8FB- ED 11 01    1800              SBC AZSTEP+1
F8FE- 8D 11 01    1810              STA AZSTEP+1
F901- A9 10       1820              LDA #$10
F903- 8D 14 01    1830              STA AZSTAT
F906- 4C BE F8    1840              JMP AZLMT
                  1850 ;TEST FOR ZERO TRACK VALUE
F909- AD 10 01    1860 AZZERO       LDA AZSTEP
F90C- 0D 11 01    1870              ORA AZSTEP+1
F90F- F0 16       1880              BEQ TESTEL
F911- 4C BE F8    1890              JMP AZLMT
                  1900 ;TEST AZIMUTH LIMIT SWITCH
F914- AD 14 01    1910 AZLIMIT      LDA AZSTAT
F917- 29 10       1920              AND #$10
F919- D0 06       1930              BNE WEST
F91B- AD 80 01    1940              LDA PORTA32
F91E- 29 01       1950              AND #$01
F920- 60          1960              RTS
F921- AD 80 01    1970 WEST         LDA PORTA32
F924- 29 02       1980              AND #$02
F926- 60          1990              RTS
                  2000 ;DECODE ELEVATION COMMAND
F927- 8A          2010 TESTEL       TXA
F928- 29 10       2020              AND #$10
F92A- F0 25       2030              BEQ TRACKEL
                  2040 ;SLEW ELEVATION
F92C- 8A          2050              TXA
F92D- 29 02       2060              AND #$02
F92F- F0 08       2070              BEQ SELCCW
F931- A9 08       2080              LDA #$08
F933- 8D 15 01    2090              STA ELSTAT
F936- 4C 3E F9    2100              JMP ELLMT
F939- A9 18       2110 SELCCW       LDA #$18
F93B- 8D 15 01    2120              STA ELSTAT
                  2130 ;TEST IF ON LIMIT
F93E- 20 94 F9    2140 ELLMT        JSR ELLIMIT
F941- F0 64       2150              BEQ MWAIT
                  2160 ;TURN ON ELEVATION MOTOR
F943- A9 01       2170              LDA #$01
F945- 8D 1B 01    2180              STA ELDELAY
F948- 0D 15 01    2190              ORA ELSTAT
F94B- 8D 15 01    2200              STA ELSTAT
F94E- 4C A7 F9    2210              JMP MWAIT
                  2220 ;GET ELEVATION STEPS
F951- 8A          2230 TRACKEL      TXA
F952- 29 02       2240              AND #$02
F954- F0 51       2250              BEQ MWAIT
F956- AD 01 01    2260              LDA MODE+1
F959- 38          2270              SEC
F95A- ED 06 01    2280              SBC STATUS+1
```

```
F95D- 8D 12 01   2290           STA ELSTEP
F960- AD 02 01   2300           LDA MODE+2
F963- ED 07 01   2310           SBC STATUS+2
F966- 8D 13 01   2320           STA ELSTEP+1
F969- A9 00      2330           LDA #$00
F96B- 8D 15 01   2340           STA ELSTAT
F96E- B0 19      2350           BCS ELZERO
                 2360   ;NEGITIVE ELEVATION (CCW)
F970- A9 00      2370           LDA #$00
F972- 38         2380           SEC
F973- ED 12 01   2390           SBC ELSTEP
F976- 8D 12 01   2400           STA ELSTEP
F979- A9 00      2410           LDA #$00
F97B- ED 13 01   2420           SBC ELSTEP+1
F97E- 8D 13 01   2430           STA ELSTEP+1
F981- A9 10      2440           LDA #$10
F983- 8D 15 01   2450           STA ELSTAT
F986- 4C 3E F9   2460           JMP ELLMT
                 2470   ;ZERO ELEVATION STEPS
F989- AD 12 01   2480   ELZERO  LDA ELSTEP
F98C- 0D 13 01   2490           ORA ELSTEP+1
F98F- F0 16      2500           BEQ MWAIT
F991- 4C 3E F9   2510           JMP ELLMT
                 2520   ;LIMIT IN MOTOR PATH
F994- AD 15 01   2530   ELLIMIT LDA ELSTAT
F997- 29 10      2540           AND #$10
F999- D0 06      2550           BNE DOWN
F99B- AD 80 01   2560           LDA PORTA32
F99E- 29 04      2570           AND #$04
F9A0- 60         2580           RTS
F9A1- AD 80 01   2590   DOWN    LDA PORTA32
F9A4- 29 08      2600           AND #$08
F9A6- 60         2610           RTS
                 2620   ;WAIT FOR BOTH MOTORS OFF
F9A7- 20 F3 F9   2630   MWAIT   JSR MANUAL
F9AA- AD 14 01   2640           LDA AZSTAT
F9AD- 0D 15 01   2650           ORA ELSTAT
F9B0- 29 01      2660           AND #$01
F9B2- D0 03      2670           BNE CTEST
F9B4- 4C 5C F8   2680           JMP WAIT
                 2690   ;TEST FOR COMMAND
F9B7- AD 1E 01   2700   CTEST   LDA READY
F9BA- 29 02      2710           AND #$02
F9BC- F0 E9      2720           BEQ MWAIT
F9BE- AD 1E 01   2730           LDA READY
F9C1- 29 FD      2740           AND #$FD
F9C3- 8D 1E 01   2750           STA READY
                 2760   ;TEST FOR STOP COMMAND
F9C6- AD 00 01   2770   STEST   LDA MODE
F9C9- 29 04      2780           AND #$04
F9CB- F0 DA      2790           BEQ MWAIT
F9CD- AD 00 01   2800           LDA MODE
F9D0- 29 01      2810           AND #$01
F9D2- F0 08      2820           BEQ TSEL
                 2830   ;STOP AZIMUTH
F9D4- A9 04      2840           LDA #$04
F9D6- 0D 14 01   2850           ORA AZSTAT
F9D9- 8D 14 01   2860           STA AZSTAT
F9DC- AD 00 01   2870   TSEL    LDA MODE
F9DF- 29 02      2880           AND #$02
F9E1- F0 08      2890           BEQ CREADY
```

```
                    2900 ;STOP ELEVATION
F9E3- A9 04         2910          LDA #$04
F9E5- 0D 15 01      2920          ORA ELSTAT
F9E8- 8D 15 01      2930          STA ELSTAT
F9EB- A9 00         2940 CREADY   LDA #$00
F9ED- 8D 1E 01      2950          STA READY
F9F0- 4C A7 F9      2960          JMP MWAIT
                    2970 ;MANUAL BOX SUBROUTINE
F9F3- AD 82 01      2980 MANUAL   LDA PORTB32
F9F6- 29 40         2990          AND #$40
F9F8- D0 0C         3000          BNE RETURN
F9FA- A9 00         3010          LDA #$00
F9FC- 8D 20 01      3020          STA MTEMP
F9FF- AD 82 01      3030 MANUAL1  LDA PORTB32
FA02- 29 40         3040          AND #$40
FA04- F0 01         3050          BEQ MCTEST
FA06- 60            3060 RETURN   RTS
                    3070 ;CLEAR COMANDS AND STATUS
FA07- A9 00         3080 MCTEST   LDA #$00
FA09- 8D 05 01      3090          STA STATUS
FA0C- 8D 1E 01      3100          STA READY
                    3110 ;TEST MANUAL BOX SWITCHES
FA0F- AD 80 01      3120          LDA PORTA32
FA12- 29 F0         3130          AND #$F0
FA14- CD 20 01      3140          CMP MTEMP
FA17- F0 E6         3150          BEQ MANUAL1
                    3160 ;.25 SEC. DEBOUNCE
FA19- A0 40         3170          LDY #$40
FA1B- A2 00         3180          LDX #$00
FA1D- CA            3190 LOOP     DEX
FA1E- EA            3200          NOP
FA1F- EA            3210          NOP
FA20- EA            3220          NOP
FA21- EA            3230          NOP
FA22- EA            3240          NOP
FA23- EA            3250          NOP
FA24- D0 F7         3260          BNE LOOP
FA26- 88            3270          DEY
FA27- D0 F4         3280          BNE LOOP
                    3290 ;TEST FOR MANUAL BOX
FA29- AD 82 01      3300          LDA PORTB32
FA2C- 29 40         3310          AND #$40
FA2E- D0 D6         3320          BNE RETURN
                    3330 ;TEST FOR SWITCH CHANGE
FA30- AD 80 01      3340 CHANGE   LDA PORTA32
FA33- 29 F0         3350          AND #$F0
FA35- CD 20 01      3360          CMP MTEMP
FA38- F0 C5         3370          BEQ MANUAL1
FA3A- 8D 21 01      3380          STA MSWITCH
                    3390 ;TEST FOR AZIMUTH CHANGE
FA3D- AD 20 01      3400          LDA MTEMP
FA40- AA            3410          TAX
FA41- 29 30         3420          AND #$30
FA43- 8D 20 01      3430          STA MTEMP
FA46- AD 21 01      3440          LDA MSWITCH
FA49- 29 30         3450          AND #$30
FA4B- CD 20 01      3460          CMP MTEMP
FA4E- F0 39         3470          BEQ MELTEST
                    3480 ;STOP AZIMUTH MOTOR
FA50- A9 04         3490          LDA #$04
FA52- 0D 14 01      3500          ORA AZSTAT
```

```
FA55- 8D 14 01    3510              STA AZSTAT
FA58- AD 14 01    3520  AZWAIT      LDA AZSTAT
FA5B- 29 01       3530              AND #$01
FA5D- D0 F9       3540              BNE AZWAIT
FA5F- AD 21 01    3550              LDA MSWITCH
FA62- 29 30       3560              AND #$30
FA64- 49 30       3570              EOR #$30
FA66- F0 21       3580              BEQ MELTEST
                  3590  ;SET AZIMUTH MOTOR DIRECTION
FA68- 29 10       3600              AND #$10
FA6A- F0 18       3610              BEQ MAZCCW
FA6C- A9 08       3620              LDA #$08
                  3630  ;TEST IF ON LIMIT SWITCH
FA6E- 8D 14 01    3640  MAZLMT      STA AZSTAT
FA71- 20 14 F9    3650              JSR AZLIMIT
FA74- F0 13       3660              BEQ MELTEST
                  3670  ;TURN ON AZIMUTH MOTOR
FA76- A9 01       3680              LDA #$01
FA78- 8D 1A 01    3690              STA AZDELAY
FA7B- 0D 14 01    3700              ORA AZSTAT
FA7E- 8D 14 01    3710              STA AZSTAT
FA81- 4C 89 FA    3720              JMP MELTEST
FA84- A9 18       3730  MAZCCW      LDA #$18
FA86- 4C 6E FA    3740              JMP MAZLMT
                  3750  ;TEST FOR ELEVATION CHANGE
FA89- 8A          3760  MELTEST     TXA
FA8A- 29 C0       3770              AND #$C0
FA8C- 8D 20 01    3780              STA MTEMP
FA8F- AD 21 01    3790              LDA MSWITCH
FA92- 29 C0       3800              AND #$C0
FA94- CD 20 01    3810              CMP MTEMP
FA97- F0 31       3820              BEQ MRESTORE
                  3830  ;STOP ELEVATION MOTOR
FA99- A9 04       3840              LDA #$04
FA9B- 0D 15 01    3850              ORA ELSTAT
FA9E- 8D 15 01    3860              STA ELSTAT
FAA1- AD 15 01    3870  ELWAIT      LDA ELSTAT
FAA4- 29 01       3880              AND #$01
FAA6- D0 F9       3890              BNE ELWAIT
FAA8- AD 21 01    3900              LDA MSWITCH
FAAB- 29 C0       3910              AND #$C0
FAAD- 49 C0       3920              EOR #$C0
FAAF- F0 19       3930              BEQ MRESTORE
                  3940  ;SET ELEVATION DIRECTION
FAB1- 29 40       3950              AND #$40
FAB3- F0 1E       3960              BEQ MELCCW
FAB5- A9 08       3970              LDA #$08
                  3980  ;TEST ELEVATION LIMIT
FAB7- 8D 15 01    3990  MELLMT      STA ELSTAT
FABA- 20 94 F9    4000              JSR ELLIMIT
FABD- F0 0B       4010              BEQ MRESTORE
                  4020  ;TURN ON ELEVATION MOTOR
FABF- A9 01       4030              LDA #$01
FAC1- 8D 1B 01    4040              STA ELDELAY
FAC4- 0D 15 01    4050              ORA ELSTAT
FAC7- 8D 15 01    4060              STA ELSTAT
FACA- AD 21 01    4070  MRESTORE    LDA MSWITCH
FACD- 8D 20 01    4080              STA MTEMP
FAD0- 4C FF F9    4090              JMP MANUAL1
FAD3- A9 18       4100  MELCCW      LDA #$18
FAD5- 4C B7 FA    4110              JMP MELLMT
                  4120  ;INTERUPT CONTROLLED MOTOR ROUTINE
```

```
FADD- 8D 22 01   4130 INTERUPT   STA ATEMP
FAE0- 8E 23 01   4140            STX XTEMP
FAE3- AD 24 01   4142            LDA MOTORSTAT
FAE1- 8D 00 04   4143            STA MOTOROUT
FAE4- A9 01      4145            LDA #$01
FAE6- 2C 0D 02   4150            BIT IFR22
FAE9- 30 03      4160            BMI MOTORS
FAEB- 4C 9B FE   4170            JMP COMM
                 4180 ;TEST FOR POWER OUT
FAEE- 70 1A      4190 MOTORS     BVS POUT
FAF0- D0 33      4195            BNE FAIL
FAF2- AD 01 02   4200            LDA AZCOUNT
FAF5- A9 03      4210            LDA #03
FAF7- 8D 27 01   4220            STA POUTCOUNT
FAFA- A9 27      4230 MOTOR1     LDA #39
FAFC- 8D 05 02   4240            STA TIM22H
FAFF- AE 14 01   4250            LDX AZSTAT
FB02- 8A         4260            TXA
FB03- 29 01      4270            AND #$01
FB05- D0 27      4280            BNE AZMOTOR
FB07- 4C D2 FC   4290            JMP ELMOTOR
FB0A- 2C 05 01   4300 POUT       BIT STATUS
FB0D- 30 EB      4310            BMI MOTOR1
FB0F- AD 27 01   4320            LDA POUTCOUNT
FB12- F0 06      4330            BEQ SHUTDOWN
FB14- CE 27 01   4340            DEC POUTCOUNT
FB17- 4C FA FA   4350            JMP MOTOR1
FB1A- 20 85 FE   4360 SHUTDOWN   JSR MOTOROFF
FB1D- A9 80      4370            LDA #$80
FB1F- 8D 05 01   4380            STA STATUS
FB22- 4C FA FA   4390            JMP MOTOR1
                 4391 ;BRAKE SHORT
FB25- AD 01 02   4392 FAIL       LDA AZCOUNT
FB28- 20 85 FE   4393            JSR MOTOROFF
FB2B- 4C 6C FE   4394            JMP RESTORE
                 4400 ;TEST IF AZIMUTH MOTOR ON
FB2E- 8A         4410 AZMOTOR    TXA
FB2F- 29 02      4420            AND #$02
FB31- D0 03      4430            BNE AZON
FB33- 4C E6 FB   4440            JMP AZTEST
FB36- 20 3C FB   4450 AZON       JSR FINDAZ
FB39- 4C AE FB   4460            JMP AZSTOPT
                 4470 ;DETERMINE AZIMUTH POSITION
FB3C- AD 01 02   4480 FINDAZ     LDA AZCOUNT
FB3F- 30 03      4490            BMI AZSAVE
FB41- AD 01 02   4500            LDA AZCOUNT
                 4510 ;FIND DIFF BETWEEN NEW AND OLD AZ
FB44- 8D 1F 01   4520 AZSAVE     STA TEMP
FB47- 38         4530            SEC
FB48- ED 16 01   4540            SBC AZOLD
FB4B- 29 7F      4550            AND #$7F
FB4D- AA         4560            TAX
                 4570 ;TEST FOR AZ MALFUNCTION
FB4E- D0 08      4580            BNE AZMOVE
FB50- CE 25 01   4590            DEC AZMOUT
FB53- D0 03      4600            BNE AZCONT
FB55- 20 85 FE   4610            JSR MOTOROFF
FB58- A9 3C      4620 AZMOVE     LDA #60
FB5A- 8D 25 01   4630            STA AZMOUT
FB5D- AD 14 01   4640 AZCONT     LDA AZSTAT
FB60- 29 10      4650            AND #$10
FB62- D0 2D      4660            BNE AZCOM
```

```
                     4670 ;ADD TO WHEEL POSITION (CW)
FB64- 8A             4680            TXA
FB65- 18             4690            CLC
FB66- 6D 18 01       4700            ADC AZWHEEL
FB69- 8D 18 01       4710            STA AZWHEEL
FB6C- C9 05          4720            CMP #MAX
FB6E- 90 1A          4730            BCC AZSKIP
                     4740 ;INCREMENT AZIMUTH POSITION
FB70- 38             4750            SEC
FB71- E9 05          4760            SBC #MAX
FB73- 8D 18 01       4770            STA AZWHEEL
FB76- 20 9E FC       4780            JSR INCAZP
                     4790 ;DECREMENT NUMBER OF AZIMUTH STEPS
FB79- AD 10 01       4800 AZDECSTP   LDA AZSTEP
FB7C- 38             4810            SEC
FB7D- E9 01          4820            SBC #$01
FB7F- 8D 10 01       4830            STA AZSTEP
FB82- AD 11 01       4840            LDA AZSTEP+1
FB85- E9 00          4850            SBC #$00
FB87- 8D 11 01       4860            STA AZSTEP+1
                     4870 ;SET OLD TO NEW COUNTER VALUE
FB8A- AD 1F 01       4880 AZSKIP     LDA TEMP
FB8D- 8D 16 01       4890            STA AZOLD
FB90- 60             4900            RTS
                     4910 ;SUBTRACT DIFF FROM WHEEL POSITION
FB91- AD 18 01       4920 AZCCW      LDA AZWHEEL
FB94- 8E 18 01       4930            STX AZWHEEL
FB97- 38             4940            SEC
FB98- ED 18 01       4950            SBC AZWHEEL
FB9B- 8D 18 01       4960            STA AZWHEEL
FB9E- B0 EA          4970            BCS AZSKIP
                     4980 ;DECREMENT AZIMUTH POSITION
FBA0- A9 05          4990            LDA #MAX
FBA2- 6D 18 01       5000            ADC AZWHEEL
FBA5- 8D 18 01       5010            STA AZWHEEL
FBA8- 20 C0 FC       5020            JSR DECAZP
FBAB- 4C 79 FB       5030            JMP AZDECSTP
                     5040 ;TEST FOR AZMUTH STOP CONDITION
FBAE- AE 14 01       5050 AZSTOPT    LDX AZSTAT
FBB1- 20 14 F9       5060            JSR AZLIMIT
FBB4- F0 15          5070            BEQ SETSTOPAZ
FBB6- 8A             5080            TXA
FBB7- 29 04          5090            AND #$04
FBB9- D0 10          5100            BNE SETSTOPAZ
FBBB- 8A             5110            TXA
FBBC- 29 08          5120            AND #$08
FBBE- F0 03          5130            BEQ STEPAZ
FBC0- 4C D2 FC       5140 GOEL       JMP ELMOTOR
                     5150 ;TEST FOR ZERO AZIMUTH STEPS LEFT
FBC3- AD 10 01       5160 STEPAZ     LDA AZSTEP
FBC6- 0D 11 01       5170            ORA AZSTEP+1
FBC9- D0 F5          5180            BNE GOEL
                     5190 ;TURN OFF AZIMUTH MOTOR POWER
FBCB- AD 24 01       5200 SETSTOPAZ  LDA MOTORSTAT
FBCE- 29 FE          5210            AND #$FE
FBD0- 8D 24 01       5220            STA MOTORSTAT
FBD3- 8D 00 04       5230            STA MOTOROUT
FBD6- 8A             5240            TXA
FBD7- 29 FB          5250            AND #$FB
FBD9- 09 04          5260            ORA #$04
FBDB- 8D 14 01       5270            STA AZSTAT
                     5280 ;SET AZDELAY FOR 250 MS.
```

```
FBDE- A9 1E      5290              LDA #30
FBE0- 8D 1A 01   5300              STA AZDELAY
FBE3- 4C D2 FC   5310              JMP ELMOTOR
                 5320  ;TEST AZIMUTH STATUS FOR STOP
FBE6- 8A         5330  AZTEST      TXA
FBE7- 29 04      5340              AND #$04
FBE9- D0 54      5350              BNE STOPAZ
                 5360  ;TEST FOR REVERSE MOTOR DIRECTION
FBEB- 8A         5370              TXA
FBEC- 29 10      5380              AND #$10
FBEE- D0 19      5390              BNE OFFAZREL
                 5400  ;TEST IF RELAY IS ON
FBF0- AE 24 01   5410              LDX MOTORSTAT
FBF3- 8A         5420              TXA
FBF4- 29 04      5430              AND #$04
FBF6- D0 1F      5440              BNE AZTIME
                 5450  ;TURN ON REVERSING RELAY
FBF8- 8A         5460              TXA
FBF9- 09 04      5470              ORA #$04
FBFB- 8D 24 01   5480  SAZDEL      STA MOTORSTAT
FBFE- 8D 00 04   5490              STA MOTOROUT
FC01- A9 3C      5500              LDA #60
FC03- 8D 1A 01   5510              STA AZDELAY
FC06- 4C D2 FC   5520              JMP ELMOTOR
                 5530  ;TEST IF RELAY OFF
FC09- AE 24 01   5540  OFFAZREL    LDX MOTORSTAT
FC0C- 8A         5550              TXA
FC0D- 29 04      5560              AND #$04
FC0F- F0 06      5570              BEQ AZTIME
FC11- 8A         5580              TXA
FC12- 29 F8      5590              AND #$F8
FC14- 4C FB FB   5600              JMP SAZDEL
                 5610  ;GIVE RELAY 500 MS. TO CLOSE
FC17- CE 1A 01   5620  AZTIME      DEC AZDELAY
FC1A- D0 A4      5630              BNE GOEL
                 5640  ;GET STARTING AZIMUTH COUNT
FC1C- AD 01 02   5650              LDA AZCOUNT
FC1F- 8D 16 01   5660              STA AZOLD
FC22- 29 80      5670              AND #$80
FC24- 0D 14 01   5680              ORA AZSTAT
FC27- 09 02      5690              ORA #$02
FC29- 8D 14 01   5700              STA AZSTAT
FC2C- A9 3C      5710              LDA #60
FC2E- 8D 25 01   5720              STA AZMOUT
                 5730  ;TURN ON AZ MOTOR POWER
FC31- AD 24 01   5740              LDA MOTORSTAT
FC34- 09 01      5750              ORA #$01
FC36- 8D 24 01   5760              STA MOTORSTAT
FC39- 8D 00 04   5770              STA MOTOROUT
FC3C- 4C D2 FC   5780  GOEL1       JMP ELMOTOR
                 5790  ;STOP AZIMUTH MOTOR
FC3F- AD 1A 01   5800  STOPAZ      LDA AZDELAY
FC42- C9 1D      5810              CMP #29
FC44- D0 0B      5820              BNE SKIPAZ
FC46- AD 24 01   5830              LDA MOTORSTAT
FC49- 09 02      5840              ORA #$02
FC4B- 8D 24 01   5850              STA MOTORSTAT
FC4E- 8D 00 04   5860              STA MOTOROUT
FC51- 20 3C FB   5870  SKIPAZ      JSR FINDAZ
FC54- CE 1A 01   5880              DEC AZDELAY
FC57- D0 E3      5890              BNE GOEL1
```

```
FC59- AD 24 01   5900              LDA MOTORSTAT
FC5C- 29 FC      5910              AND #$FC
FC5E- 8D 24 01   5920              STA MOTORSTAT
FC61- 8D 00 04   5930              STA MOTOROUT
FC64- AD 14 01   5940              LDA AZSTAT
FC67- 29 FE      5950              AND #$FE
FC69- 8D 14 01   5960              STA AZSTAT
                 5970 ;COMPENSATE FOR REVERSE DIRECTION
FC6C- AE 14 01   5980              LDX AZSTAT
FC6F- 8A         5990              TXA
FC70- 29 10      6000              AND #$10
FC72- D0 5E      6010              BNE ELMOTOR
FC74- AD 01 02   6020              LDA AZCOUNT
FC77- 29 80      6030              AND #$80
FC79- 8D 1F 01   6040              STA TEMP
FC7C- 8A         6050              TXA
FC7D- 29 80      6060              AND #$80
FC7F- 4D 1F 01   6070              EOR TEMP
FC82- F0 4E      6080              BEQ ELMOTOR
FC84- AD 1F 01   6090              LDA TEMP
FC87- F0 27      6100              BEQ DECAZ
                 6110 ;INCREMENT AZWHEEL POSITION
FC89- EE 18 01   6120              INC AZWHEEL
FC8C- A9 05      6130              LDA #MAX
FC8E- CD 18 01   6140              CMP AZWHEEL
FC91- D0 3F      6150              BNE ELMOTOR
FC93- A9 00      6160              LDA #$00
FC95- 8D 18 01   6170              STA AZWHEEL
FC98- 20 9E FC   6180              JSR INCAZP
FC9B- 4C D2 FC   6190              JMP ELMOTOR
                 6200 ;INCREMENT AZ POSITION
FC9E- AD 08 01   6210 INCAZP       LDA STATUS+3
FCA1- 18         6220              CLC
FCA2- 69 01      6230              ADC #$01
FCA4- 8D 08 01   6240              STA STATUS+3
FCA7- AD 09 01   6250              LDA STATUS+4
FCAA- 69 00      6260              ADC #$00
FCAC- 8D 09 01   6270              STA STATUS+4
FCAF- 60         6280              RTS
                 6290 ;DECREMENT AZWHEEL POSITION
FCB0- CE 18 01   6300 DECAZ        DEC AZWHEEL
FCB3- 10 1D      6310              BPL ELMOTOR
FCB5- A9 04      6320              LDA #MAX-1
FCB7- 8D 18 01   6330              STA AZWHEEL
FCBA- 20 C0 FC   6340              JSR DECAZP
FCBD- 4C D2 FC   6350              JMP ELMOTOR
FCC0- AD 08 01   6360 DECAZP       LDA STATUS+3
FCC3- 38         6370              SEC
FCC4- E9 01      6380              SBC #$01
FCC6- 8D 08 01   6390              STA STATUS+3
FCC9- AD 09 01   6400              LDA STATUS+4
FCCC- E9 00      6410              SBC #$00
FCCE- 8D 09 01   6420              STA STATUS+4
FCD1- 60         6430              RTS
                 6440 ;TEST ELEVATION MOTOR STATUS
FCD2- AE 15 01   6450 ELMOTOR      LDX ELSTAT
FCD5- 8A         6460              TXA
FCD6- 29 01      6470              AND #$01
FCD8- D0 03      6480              BNE ELMOTOR1
FCDA- 4C 6C FE   6490              JMP RESTORE
                 6500 ;TEST FOR MOTOR ON
FCDD- 8A         6510 ELMOTOR1     TXA
```

```
FCDE- 29 02         6520                        AND #$02
FCE0- D0 03         6530                        BNE ELON
FCE2- 4C 95 FD      6540                        JMP ELTEST
FCE5- 20 EB FC      6550   ELON                 JSR FINDEL
FCE8- 4C 5D FD      6560                        JMP ELSTOPT
                    6570  ;DETERMINE ELEVATION POSITION
FCEB- AD 00 02      6580   FINDEL               LDA ELCOUNT
FCEE- 30 03         6590                        BMI ELSAVE
FCF0- AD 00 02      6600                        LDA ELCOUNT
                    6610  ;FIND ELEVATION DIFFRENCE
FCF3- 8D 1F 01      6620   ELSAVE               STA TEMP
FCF6- 38            6630                        SEC
FCF7- ED 17 01      6640                        SBC ELOLD
FCFA- 29 7F         6650                        AND #$7F
FCFC- AA            6660                        TAX
                    6670  ;TEST FOR EL MALFUNCTION
FCFD- D0 08         6680                        BNE ELMOVE
FCFF- CE 26 01      6690                        DEC ELMOUT
FD02- D0 08         6700                        BNE ELCONT
FD04- 20 85 FE      6710                        JSR MOTOROFF
FD07- A9 3C         6720   ELMOVE               LDA #60
FD09- 8D 26 01      6730                        STA ELMOUT
FD0C- AD 15 01      6740   ELCONT               LDA ELSTAT
FD0F- 29 10         6750                        AND #$10
FD11- D0 2D         6760                        BNE ELCCW
                    6770  ;ADD TO ELEVATION WHEEL
FD13- 8A            6780                        TXA
FD14- 18            6790                        CLC
FD15- 6D 19 01      6800                        ADC ELWHEEL
FD18- 8D 19 01      6810                        STA ELWHEEL
FD1B- C9 05         6820                        CMP #MAX
FD1D- 90 1A         6830                        BCC ELSKIP
                    6840  ;INCREMENT ELEVATION POSITION
FD1F- 38            6850                        SEC
FD20- E9 05         6860                        SBC #MAX
FD22- 8D 19 01      6870                        STA ELWHEEL
FD25- 20 4D FE      6880                        JSR INCELP
                    6890  ;DECREMENT ELEVATION STEPS
FD28- AD 12 01      6900   ELDECSTP             LDA ELSTEP
FD2B- 38            6910                        SEC
FD2C- E9 01         6920                        SBC #$01
FD2E- 8D 12 01      6930                        STA ELSTEP
FD31- AD 13 01      6940                        LDA ELSTEP+1
FD34- E9 00         6950                        SBC #$00
FD36- 8D 13 01      6960                        STA ELSTEP+1
                    6970  ;SAVE NEW COUNT IN OLD
FD39- AD 1F 01      6980   ELSKIP               LDA TEMP
FD3C- 8D 17 01      6990                        STA ELOLD
FD3F- 60            7000                        RTS
                    7010  ;SUBTRACT DIFF FROM WHEEL
FD40- AD 19 01      7020   ELCCW                LDA ELWHEEL
FD43- 8E 19 01      7030                        STX ELWHEEL
FD46- 38            7040                        SEC
FD47- ED 19 01      7050                        SBC ELWHEEL
FD4A- 8D 19 01      7060                        STA ELWHEEL
FD4D- B0 EA         7070                        BCS ELSKIP
                    7080  ;DECREMENT ELEVATION POSITION
FD4F- A9 05         7090                        LDA #MAX
FD51- 6D 19 01      7100                        ADC ELWHEEL
FD54- 8D 19 01      7110                        STA ELWHEEL
FD57- 20 73 FE      7120                        JSR DECELP
```

```
FD5A- 4C 28 FD    7130                   JMP ELDECSTP
                  7140  ;TEST FOR ELEVATION STOP CONDITION
FD5D- AE 15 01    7150  ELSTOPT          LDX ELSTAT
FD60- 20 94 F9    7160                   JSR ELLIMIT
FD63- F0 15       7170                   BEQ SETSTOPEL
FD65- 8A          7180                   TXA
FD66- 29 04       7190                   AND #$04
FD68- D0 10       7200                   BNE SETSTOPEL
FD6A- 8A          7210                   TXA
FD6B- 29 08       7220                   AND #$08
FD6D- F0 03       7230                   BEQ STEPEL
FD6F- 4C 6C FE    7240  GORES            JMP RESTORE
                  7250  ;TEST FOR ZERO ELEVATION STEPS
FD72- AD 12 01    7260  STEPEL           LDA ELSTEP
FD75- 0D 13 01    7270                   ORA ELSTEP+1
FD78- D0 F5       7280                   BNE GORES
                  7290  ;TURN OFF ELEVATION MOTOR POWER
FD7A- AD 24 01    7300  SETSTOPEL        LDA MOTORSTAT
FD7D- 29 F7       7310                   AND #$F7
FD7F- 8D 24 01    7320                   STA MOTORSTAT
FD82- 8D 00 04    7330                   STA MOTOROUT
FD85- 8A          7340                   TXA
FD86- 29 FD       7350                   AND #$FD
FD88- 09 04       7360                   ORA #$04
FD8A- 8D 15 01    7370                   STA ELSTAT
                  7380  ;SET FOR 250 MS. STOP TIME
FD8D- A9 1E       7390                   LDA #30
FD8F- 8D 1B 01    7400                   STA ELDELAY
FD92- 4C 6C FE    7410                   JMP RESTORE
FD95- 8A          7420  ELTEST           TXA
FD96- 29 04       7430                   AND #$04
FD98- D0 54       7440                   BNE STOPEL
                  7450  ;TEST FOR REVERSE MOTOR DIRECTION
FD9A- 8A          7460                   TXA
FD9B- 29 10       7470                   AND #$10
FD9D- F0 19       7480                   BEQ OFFELREL
                  7490  ;TURN ON REVERSING RELAY
FD9F- AE 24 01    7500                   LDX MOTORSTAT
FDA2- 8A          7510                   TXA
FDA3- 29 20       7520                   AND #$20
FDA5- D0 1F       7530                   BNE ELTIME
FDA7- 8A          7540                   TXA
FDA8- 09 20       7550                   ORA #$20
FDAA- 8D 24 01    7560  SELDEL           STA MOTORSTAT
FDAD- 8D 00 04    7570                   STA MOTOROUT
                  7580  ;DELAY FOR 500 MS. RELAY CLOSURE
FDB0- A9 3C       7590                   LDA #60
FDB2- 8D 1B 01    7600                   STA ELDELAY
FDB5- 4C 6C FE    7610                   JMP RESTORE
                  7620  ;TEST FOR RELAY OFF
FDB8- AE 24 01    7630  OFFELREL         LDX MOTORSTAT
FDBB- 8A          7640                   TXA
FDBC- 29 20       7650                   AND #$20
FDBE- F0 06       7660                   BEQ ELTIME
FDC0- 8A          7670                   TXA
FDC1- 29 C7       7680                   AND #$C7
FDC3- 4C AA FD    7690                   JMP SELDEL
                  7700  ;WAIT FOR RELAY
FDC6- CE 1B 01    7710  ELTIME           DEC ELDELAY
FDC9- D0 A4       7720                   BNE GORES
                  7730  ;GET EL COUNT AND CLOCK
```

```
FDCB- AD 00 02    7740            LDA ELCOUNT
FDCE- 8D 17 01    7750            STA ELOLD
FDD1- 29 80       7760            AND #$80
FDD3- 0D 15 01    7770            ORA ELSTAT
FDD6- 09 02       7780            ORA #$02
FDD8- 8D 15 01    7790            STA ELSTAT
FDDB- A9 3C       7800            LDA #60
FDDD- 8D 26 01    7810            STA ELMOUT
                  7820  ;TURN ON ELEVATION POWER
FDE0- AD 24 01    7830            LDA MOTORSTAT
FDE3- 09 08       7840            ORA #$08
FDE5- 8D 24 01    7850            STA MOTORSTAT
FDE8- 8D 00 04    7860            STA MOTOROUT
FDEB- 4C 6C FE    7870  GORES1    JMP RESTORE
                  7880  ;STOP ELEVATION MOTOR
FDEE- AD 1B 01    7890  STOPEL    LDA ELDELAY
FDF1- C9 1D       7900            CMP #29
FDF3- D0 0B       7910            BNE SKIPEL
FDF5- AD 24 01    7920            LDA MOTORSTAT
FDF8- 09 10       7930            ORA #$10
FDFA- 8D 24 01    7940            STA MOTORSTAT
FDFD- 8D 00 04    7950            STA MOTOROUT
FE00- 20 EB FC    7960  SKIPEL    JSR FINDEL
FE03- CE 1B 01    7970            DEC ELDELAY
FE06- D0 E3       7980            BNE GORES1
FE08- AD 24 01    7990            LDA MOTORSTAT
FE0B- 29 E7       8000            AND #$E7
FE0D- 8D 24 01    8010            STA MOTORSTAT
FE10- 8D 00 04    8020            STA MOTOROUT
FE13- AD 15 01    8030            LDA ELSTAT
FE16- 29 FE       8040            AND #$FE
FE18- 8D 15 01    8050            STA ELSTAT
                  8060  ;COMPENSATE FOR REVERSE DIRECTION
FE1B- AE 15 01    8070            LDX ELSTAT
FE1E- 8A          8080            TXA
FE1F- 29 10       8090            AND #$10
FE21- D0 C8       8100            BNE GORES1
FE23- AD 00 02    8110            LDA ELCOUNT
FE26- 29 80       8120            AND #$80
FE28- 8D 1F 01    8130            STA TEMP
FE2B- 8A          8140            TXA
FE2C- 29 80       8150            AND #$80
FE2E- 4D 1F 01    8160            EOR TEMP
FE31- F0 39       8170            BEQ RESTORE
FE33- AD 1F 01    8180            LDA TEMP
FE36- F0 27       8190            BEQ DECEL
                  8200  ;INCREMENT EL WHEEL POSITION
FE38- EE 19 01    8210            INC ELWHEEL
FE3B- A9 05       8220            LDA #MAX
FE3D- CD 19 01    8230            CMP ELWHEEL
FE40- D0 2A       8240            BNE RESTORE
FE42- A9 00       8250            LDA #$00
FE44- 8D 19 01    8260            STA ELWHEEL
FE47- 20 4D FE    8270            JSR INCELP
FE4A- 4C 6C FE    8280            JMP RESTORE
                  8290  ;INCREMENT ELEVATION POSITION
FE4D- AD 06 01    8300  INCELP    LDA STATUS+1
FE50- 18          8310            CLC
FE51- 69 01       8320            ADC #$01
FE53- 8D 06 01    8330            STA STATUS+1
FE56- AD 07 01    8340            LDA STATUS+2
FE59- 69 00       8350            ADC #$00
```

```
FE5B- 8D 07 01    8360              STA  STATUS+2
FE5E- 60          8370              RTS
                  8380 ;DECREMENT EL WHEEL POSITION
FE5F- CE 19 01    8390 DECEL        DEC  ELWHEEL
FE62- 10 08       8400              BPL  RESTORE
FE64- A9 04       8410              LDA  #MAX-1
FE66- 8D 19 01    8420              STA  ELWHEEL
FE69- 20 73 FE    8430              JSR  DECELP
                  8440 ;RESTORE A AND X REGISTERS
FE6C- AD 22 01    8450 RESTORE      LDA  ATEMP
FE6F- AE 23 01    8460              LDX  XTEMP
FE72- 40          8470              RTI
                  8480 ;DECREMENT ELEVATION POSITION
FE73- AD 06 01    8490 DECELP       LDA  STATUS+1
FE76- 38          8500              SEC
FE77- E9 01       8510              SBC  #$01
FE79- 8D 06 01    8520              STA  STATUS+1
FE7C- AD 07 01    8530              LDA  STATUS+2
FE7F- E9 00       8540              SBC  #$00
FE81- 8D 07 01    8550              STA  STATUS+2
FE84- 60          8560              RTS
                  8570 ;STOP AZ AND EL MOTORS
FE85- A9 04       8580 MOTOROFF     LDA  #$04
FE87- 0D 14 01    8590              ORA  AZSTAT
FE8A- 8D 14 01    8600              STA  AZSTAT
FE8D- A9 04       8610              LDA  #$04
FE8F- 0D 15 01    8620              ORA  ELSTAT
FE92- 8D 15 01    8630              STA  ELSTAT
FE95- A9 C0       8640              LDA  #$C0
FE97- 8D 05 01    8650              STA  STATUS
FE9A- 60          8660              RTS
                  8670 ;COMMUNICATION ROUTINE
FE9B- 2C 00 03    8680 COMM         BIT  CONTROL
FE9E- 10 63       8690              BPL  RESET
FEA0- AD 00 03    8700              LDA  CONTROL
FEA3- 29 01       8710              AND  #$01
FEA5- D0 19       8720              BNE  RECIVER
                  8730 ;TRANSMIT DATA ROUTINE
FEA7- AE 1C 01    8740              LDX  TRANSX
FEAA- BD 09 01    8750              LDA  XMIT-1,X
FEAD- 8D 01 03    8760              STA  DATA
FEB0- CA          8770              DEX
FEB1- D0 07       8780              BNE  SAVE
FEB3- A9 91       8790              LDA  #$91
FEB5- 8D 00 03    8800              STA  CONTROL
FEB8- A2 06       8810              LDX  #$06
FEBA- 8E 1C 01    8820 SAVE         STX  TRANSX
FEBD- 4C 6C FE    8830              JMP  RESTORE
                  8840 ;RECIVE DATA ROUTINE
FEC0- AE 1D 01    8850 RECIVER      LDX  RECIVX
FEC3- AD 01 03    8860              LDA  DATA
FEC6- 9D 27 01    8870              STA  COMBUFF-1,X
FEC9- A9 32       8880              LDA  #50
FECB- 8D 97 01    8890              STA  TIMER
FECE- CA          8900              DEX
FECF- D0 3D       8910              BNE  STIMER
FED1- A9 D1       8920              LDA  #$D1
FED3- 8D 00 03    8930              STA  CONTROL
FED6- AD 82 01    8940              LDA  PORTB32
FED9- 49 FF       8950              EOR  #$FF
FEDB- 29 3F       8960              AND  #$3F
FEDD- 8D 0F 01    8965              STA  XMIT+5
```

```
FEE0- CD 2D 01    8970              CMP ADDRESS
FEE3- F0 31       8980              BEQ TREQ
FEE5- A9 C5       8990              LDA #EMERG
FEE7- CD 2D 01    9000              CMP ADDRESS
FEEA- D0 17       9010              BNE RESET
FEEC- AD 28 01    9020              LDA COMBUFF
FEEF- 29 20       9030              AND #$20
FEF1- D0 10       9040              BNE RESET
FEF3- A2 05       9050  SREADY      LDX #05
FEF5- BD 27 01    9060  SREADY1     LDA COMBUFF-1,X
FEF8- 9D FF 00    9070              STA MODE-1,X
FEFB- CA          9080              DEX
FEFC- D0 F7       9090              BNE SREADY1
FEFE- A9 03       9100              LDA #$03
FF00- 8D 1E 01    9110              STA READY
FF03- AD 96 01    9120  RESET       LDA RTIMER
FF06- A2 06       9130              LDX #06
FF08- 8E 1D 01    9140  SAVE1       STX RECIVX
FF0B- 4C 6C FE    9150              JMP RESTORE
FF0E- A9 32       9160  STIMER      LDA #50
FF10- 8D 9F 01    9170              STA WTIMER
FF13- 4C 08 FF    9180              JMP SAVE1
FF16- AD 28 01    9190  TREQ        LDA COMBUFF
FF19- 29 20       9200              AND #$20
FF1B- F0 D6       9210              BEQ SREADY
                  9220  ;SET STATUS BYTE
FF1D- AD 05 01    9230  PICTURE     LDA STATUS
FF20- 29 C0       9240              AND #$C0
FF22- 8D 05 01    9250              STA STATUS
FF25- AD 82 01    9260              LDA PORTB32
FF28- 29 40       9270              AND #$40
FF2A- D0 05       9280              BNE AZSET
FF2C- A9 40       9290              LDA #$40
FF2E- 8D 05 01    9300              STA STATUS
FF31- AD 14 01    9310  AZSET       LDA AZSTAT
FF34- 29 01       9320              AND #$01
FF36- D0 10       9330              BNE SETAZ
FF38- AD 80 01    9340              LDA PORTA32
FF3B- 29 03       9350              AND #$03
FF3D- 49 03       9360              EOR #$03
FF3F- 0D 05 01    9370              ORA STATUS
FF42- 8D 05 01    9380              STA STATUS
FF45- 4C 5F FF    9390              JMP SETEL
FF48- AD 05 01    9400  SETAZ       LDA STATUS
FF4B- 09 11       9410              ORA #$11
FF4D- 8D 05 01    9420              STA STATUS
FF50- AD 14 01    9430              LDA AZSTAT
FF53- 29 10       9440              AND #$10
FF55- F0 08       9450              BEQ SETEL
FF57- AD 05 01    9460              LDA STATUS
FF5A- 49 03       9470              EOR #$03
FF5C- 8D 05 01    9480              STA STATUS
FF5F- AD 15 01    9490  SETEL       LDA ELSTAT
FF62- 29 01       9500              AND #$01
FF64- D0 10       9510              BNE ELSET
FF66- AD 80 01    9520              LDA PORTA32
FF69- 29 0C       9530              AND #$0C
FF6B- 49 0C       9540              EOR #$0C
FF6D- 0D 05 01    9550              ORA STATUS
FF70- 8D 05 01    9560              STA STATUS
FF73- 4C 8D FF    9570              JMP PICTSET
```

```
FF76- AD 05 01    9580 ELSET      LDA STATUS
FF79- 09 24       9590            ORA #$24
FF7B- 8D 05 01    9600            STA STATUS
FF7E- AD 15 01    9610            LDA ELSTAT
FF81- 29 10       9620            AND #$10
FF83- F0 08       9630            BEQ PICTSET
FF85- AD 05 01    9640            LDA STATUS
FF88- 49 0C       9650            EOR #$0C
FF8A- 8D 05 01    9660            STA STATUS
FF8D- A2 05       9670 PICTSET    LDX #$05
FF8F- BD 04 01    9680 PICTURE1   LDA STATUS-1,X
FF92- 9D 09 01    9690            STA XMIT-1,X
FF95- CA          9700            DEX
FF96- D0 F7       9710            BNE PICTURE1
FF98- A9 B1       9720            LDA #$B1
FF9A- 8D 00 03    9730            STA CONTROL
FF9D- 4C 03 FF    9740            JMP RESET
FFA0- 20 31 39    9750            .BY ' 1981 ARCO POWER'
FFA3- 38 31 20
FFA6- 41 52 43
FFA9- 4F 20 50
FFAC- 4F 57 45
FFAF- 52
FFB0- 20 53 59    9760            .BY ' SYSTEMS. BY '
FFB3- 53 54 45
FFB6- 4D 53 2E
FFB9- 20 42 59
FFBC- 20
FFBD- 4D 41 52    9770            .BY 'MARK R. ERICKSON'
FFC0- 4B 20 52
FFC3- 2E 20 45
FFC6- 52 49 43
FFC9- 4B 53 4F
FFCC- 4E
                  9780            .BA $FFFC
                  9790            .MC $17FC
FFFC- 00 F8       9800            .SI START
FFFE- D8 FA       9810            .SI INTERUPT
                  9820            .EN
```

LABEL FILE: [ / = EXTERNAL ]

```
/MODE=0100          /STATUS=0105        /XMIT=010A
/AZSTEP=0110        /ELSTEP=0112        /AZSTAT=0114
/ELSTAT=0115        /AZOLD=0116         /ELOLD=0117
/AZWHEEL=0118       /ELWHEEL=0119       /AZDELAY=011A
/ELDELAY=011B       /TRANSX=011C        /RECIVX=011D
/READY=011E         /TEMP=011F          /MTEMP=0120
/MSWITCH=0121       /ATEMP=0122         /XTEMP=0123
/MOTORSTAT=0124     /AZMOUT=0125        /ELMOUT=0126
/POUTCOUNT=0127     /COMBUFF=0128       /ADDRESS=012D
/DDRA32=0181        /DDRB32=0183        /DDRA22=0203
/DDRB22=0202        /IFR22=020D         /IER22=020E
/PCR22=020C         /ACR22=020B         /TIM22L=0204
/TIM22H=0205        /IER32=0184         /TIMER=0197
/WTIMER=019F        /RTIMER=0196        /AZCOUNT=0201
/ELCOUNT=0200       /PORTA32=0180       /PORTB32=0182
/CONTROL=0300       /DATA=0301          /MOTOROUT=0400
/MAX=0905           /EMERG=00C5         START=F800
SET=F834            WAIT=F85C           CWAIT=F86C
```

```
COMDEC=F876        COMDEC1=F88C       SETPOS=F89B
TESTAZ=F8A7        SAZCCW=F8B9        AZLMT=F8BE
TRACKAZ=F8D1       AZZERO=F909        AZLIMIT=F914
WEST=F921          TESTEL=F927        SELCCW=F939
ELLMT=F93E         TRACKEL=F951       ELZERO=F989
ELLIMIT=F994       DOWN=F9A1          MWAIT=F9A7
CTEST=F9B7         STEST=F9C6         TSEL=F9DC
CREADY=F9EB        MANUAL=F9F3        MANUAL1=F9FF
RETURN=FA06        MCTEST=FA07        LOOP=FA1D
CHANGE=FA30        AZWAIT=FA58        MAZLMT=FA6E
MAZCCW=FA84        MELTEST=FA89       ELWAIT=FAA1
MELLMT=FAB7        MRESTORE=FACA      MELCCW=FAD3
INTERUPT=FAD8      MOTORS=FAEE        MOTOR1=FAFA
POUT=FB0A          SHUTDOWN=FB1A      FAIL=FB25
AZMOTOR=FB2E       AZON=FB36          FINDAZ=FB3C
AZSAVE=FB44        AZMOVE=FB58        AZCONT=FB5D
AZDECSTP=FB79      AZSKIP=FB8A        AZCCW=FB91
AZSTOPT=FBAE       GOEL=FBC0          STEPAZ=FBC3
SETSTOPAZ=FBCB     AZTEST=FBE6        SAZDEL=FBFB
OFFAZREL=FC09      AZTIME=FC17        GOEL1=FC3C
STOPAZ=FC3F        SKIPAZ=FC51        INCAZP=FC9E
DECAZ=FCB0         DECAZP=FCC0        ELMOTOR=FCD2
ELMOTOR1=FCDD      ELON=FCE5          FINDEL=FCEB
ELSAVE=FCF3        ELMOVE=FD07        ELCONT=FD0C
ELDECSTP=FD28      ELSKIP=FD39        ELCCW=FD40
ELSTOPT=FD5D       GORES=FD6F         STEPEL=FD72
SETSTOPEL=FD7A     ELTEST=FD95        SELDEL=FDAA
OFFELREL=FDB8      ELTIME=FDC6        GORES1=FDEB
STOPEL=FDEE        SKIPEL=FE00        INCELP=FE4D
DECEL=FE5F         RESTORE=FE6C       DECELP=FE73
MOTOROFF=FE85      COMM=FE9B          SAVE=FEBA
RECIVER=FEC0       SREADY=FEF3        SREADY1=FEF5
RESET=FF03         SAVE1=FF08         STIMER=FF0E
TREQ=FF16          PICTURE=FF1D       AZSET=FF31
SETAZ=FF48         SETEL=FF5F         ELSET=FF76
PICTSET=FF8D       PICTURE1=FF8F
//0000,0000,1800
```

What is claimed is:

1. In a control system for a solar system for maximizing solar energy received by a collector and including at least one body that is employed to maximize the solar energy received by the collector responsive to movement about two axes by respective azimuth and elevation motors, the at least one body comprising a collector, per se, or a plurality of heliostats reflecting solar energy onto a central collector; said at least one body including a support stand, support structure, means including the azimuth and elevation motors for moving said at least one body in azimuth and elevation with respect to said support stand, the improvement comprising a central computer handling external data processing, communication and control, and the plurality of said bodies and the plurality respective microprocessors, one at each said body, each being connected to said central computer and handling for its respective body internal data processing, communication and direct control of its respective azimuth and elevation motor of element b, hereinafter; said central computer and each respective microprocessor at each said body including respective routines and software that effect communicating and co-action such that there are provided the following system elements:

a. monitor means for monitoring a current position of said respective azimuth and elevation motors for each of said at least one body;

b. a controller for receiving input data including a commanded position in terms of angles of azimuth and elevation for each said body and including for each said body a microprocessor and program and software having accumulating means for determining commanded number of steps for the respective motors to move in azimuth and elevation to reach a commanded position; respective azimuth and elevation motors being direct current motors having Hall Effect Devices for monitoring the number of positions through which the motors have rotated and do rotate; energizer means for energizing the respective said motors in azimuth and elevation; counter means for counting the number of pulses from said Hall Effect Devices on respective said motors; comparison means for comparing the counted steps of said motors and comparing it with the predetermined number of steps to said commanded position; said comparison means being connected with said other elements so as to enable energizing and deenergizing respective said motors in attaining said commanded position in azimuth and elevation for each respective at least one body.

2. The control system of claim 1 wherein said DC motors have respective solid state relays on both the run cycle and on the brake cycle so as to enable said motors to be stopped rapidly.

3. The system of claim 1 wherein said microprocessor and said software includes means for determining the direction of the rotation of the respective motors in, respectively, elevation and azimuth in order to send the proper polarity to the motor to get the proper degree of rotation.

4. The control system of claim 1 wherein said controller and central computer includes a program for computing a commanded position for a plurality of respective said bodies to be at at a particular time of day and wherein there are a plurality of said bodies controlled by said central computer and each said body has its said microprocessor and program for attaining respective positions commanded by said central computer throughout each day.

5. In a method of controlling at least one body to maximize solar energy received by a collector including moving the at least one body in both azimuth and elevation by respective azimuth and elevation direct current motors, the improvement comprising employing a central computer and a plurality of said bodies and a plurality of respective microprocessors, one at each said body, communicating sequentially and respectively with respective routines and software such that there is carried out for each said body the following steps:
  a. calculating a commanded position for the at least one body to be at at a particular time of day in terms of numbers of counts for respective Hall Effect Devices connected with respective direct current electric motors serving as the respective elevation and azimuth motors;
  b. initializing and powering up at a predetermined position and monitoring the position by counting means thereafter;
  c. accumulating the number of steps in azimuth and elevation by each said Hall Effect Device on each said motor to get to said commanded position from said predetermined position each time said body is to be moved; energizing respective said azimuth and elevation direct current motors whenever movement in azimuth and elevation are desired; counting the number of signals from said Hall Effect Devices connected respectively with said azimuth and elevation motors and comparing number of positions moved with the numbers to be moved to achieve respective commanded positions and doing this repetitively throughout the chronology of a day.

6. The method of claim 5 wherein said respective DC motors and Hall Effect Devices are moved to the command position by counting and where solid state relays are employed to power said DC motors and wherein solid state relays are employed to brake said motor by applying a low resistance across the windings of said motors.

7. The method of claim 5 wherein said method incorporates a means for determining when power fails and enables a safety shutdown mode in the event of a power failure.

8. In a method of positioning the body so so as to achieve a particular orientation by movement about two axes, the improvement comprising:
  a. calculating a commanded position for the body to be at a particular time of day in terms of numbers of counts for respective Hall Effect Devices connected with respective direct current electric motors serving as the respective elevation and azimuth motors;
  b. initializing and powering up at a predetermined position and monitoring the position by counting means thereafter;
  c. accumulating the number of steps in azimuth and elevation by respective Hall Effect Devices on said motors to get to said commanded position from said predetermined position each time said body is to be moved; energizing respective said azimuth and elevation direct current motors where any movement in azimuth and elevation are desired; counting the number of signals from respective said Hall Effect Devices connected with respective said azimuth and elevation motors and comparing number of positions moved with the numbers to be moved to achieve respective commanded positions and doing this repetitively throughout the chronology of a day.

* * * * *